United States Patent [19]

Grondalski

[11] 4,447,877
[45] May 8, 1984

[54] MEMORY BUS INTERFACE SYSTEM

[75] Inventor: David Grondalski, Hopkinton, Mass.

[73] Assignee: Data General Corporation, Westboro, Mass.

[21] Appl. No.: 290,285

[22] Filed: Aug. 6, 1981

Related U.S. Application Data

[62] Division of Ser. No. 959,038, Nov. 8, 1978, Pat. No. 4,316,244.

[51] Int. Cl.³ .......................... G06F 3/06; G06F 13/00
[52] U.S. Cl. ...................................................... 364/200
[58] Field of Search ................................ 364/200, 900

[56] References Cited

U.S. PATENT DOCUMENTS 4,093,986  6/1978  Bodner et al. ..................... 364/200
4,117,263  9/1978  Yeh ................................. 364/200 X Primary Examiner—Thomas M. Heckler
Attorney, Agent, or Firm—Gordon E. Nelson; Joel Wall; Jacob Frank

[57] ABSTRACT

Therein is disclosed high speed digital computer system architecture. System architecture includes a processor for processing machine language digital data and a memory for storing at least machine language instructions for use by the processor. Instructions or data are transmitted between memory and processor by memory input and output busses. Signals are transmitted between computer system and external devices by I/O apparatus. Instruction pre-fetch circuitry is disclosed for fetching from memory, and storing, instructions in advance of instructions being executed by the processor. Also disclosed are a high speed memory and memory input and output busses providing high memory bus bandwidth and simple memory bus interface circuitry. Processor circuitry is disclosed for allowing high speed initiation and execution of instruction sequences. I/O circuitry is disclosed which allows I/O apparatus to easily adapt to a variety of external devices or to changes in computer machine language or instructions.

7 Claims, 37 Drawing Figures

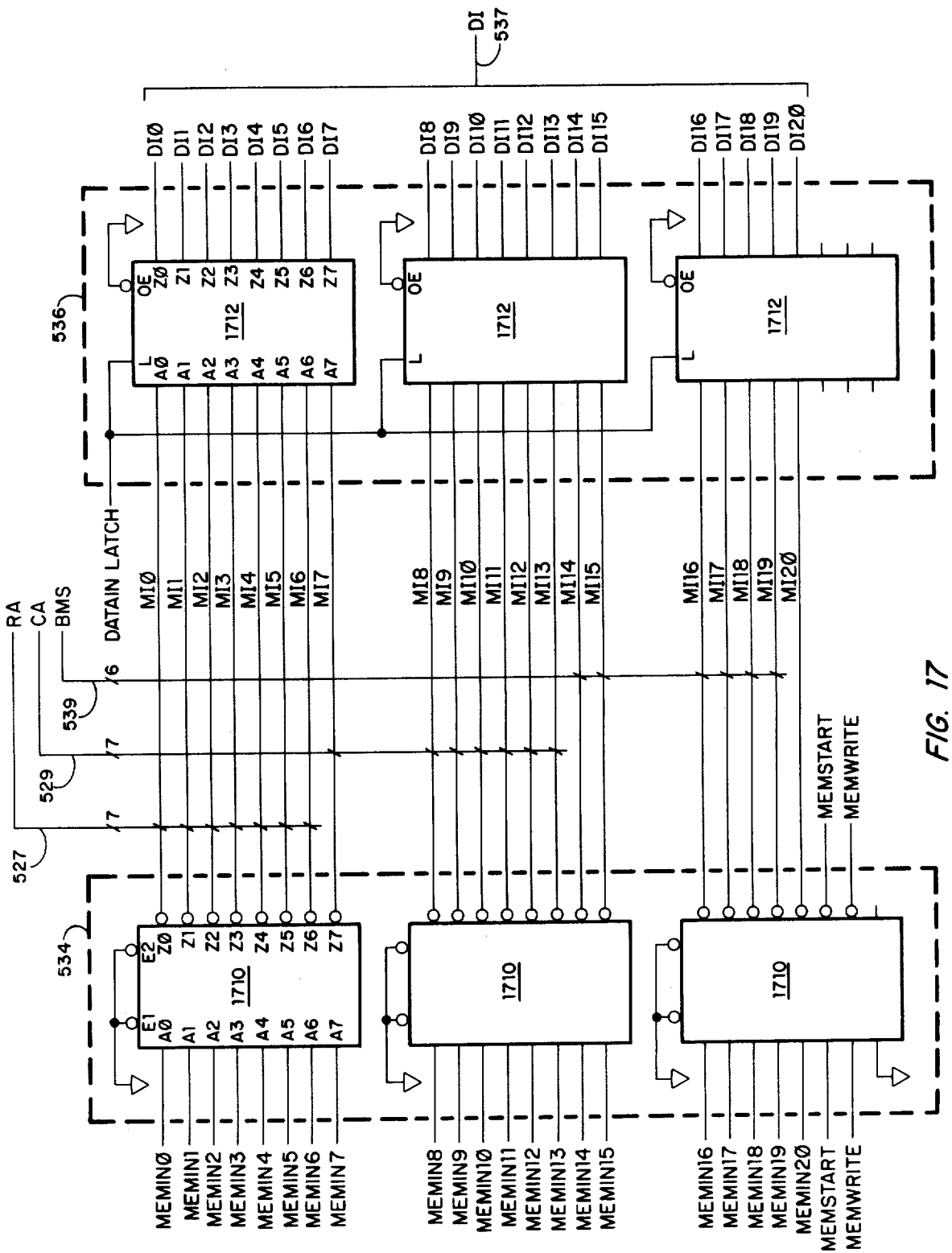

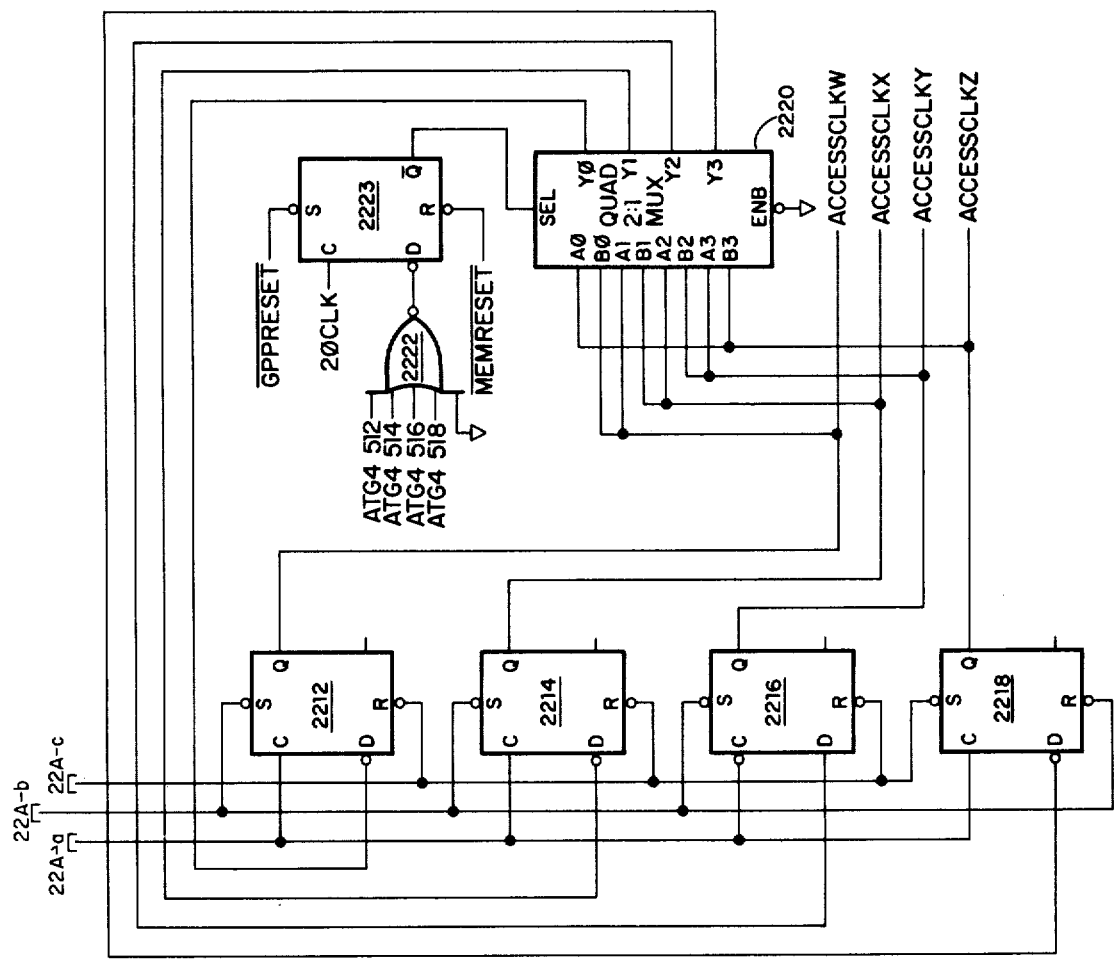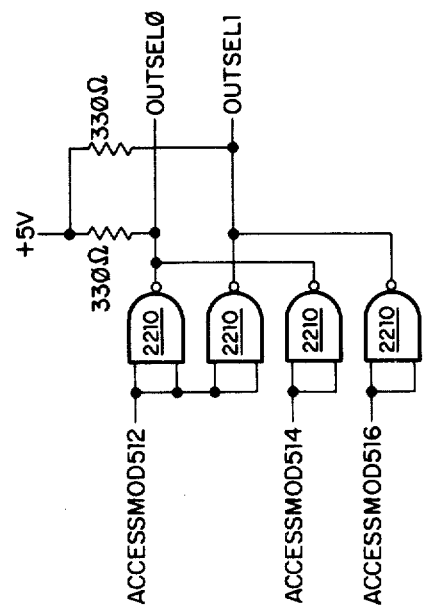
FIG. 22

FIG. 29

| | MACROINSTRUCTION BITS | | | | | | | | | | | | | | | | FIRST MICROINSTRUCTION ADDRESSES |
|---|---|---|---|---|---|---|---|---|---|---|---|---|---|---|---|---|---|
| BIT | 0 | 1 | 2 | 3 | 4 | 5 | 6 | 7 | 8 | 9 | 10 | 11 | 12 | 13 | 14 | 15 | |
| ALC | 0 | 1 | ACS | | ACD | | FUN | | | SH | | C | L | SKIP | | | $3401_8$, $3421_8$, $3441_8$, $3461_8$, $3601_8$, $3621_8$, $3641_8$, $3661_8$, $3603_8$, $3623_8$, $3643_8$, $3663_8$ |
| EIS | 1 | — | — | — | — | — | — | — | — | — | — | 1 | 0 | 0 | 0 | 0 | $3605_8$, $3607_8$, $3625_8$, $3627_8$, $3645_8$, $3647_8$, $3665_8$, $3667_8$ |
| LONG EFA | 1 | — | — | — | — | — | I/O | I/O | — | 0 | 0 | 1 | 1 | 0 | 0 | 0 | $3405_8$, $3425_8$, $3445_8$, $3465_8$ |
| SHORT EFA | 0 | 0 | 0 | 1 | — | — | I/O | I/O | — | — | — | — | — | — | — | — | $3701_8$, $3721_8$, $3741_8$, $3761_8$ |
| | 0 | 0 | 1 | 0 | — | — | I/O | I/O | — | — | — | — | — | — | — | — | |
| | 0 | 0 | 1 | 1 | — | — | I/O | I/O | — | — | — | — | — | — | — | — | |
| I/O | 0 | 1 | 1 | — | — | — | — | — | — | — | — | — | — | — | — | — | $3711_8$, $3731_8$, $3751_8$, $3771_8$ |

LEGEND:
ACS — SOURCE ACCUMULATOR  
ACD — DESTINATION  
FUN — FUNCTION  
SH — SHIFT  
I/O — 1 OR 0  
C — CARRY  
L — LOAD  
SKIP — SKIP  
— — NOT USED BY SAGE 2824

MEMORY BUS INTERFACE SYSTEM

This is a division of application Ser. No. 959,038 filed Nov. 8, 1978, now U.S. Pat. No. 4,316,244.

BACKGROUND OF THE INVENTION

1. Field of the Invention

This invention relates to architecture for a high-speed digital computer system and, more particularly, to circuitry used therein to enhance operating speed and efficiency of such a system.

2. Description of Prior Art

Basic elements of a digital computer include a processor, for processing machine language digital data, and a memory. In general, machine language instructions for controlling processing operations of the processor are stored in memory. Memory may also contain at least portions of data to be processed. Instructions and data are transmitted between processor and memory by memory input and output busses. A computer further includes input/output (I/O) apparatus for transmitting instructions and data between computer and external devices. External devices may include, e.g., a control console or a tape storage unit, and generally do not communicate in computer machine language.

Capability of such a digital computer is defined, and limited, by its speed and efficiency in processing data and its adaptability to changing user requirements. Computer system speed and efficiency are determined by several factors. Among these factors are operating speed of memory, availability of memory access by the processor when required. Other factors are data band width which may be supported by memory input and output busses, complexity of processor interface with memory input and output busses, availability of instructions to the processor when required, and speed with which the processor initiates and executes sequences of instructions.

A limitation on computer adaptability is its ability to structure memory capacity according to user needs. Another limitation is ability of computer I/O apparatus to adapt to a variety of external devices, or to changes in computer internal machine language.

The present invention provies computer system improvements which bear upon the above-noted speed/efficiency factors, thus improving the speed and efficiency of operation of the system, and also provides solution to the aforementioned problems and limitations of the prior art as will be discussed in detail hereinbelow.

SUMMARY OF THE INVENTION

The present invention relates to computer system architecture providing increased operating speed and efficiency and allowing a computer system to adapt to changing user requirements. The architecture includes a processor for processing machine language data, a memory for storing at least machine language instructions for use by the processor, a memory input bus and a memory output bus for transmitting at least instructions between memory and processor, and I/O apparatus for transmitting signals between computer system and external devices. The architecture includes other circuitry to enhance speed, operating efficiency, and adaptability of computer system. Among these circuits are a high-speed memory and memory busses which provide high memory bus bandwidth and simple memory bus interface circuitry. Another feature is instruction pre-fetch apparatus to fetch and store instructions from memory in advance of instructions being executed by the processor. Yet another feature is circuitry allowing high speed initiation and execution of instruction sequences. A further feature is I/O circuitry allowing a computer system to easily interface with a variety of external devices or easily-adapt to changes in computer machine language or instructions.

It is thus advantageous to incorporate the present invention into a computer system because speed with which instructions are transferred from memory to processor is increased and computer overhead time required to fetch instructions from memory is reduced. The present invention is further advantageous because speed with which instruction sequences are initiated and executed is increased. Additionally, the present invention increases adaptability of a computer in interfacing with external devices and allows computer system capability to be increased to meet increasing user requirements.

It is thus an object of the present invention to provide an improved digital computer system.

It is another object of the present invention to provide an improved computer memory and memory bus system capable of expanding to meet user requirements.

It is yet another object of the present invention to provide instruction pre-fetch circuitry to fetch instructions from memory in advance of instructions being executed by the processor.

It is a further object of the present invention to provide circuitry for increasing speed with which instruction sequences are initiated and executed by the processor.

It is a still further object of the present invention to provide I/O circuitry allowing a computer system to easily interface with a variety of external devices or to easily adapt to changes in computer machine language or instructions.

Other objects and advantages of the present invention will be understood by those of ordinary skill in the art, after referring to detailed description of the preferred embodiments and drawings wherein:

BRIEF DESCRIPTION OF DRAWINGS

FIG. 17 is a schematic of memory input circuitry;

FIGS. 22 and 22A are schematics of memory output control circuitry;

FIG. 29 illustrates relationship between computer system macroinstructions and microinstruction sequences.

DESCRIPTION OF THE PREFERRED EMBODIMENT

Figure 1:
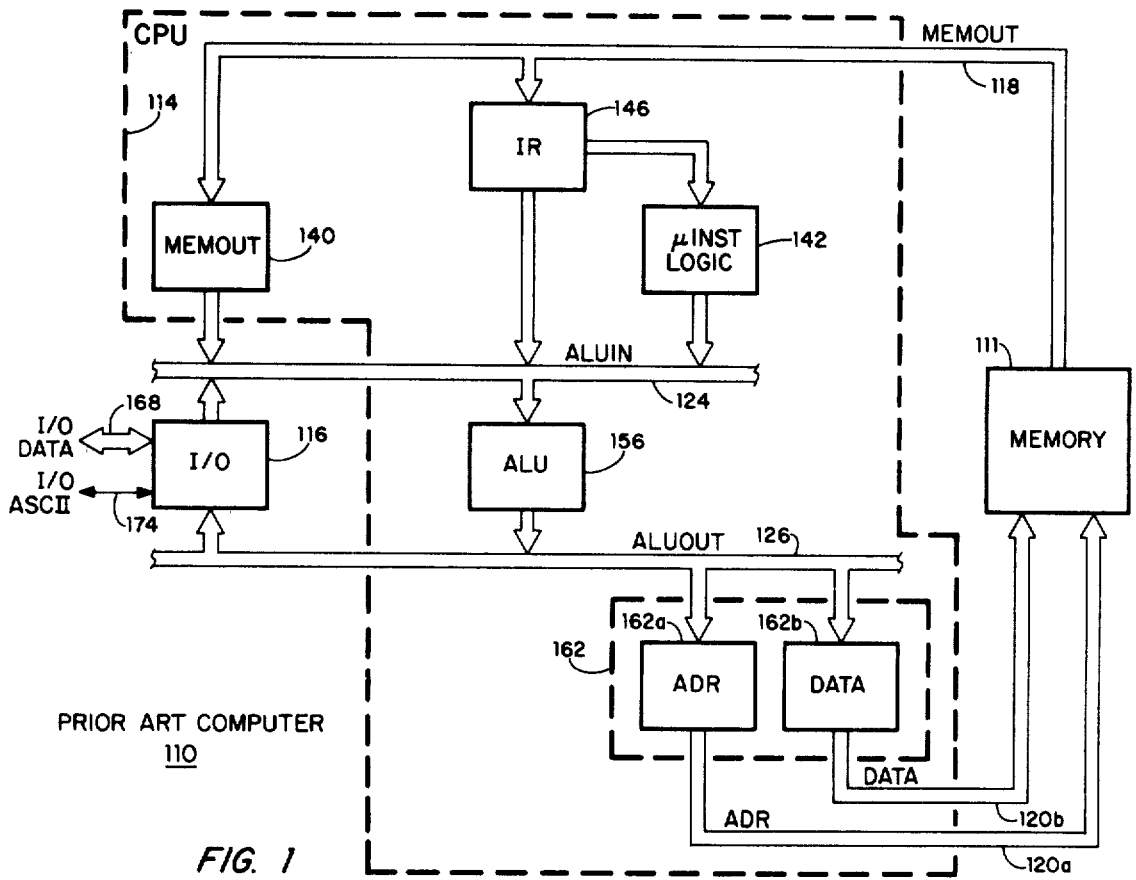
FIG. 1 is a partial block diagram of a computer of the prior art.

The following discussion presents the architecture and operation of a computer incorporating the present invention. As indicated in the following table of contents, the general architecture and operation of a computer according to the prior art will be presented first. Next, the general architecture and operation of a computer according to the present invention will be presented and compared to the computer of the prior art. A short discussion of certain features of the present invention will follow. The architecture and operation of the computer of the present invention will then be described on a block diagram level. Selected portions of the present computer, e.g., the memory, pre-fetch processor, microinstruction control logic, and soft console, will then be described individually.

Certain conventions are used throughout the following discussion to enhance clarity of presentation. When substantial numbers of signals will be referred to during a discussion, e.g., of the memory or pre-fetch processor, the discussion will be preceded by a glossary naming and defining signals referred to therein. Further signals may be introduced in the discussion as required. A group of similar signals is indicated by, e.g., MODSTART(512, 514, 516, 518). A single signal of this group is referred to, e.g., as MODSTART512, and the group generally by MODSTART. Inverted signals are indicated by a bar over the signal name, such as MODRDY and e,ovs/MODRDY/ . Where related circuitry is shown in two or more figures, the figures will share a common figure number with a letter designation, e.g., FIG. 12, 12A, 12B. Common electrical points between such circuitry will be indicated by a bracket enclosing a lead to such a point and a designation "a-b"; "a" indicates other figures having the same common point and "b" is a letter designation applied to a particular common electrical point. Reference numbers will comprise a two digit number (00-99) preceded by the number of the figure in which they appear, e.g., 100 through 199 in FIG. 1 or 2500 through 2529 in FIG. 25. In the case of related circuitry shown in two or more figures, the figure number used will be that of the first figure of the related group. Reference numbers will be assigned in sequence through the related group of figures.

TABLE OF CONTENTS

| | | | Page |
|---|---|---|---|
| 1. | Introduction (FIGS. 1 and 2) | | 10 |
| 2. | Computer Architecture and Operation (FIGS. 3 and 4) | | 14 |
| | A. | Structure (FIG. 3) | 14 |
| | B. | Instruction and Data Words (FIG. 4) | 15 |
| | C. | Operation (FIG. 3) | 17 |
| 3. | Sub-memory 313 (FIGS. 5-24) | | 20 |
| | A. | Sub-memory 313 Structure (FIG. 5) | 20 |
| | B. | Sub-memory 313 Signal Glossary | 22 |
| | C. | Operation of Sub-memory 313 (FIG. 5) | 27 |
| | D. | Memory 313 Timing Diagrams (FIGS. 6-13) | 34 |
| | E. | Sub-memory 313 Circuitry (FIGS. 14-24) | 43 |
| | F. | Summary of Sub-memory 313 Features | 62 |
| 4. | Pre-fetch Processor (PFP) 312 (FIGS. 3, 25-27) | | 66 |
| | A. | PFP 312 Signal Glossary | 66 |
| | B. | Operation of PFP 312 (FIG. 3) | 70 |
| | C. | PFP 312 Circuitry (FIGS. 25-27) | 74 |
| | D. | Summary of PFP 312 Features | 84 |
| 5. | Microinstruction Logic 342 (FIGS. 3, 28, 30) | | 86 |
| | A. | Microinstruction Logic 342 Structure and Operation (FIG. 3, 28) | 86 |
| | B. | SAGE 2824 (FIGS. 29 and 30) | 89 |
| 6. | Console ROM 358 (FIG. 3) | | 94 |
| 7. | Parts List (FIGS. 14-27, 30) | | 96 |
| 8. | Claims | | 100 |
| 9. | Abstract | | 115 |

1. Introduction (FIGS. 1 and 2)

Figure 2:
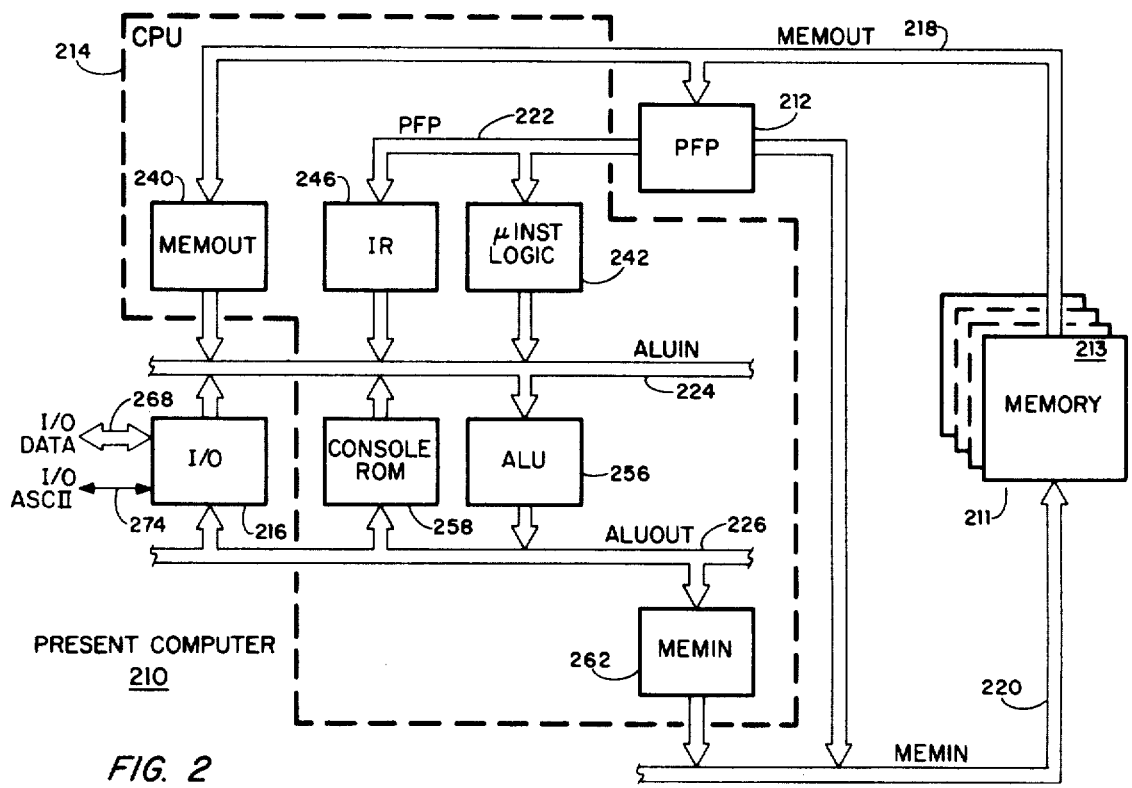
FIG. 2 is a partial block diagram of a computer incorporating the present invention.

Referring to FIG. 1, a partial block diagram of computer 110 of the prior art is shown. Major elements of computer 110 are memory 111, central processing unit (CPU) 114, and input/output (I/O) devices 116. The user's program, e.g., data and macroinstructions, are stored in memory 111 and transferred to CPU 114 through memory output MEMOUT bus 118 upon request by CPU 114. Transfer of data/instructions out of memory 111, and the writing of such into memory 111, are accomplished through memory input (MEMIN) register 162. MEMIN register 162 comprises address register 162a and data register 162b, which are connected to address (ADR) bus 120a and data (DATA) bus 120b. Data, and some instructions, appearing on MEMOUT bus 118 are transferred into memory output (MEMOUT) register 140. Data/instructions in MEMOUT register 140 are transferred through ALU input (ALUIN) bus 124 to arithmetic and logic unit (ALU) 156, for use in executing the program steps. Generally, instructions are transferred from MEMOUT bus 118 into instruction register (IR) 146. Certain types of instructions may be transferred from IR 146 directly to ALU 156 through ALUIN bus 124. Frequently-used instruction sequences are, however, stored in microinstruction logic 142 rather than in memory 111. In such cases, a macroinstruction appearing in IR 146 comprises an instruction to microinstruction logic 142. Microinstruction logic 142 then sequentially calls steps of the microinstruction sequence from its internal memory and provides microinstructions to CPU 114.

Upon completing a macroinstruction or a microinstruction sequence ALU 156 requests the next instruction of the user program from memory 111 by providing the corresponding address to memory 111 through ALU output (ALUOUT) bus 126, MEMIN registers 162, and ADR bus 120*a*.

In general, a user's macroinstruction sequence program is stored in memory 111 in a corresponding sequence of addresses. CPU 114 therefore maintains track of the program by storing the address of the currently executing instruction, referred to as program count (PC). PC is incremented at conclusion of each instruction step and used as address input to memory 111.

External access to CPU 114 and memory 111 is obtained through I/O devices 116. Specifically, parallel digital words may be transferred through I/O DATA bus 168. Serial alphanumeric inputs and outputs are communicated through I/O ASC II channel 174. I/O devices 116 have direct access to ALUIN bus 124 and ALUOUT bus 126, and thus to ALU 156. Access into memory 111 is obtained through the path comprising ALUIN bus 126, ALU 156, ALUOUT bus 124, and MEMIN registers 162. Access out of memory 111 is obtained through MEMOUT register 140, ALUIN bus 124, ALU 156, and ALUOUT bus 126. Data transferred through DATA bus 168 is generally compatible in format with CPU 114 and memory 111. ASCII input, however, must be converted into a format compatible with CPU 114 and memory 111. This is generally accomplished in I/O device 116, or as a separate operation executed in ALU 156.

Referring to FIG. 2, a partial block diagram showing architecture of computer 210 incorporating the present invention is depicted. Memory input busses ADR 120*a* and DATA 120*b* have been replaced by single MEMIN bus 220. Memory 211 is comprised of one or more sub-memories 213, each of which is a complete and self-contained memory capable of operating independently. One or more sub-memories 213 may be connected in parallel to MEMIN bus 220 and MEMOUT bus 218 and, when so connected, will operate together as computer memory 211. This allows the capacity of computer memory 211 to be structured according to user requirements.

CPU 214 has direct access to memory 211 outputs through MEMOUT bus 218 and its MEMOUT register 240. CPU 214 also has direct input access through its MEMIN register 262. Memory 211 however, no longer transfers instructions directly to CPU 214 and ALU 256 through MEMOUT bus 218 and IR 246. In computer 210, instructions are transferred through MEMOUT bus 218 into pre-fetch processor (PFP) 212. Instructions are transferred from PFP 212 to IR 246 through PFP bus 222. Additionally, microinstruction logic 242 receives instructions directly from PFP 212 rather than from IR 246. This change in architecture reflects a change in internal architecture of microinstruction logic 242, which will be described further below. As shown, PFP 212 has direct access to memory 211 through MEMIN bus 220 in parallel with CPU 214.

A further change in architecture of computer 210 is inclusion of Console ROM 258 connected between ALUOUT bus 226 and ALUIN bus 224.

Certain features of the present computer, which features and others are further detailed later in the instant application are:

Memory 211 may be comprised of between one and eight submemories 213. This allows memory 211 to be structured according to user needs.

Sub-memories 213 of the present invention are high speed, four-way interleaved memories providing synchronous and independent MEMIN and MEMOUT busses. Sub-memory 213 architecture provides a memory input/output bus architecture allowing greatly simplified interface circuitry between CPU 214, or other devices, and MEMIN bus 220 and MEMOUT bus 218. A further feature of this architecture is the simplicity with which internal control of sub-memory 213 is implemented. Also, sub-memory 213 architecture incorporates a bussing structure which allows substantially greater amounts of storage capacity to be contained within a single printed circuit card.

Refresh of sub-memory 213 is accomplished by circuitry internal to sub-memory 213, thereby reducing overhead burden on CPU 214, and uses memory access cycles not required by CPU 214 or PFP 212, thereby increasing usable access time sub-memory 213. Sub-memory 213 is transparent to arrangement of data bits in data words stored therein, including error correcting code bits, thereby providing maximum flexibility in data instruction word storage. Transparency of sub-memory 213 to error correcting codes increases throughout rate of sub-memory 213 by transferring the error correcting function to CPU 214.

PFP 312 performs instruction look-ahead for CPU 214 by fetching from memory 211, and storing, a sequence of instructions in advance of the instruction currently being executed by CPU 214. PFP 212 utilizes memory access cycles not required by CPU 214 to perform the pre-fetch operation; thereby increasing instruction execution rate of CPU 214 by reducing time required by CPU 14 to gain access to instructions.

The internal change in microinstruction logic 242, referred to above, includes provision of an internal register (shown in FIG. 28) for macroinstruction storage; thereby freeing IR 246 for other use. Microinstruction logic 242 further comprises a start address generator (SAGE) circuit (shown in FIG. 28). SAGE directly decodes instructions received from PFP 312 to generate first addresses of microinstruction sequences. SAGE thereby provides immediate access to microinstruction sequences, reducing time required to initiate execution of a microinstruction sequence.

Console ROM 258 allows any external ASCII interface device to directly control the operation of computer 210. ASCII instructions from an external source are converted directly into corresponding machine language format used within computer 210. This reduces the dedicated external console required to control computer 210. Translation of ASC II inputs to machine language sequences is controlled by read only memories (ROM), so that Console ROM 258 can be easily modified or expanded to adapt to any input format and to any machine language format.

Having briefly described architectural structure and certain features of a computer incorporating the preferred embodiment of the present invention, architecture and operation will now be described in detail.

2. Computer Architecture and Operation (FIGS. 3 and 4)

A. Structure (FIG. 3)

Figure 3:
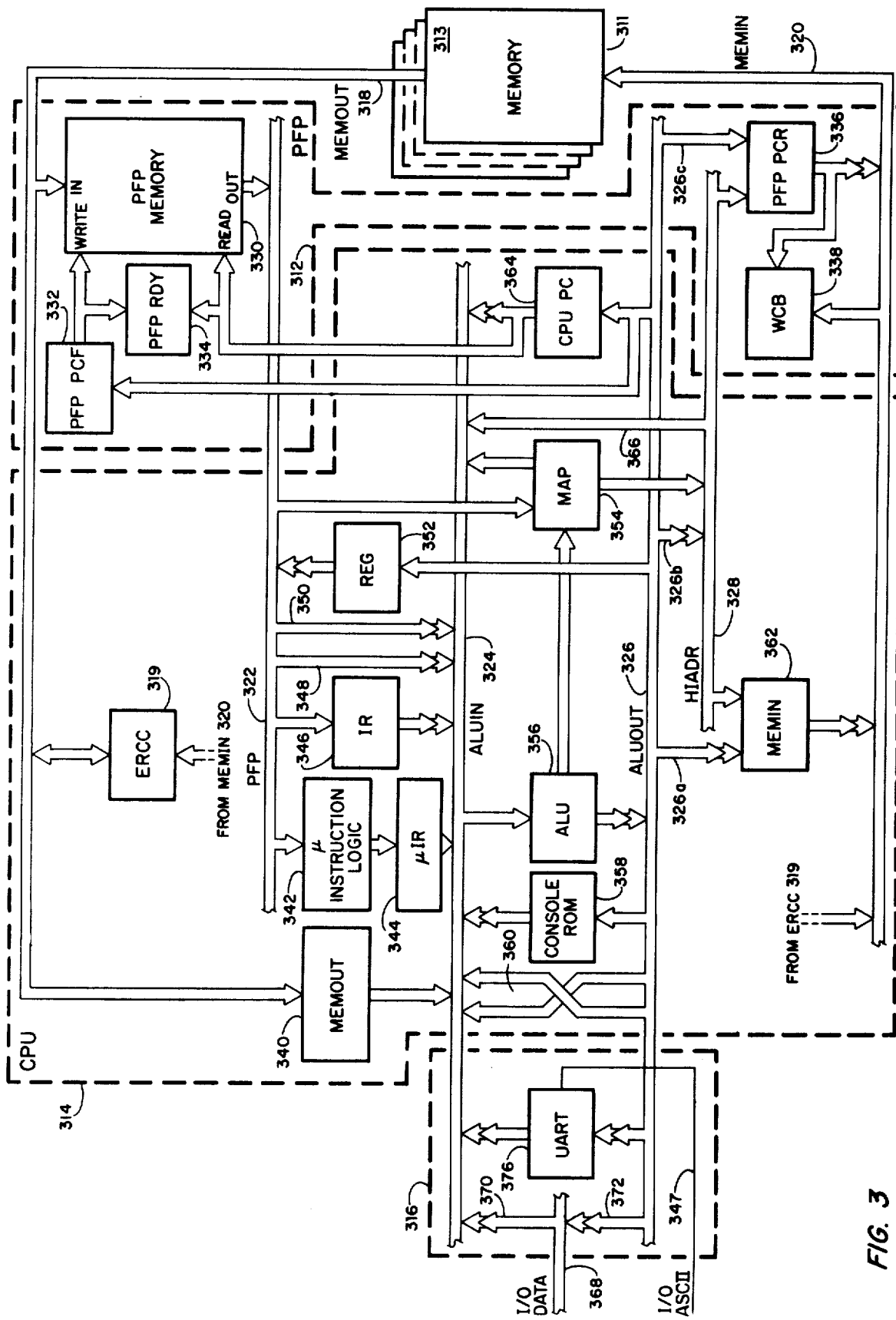
FIG. 3 is a detailed block diagram of a computer incorporating the present invention.
Figure 4:
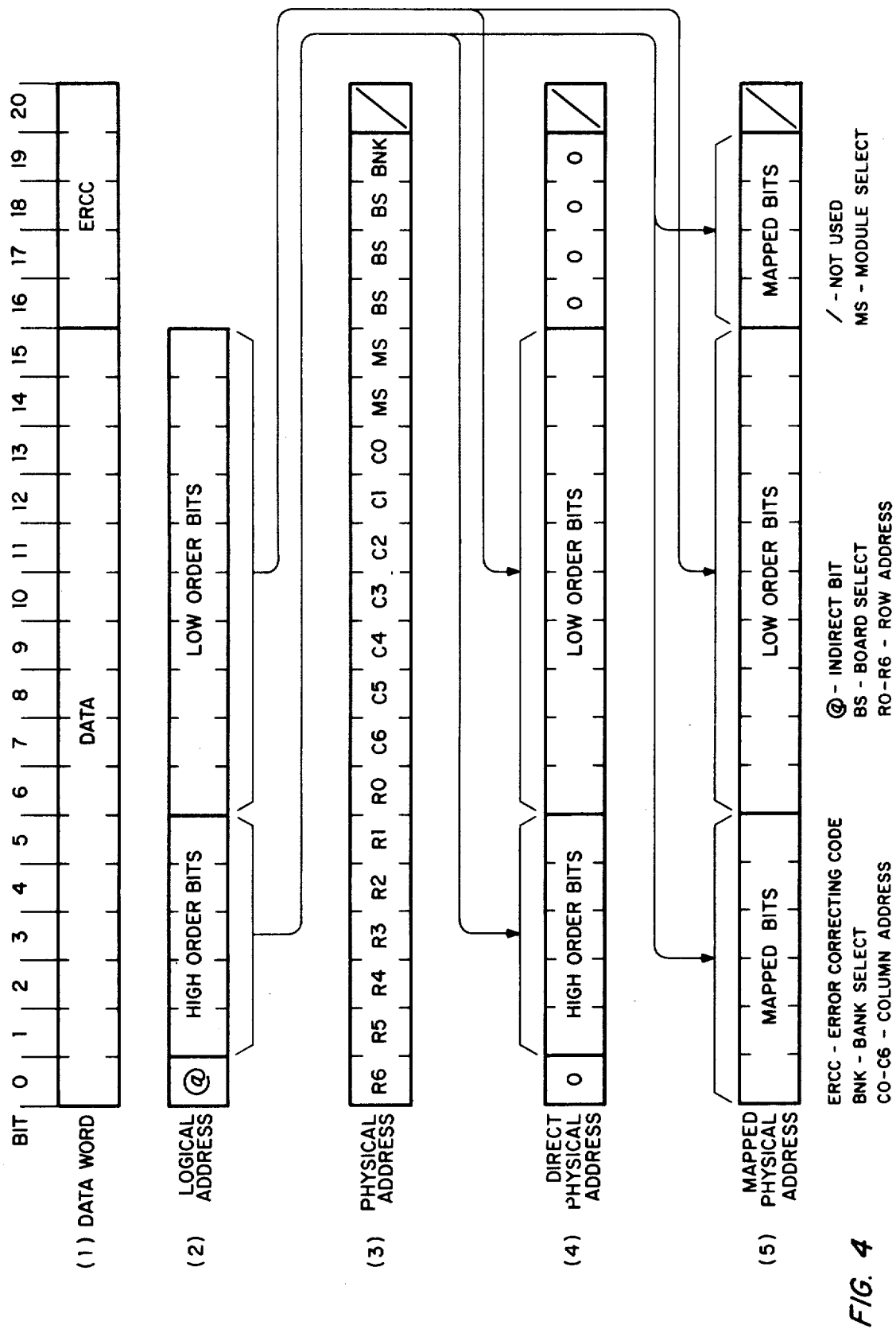
FIG. 4 illustrates instruction and data words used in the present computer.

Referring to FIG. 3, there is disclosed a detailed block diagram of computer 310, whose architecture incorporates the present invention. As described above with regard to computer 210, memory 311 of computer 310 comprises one or more sub-memories 313. Memory 311 output is connected by MEMOUT bus 318 to inputs of MEMOUT register 340 in CPU 314 and memory 330 in PFP 312. MEMOUT bus 318 is also connected to error correction (ERCC) logic 319 in CPU 314. MEMOUT register 340 output is connected to ALUIN bus 324 and PFP memory 330 output is connected to PFP bus 322. PFP bus 322 is connected to ALUIN bus 324 through Transfer bus 348, Short Effective Address (EFA) bus 350, and IR 346. PFP bus 322 is connected to inputs of microinstruction logic 342 and memory allocation and protection circuitry (MAP) 354. Microinstruction logic 342 output is connected through microinstruction register (μIR) 344 to ALUIN bus 324. ALUIN bus 324 is connected to an input of ALU 356. A first output of ALU 356 is connected to ALUOUT bus 326 and a second output is connected to an input of MAP 354. ALUOUT bus 326 is connected to ALUIN bus 324 through SWAP bus 360 and Console ROM 358, and to PFP bus 322 through register 352. ALUOUT bus 326 is connected to inputs of CPU program counter (CPUPC) register 364 and PFP fetched program count (PCF) register 332. CPU PC register 364 output is connected to ALUIN bus 324, to an input of PFP Ready (PFPRDY) logic 334, and to read address input of PFP memory 330. PFP PCF register 332 output is connected to another input of PFPRDY logic 334, and to write address input of PFP memory 330. ALUOUT bus 326 is connected to an input of MEMIN register 362 by bus 326a, to high order address (HIADR) bus 328 by bus 326b, and to an input of PFP requested program count (PCR) register 336. MAP 354 outputs are connected to ALUIN bus 324 and to HIADR bus 328. HIADR bus 328 is connected to ALUIN bus 24 by Transfer bus 366. HIADR bus 328 is connected to inputs of MEMIN register 362 and PFP PCR register 336. MEMIN register 362 and PFP PCR register 336 outputs are connected to MEMIN bus 320, which is connected to memory 311 input and to ERCC 319. PFP PCR register 336 output is connected to an input of write current block logic (WCB) 338, and MEMIN bus 320 is connected to another input of WCB 338. Clock and control (CC) bus 321 is connected between memory 311 and CPU 314 and PFP 312. Data I/O bus 368 is connected to ALUIN bus 324 through bus 370, and to ALUOUT bus 326 through bus 372. I/O ASCII channel 374 is connected to ALUIN bus 324 and ALUOUT bus 326 through universal asynchronous receiver/transmitter (UART) 376.

B. Instruction and Data Words (FIG. 4)

Referring to FIG. 4, certain instructions and data words utilized in computer 310 are shown. These are 21 bit words utilized in CPU 314, PFP 312, and memory 311.

Referring to line 1 of FIG. 4, bits 0 through 15 of a data word contain actual data; bits 16 through 20 comprise 5 bits of error correcting code. Although this structure is used in the preferred embodiment described herein, memory 311 is transparent to data word organization and will accept, store, and read out any word up to 21 bits.

Referring to line 2 of FIG. 4, a logical address word is depicted. As will be discussed further below, a portion of the logical address word is stored in CPU PC register 364 as CPUPC. CPUPC is used by CPU 314 to indicate memory 311 address of the program step currently being executed, of a sequence of such steps and addresses. CPUPC is appropriately incremented at execution of each program step. Bit 0 of logical address is generally, but not necessarily, used as an indirect address bit; indicating that the instruction stored at that address in memory 311 is an address leading to the desired instruction. Bits 1 through 15 comprise actual logical address. Of these bits, bits 6 through 15 are low order bits of address and are used directly in addressing memory 311. Bits 1 through 5 comprise high order bits of address and, as will be discussed further below, may be used as direct physical address bits of memory 311. Also, as will be further discussed below, bits 1 through 5 may be used as MAPped bits in translating a logical address into a physical address in memory 311. MAPped addressing allows a user to access a greater address space within memory 311 than can be directly addressed with 15 bits of logical address. MAPping is also used to allocate blocks of addresses within memory 311 to different concurrent users. In each case, 15 bits of logical address are translated into 20 bits of physical address.

Line 3 of FIG. 4 shows physical address as provided to memory 311 on MEMIN bus 320. As will be discussed further below, a sub-memory 313 within memory 311 is structured as four memory modules, each of which contains two memory banks, each bank organized as 128 rows by 128 columns of address space. Each sub-memory 313 is preferably contained within a single circuit board and memory 311 may contain up to eight such sub-memory 313's. Accordingly, bits 16 through 18 of physical address comprise sub-memory 313 board selection bits. Bits 14 and 15 comprise module selection bits within a sub-memory 313. Bit 19 comprises a bank selection bit within one of four sub-memory 313 modules. Bits 0 through 6 are used as row address bits within such a bank, and bits 7 through 13 are used as column address bits. Bit 20 is not used, being reserved for future expansion of memory 311.

Line 4 of FIG. 4 shows use of logical address as direct physical address. Bits 1 through 15 of logical address are used directly as bits 1 through 15 of physical address. Bit 0 and bits 16 through 19 of physical address are forced to 0.

As indicated by the physical address word shown on line 3, each sub-memory 313 has an addressing capability of 128K words (K=1024) and memory 311 has a maximum capacity, with eight sub-memory 313's, of one megaword. As shown on line 4, however, direct physical addressing (address bits 1 to 15) allows a user access to only 32K (215) words of memory. A direct physical address can address one memory 313 board (bits 16 to 19 are 0), all four modules of the board (bits 14 and 15), and one bank in each module (bit 19 is 0). In each bank, all 128 columns are available (bits 7 to 13), but only half the rows (bit 0 is 0). MAPping is required to gain access to total memory space of memory 311, or a sub-memory 313.

Line 5 of FIG. 4 illustrates translation of logical address into a MAPped physical address. Bits 6 through 15 of logical address are used as bits 6 through 15 of physical address. Bits 1 through 5 of logical address are MAP translated into bits 0 through 5 and 16 through 19 of physical address. Twenty address bits 0 to 19 thereby allow user access to full capacity of memory 311, or a sub-memory 313.

C. Operation (FIG. 3)

Referring again to FIG. 3, CPU 314 has direct access to memory 311 for writing or reading instructions and data into or from memory 311. CPU 314 also has indirect access to memory 311, through PFP 312 which fetches and stores instructions ahead of the instruction currently being executed by CPU 314.

Turning first to direct access between CPU 314 and memory 311, memory 311 output is provided directly to ALUIN bus 324 and ALU 356 through MEMOUT register 340. Similarly, ALU 356 has direct access to memory 310 input, to directly enter or request data or instructions, through ALUOUT bus 326 and MEMIN register 362. Data words are provided to MEMIN register 362 directly from ALU output bus 326, but provision of addresses to memory 310 depends upon whether the user is utilizing direct addressing of memory 311, or MAPped addressing. In direct addressing, logical address bits 6 through 15 are provided to MEMIN register 362 through bus 326a; logical address bits 0 through 5, and bits 16 through 19, are provided through bus 326b and HIADR bus 328. When MAPping is utilized, logical address bits 6 through 15 are provided to MEMIN register 362 from ALUOUT bus 326 and bus 326a. Logical address bits 1 through 5 are provided to MAP 354 from ALU 356. MAP 354 translates logical address bits 1 through 5 into coresponding bits 0 through 5 and 16 through 19 of physical address, and provides these bits to MEMIN register 362 through HIADR bus 328.

Considering indirect access between CPU 314 and memory 311, PFP 312 performs instruction lookahead for CPU 314 by fetching from memory 310, and storing, a sequence of instructions in advance of the instruction currently being executed by CPU 314. CPU 314 maintains track of program being execution by storing a part of the logical address of the instruction currently being executed in CPU PC register 364; this number is referred to as CPU program count (CPUPC). The initial CPUPC of a sequence of instructions is loaded into CPU PC register 364 from ALU 356 through ALUOUT bus 326. CPUPC is then incremented each time an instruction is executed, by one if instructions are to be called out of memory 311 in sequence. If the current instruction calls for a jump, or similar operation, a new CPUPC is loaded into CPU PC register 364. Physical address of the initial instruction of the sequence of instructions is loaded into PFP PCR register 336 as PFPPCR. As when addresses are loaded into MEMIN register 362, physical address may be direct or MAPped. If direct, physical address is provided from ALU 356 through bus 326c. If MAP 354 is operating, bits 6 through 15 will be loaded through bus 326c and MAPped bits 1 through 5 and 6 through 19 will be loaded through HIADR bus 328 from MAP 354. At the same time, least significant bits 12 through 15 of physical address are loaded into PFP PCF 332 as PFPPCF. CPUPC therefore represents the initial logical address of the sequence, while PFPPCR and PFPPCF represent the initial physical address.

Thereafter, at each available memory access cycle not required for other purposes, e.g., by CPU 314 or I/O devices 316, physical address PFPPCR in PFP PCR register 336 can be placed on MEMIN bus 320 to read out the corresponding stored instruction from memory 311. A word requested by PFPPCR and appearing on MEMOUT bus 318 is stored in PFP memory 330 at an address determined by PFPPCF. PFPPCR and PFPPCF are incremented whenever a word is read from memory 311. PFP PCR register 336 thereby generates and tracks requested addresses; PFP PCR register 332 tracks fetched addresses and selects storage addresses in PFP memory 330. WCB 338 compares addresses requested by PFPPCR to addresses written into by CPU 314 and provides a warning if CPU 314 writes into the instruction addresses requested by PFP 312.

Transfer of words from PFP memory 330 to CPU 314 is controlled by CPU PC register 364 and PFPRDY logic 334. CPUPC stored in CPU PC register 64 is provided as read address to PFP memory 330. Instructions in PFP memory 330 are thereby transferred onto PFP bus 322 and are available to microinstruction logic 342 and IR 346 for use as required by the program. PFPRDY 334 compares PFPPCF write addresses to CPUPC read addresses and indicates to CPU 314 whether PFP 312 has the next instruction required by CPU 314.

Turning to other features of CPU 314 ERCC logic 319 monitors all data or instruction words written into or read from memory 311. ERCC 319 generates error correcting bits of words written into memory 311 through MEMIN bus 320. If a readout word containing an error appears on MEMOUT bus 318, ERCC logic 319 inhibits memory 311 output and generates a corrected word. ERCC logic 319 drives the corrected word onto MEMOUT bus 318 in place of the erronous word. Transfer bus 348 allows words on PFP bus 322 to be transferred directly to ALU 356 through ALUIN bus 24. Short Effective Address bus 350 allows the eight least significant bits of the word on PFP bus 322 to be transferred to ALUIN bus 324 as a short effective address, i.e., to generate a memory address relative to a currently known memory address. Register 352 allows ALU 356 output on ALUOUT bus 326 to be transferred onto PFP bus 322, e.g., as an input to microinstruction logic 342, IR 346, or MAP 354. SWAP bus 360 allows bytes on ALUOUT bus 326 to be reversed and placed on ALUIN bus 324 as an input to ALU 356. Transfer bus 366 allows an address on HIADR bus 328 to be transferred onto ALUIN bus 324.

Referring to I/O devices 316 and Console ROM 358, I/O data channel 368 and I/O busses 370 and 372 permit data to be transferred between ALUIN bus 324 or ALUOUT bus 326 and an external device. Similarly, UART 376 permits transfer of data and instructions between ALUIN bus 324 or ALUOUT bus 326 and an external device connected to I/O ASCII bus 374. Console ROM 358 is an interface device allowing any external device having, e.g., an ASCII II interface, to operate as a computer console. External ASC II characters are received by UART 376, converted to binary code, and placed on ALUIN bus 324. They are processed using ALU 356 and appear on ALUOUT bus 326 as Console ROM 358 addresses. Addresses on ALUOUT bus 326 are then translated into machine language instructions by Console ROM 358.

Having described architecture and operation of computer 310 on block diagram level, structure and operation of a sub-memory 313, PFP 312, microinstruction logic 342, and Console ROM 358 will be discussed in detail.

3. Sub-memory 313 (FIGS. 5-24)

Each sub-memory 313 may be accessible as a 128K (K=1024) word by 21-bit wide dynamic memory mounted on a single circuit board with four-way interleave and separate input and output busses. A particular structure of sub-memory 313 allows up to eight such boards to be connected in parallel, providing up to one megaword capacity for memory 311. It is to be understood that other sub-memory 313 structures may be used. E.g., sub-memory 313 may be 16 or 32 bits wide or may contain other than 128K words. Sub-memory 313 cycle period is 400 nanoseconds and input/output bus cycle period is 100 nanoseconds. Read access time is 500 nanoseconds, write access time is 200 nanoseconds, and refresh interval is 12.8 microseconds. It is to be understood that other parameters and periods may be used.

Sub-memory 313 structure will first be described on a block diagram level, followed by a glossary keyed to the block diagram defining sub-memory 313 signals useful in understanding sub-memory 313 operation. Sub-memory 313 operation will then be discussed on the block diagram level and with aid of timing diagrams.

Detailed schematics of circuitry used in a preferred embodiment of sub-memory 313 will then be presented and certain features of sub-memory 313 will be summarized.

A. Sub-memory 313 Structure (FIG. 5)

Figure 5:
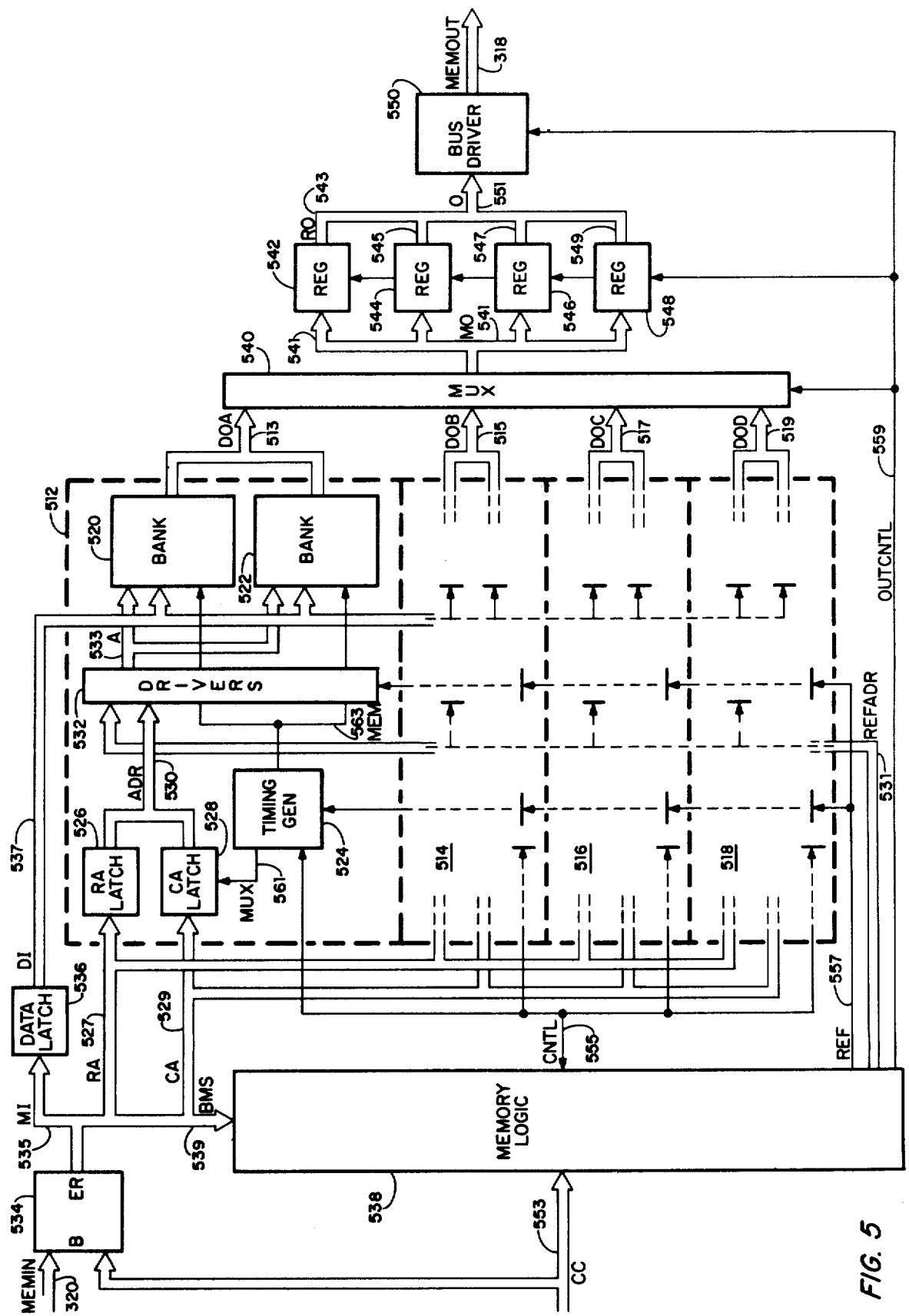
FIG. 5 is a block diagram of a sub-memory.

Referring to FIG. 5, a block diagram of a sub-memory 313 is shown. Sub-memory 313 is organized as four indentical memory modules, 512, 514, 516, and 518. Modules 514, 516, and 518 are shown in skeleton form, without the detail shown in module 512, to enhance clarity of presentation. Thus, structure and operation of modules 512 to 518 will be discussed with reference to module 512. Data and address busses are indicated by parallel lines and control busses by single, heavy lines.

Each module comprises two identical random access memory (RAM) banks, 520 and 522, timing generator 524, row address latch 526, column address latch 528, and memory driver circuits 532. As will be shown in circuit descriptions below, each RAM bank 520 or 522 may comprise 21 memory elements. Each element may be 16K long (16,384 words) by 1 bit wide random access memory (RAM) internally arranged as 128 rows by 128 columns. The 21 memory elements are, therefore, capable of storing 16K 21-bit words.

MEMIN bus 320 is connected to inputs of buffer circuitry 534, which provides corresponding outputs on Memory Input (MI) bus 535. 21 lines of MI bus 535 are connected to inputs of data latch 536, and Data Input (DI) bus 537 is connected directly to data inputs of banks 520 and 522 of modules 512 to 518.

Board, Module, and Bank Select (BMS) bus 539 is connected between MI bus 535 and memory logic 538 inputs. Row Address (RA) bus 527 and Column Address (CA) bus 529 are connected, respectively, from MI bus 535 to inputs of row address latches 526 and column address latches 528 of modules 512 to 518. Latches 526 and 528 outputs are connected as Address (ADR) bus 530 to inputs of driver circuits 532. Refresh Address (REFADR) bus 531 from memory logic 538 connects to other inputs of driver circuits 532 of modules 512 to 518. Array Address (A) busses 533 are connected from driver circuits 532 to address inputs of banks 520 and 522.

Data outputs of banks 520 and 522 of each memory module are wire ORed to comprise data output (DO) busses DOA bus 513 to DOD bus 519 of, respectively, modules 512 to 518. DOA bus 513 to DOD bus 519 are connected to inputs of output multiplexor (MUX) 540. Multiplexor output (MO) bus 541 is connected to inputs of output registers 542 to 548. Register Output (RO) busses 543 to 549 are wire ORed to comprise Output (O) bus 551 to bus driver circuit 550 input. Bus driver 550 output is connected to MEMOUT bus 318. Control line MOENB (not shown for clarity of presentation) is connected from bus driver 550 output to an input of, e.g., CPU 314.

Control and clock (CC) bus 321 is connected between memory logic 538, buffer 534, CPU 314, and PFP 312. Memory logic 538 and timing generators 534 of modules 512 to 518 are interconnected by memory control (CTL) bus 555. Refresh Control (REF) bus 557 from logic 538 is connected to inputs of timing generators 524 and driver circuits 532 of modules 512 through 518.

Output Control (OUTCNTL) bus 559 from memory logic 538 is connected to inputs of output multiplexor 540, output register 542 to 548, and bus driver 550. Although not shown, for clarity of presentation, control line DATAINLATCH from logic 538 is connected to an input of data latch 536 and control line MEMWRITE is connected from buffer 534 to inputs of latches 526 and 528. Control line MEMSTART from buffer 534 is connected to a logic 538 input.

Address Multiplexor (MUX) busses 561 are connected to inputs of latches 526 and 528 of modules 512 to 518. Module Control (MEM) busses 563 are connected through driver circuits 532 to inputs of banks 520 and 522 of modules 512 to 518.

B. Sub-memory 313 Signal Glossary

The following glossary identifies and defines, for purposes of following discussions, each signal present in the busses and control lines identified in sub-memory 313 structure above. Other signals will be introduced and defined, as necessary, during discussions of detailed circuitry of sub-memory 313.

(1) MEMIN bus 320: (MEMORY IN) 21 line input bus from CPU 314 or PFP 312 carrying data and addresses.

(2) CC bus 553: (Control and Clock) Carries control and clock signals between buffer 534, memory logic 538, CPU 314, and PFP 312.
  (a) MEMWRITE: (MEMORY WRITE) Control signal indicating data is to be written into sub-memory 313.
  (b) MEMSTART: (MEMORY START) Control signal indicating that a sub-memory 313 read or write cycle is to be initiated.
  (c) INHSEL: (INHIBIT SELECT) Sub-memory 313 inhibit; allows multiple devices using same address field as memory 311 to be connected to MEMIN bus 320 and MEMOUT bus 318 without addressing conflict.
  (d) MEMWAIT: (MEMORY WAIT) Delays sub-memory 313 operation after sub-memory 313 has been addressed; used when sub-memory 313 interfaces with, e.g., a slower memory.
  (e) 20CLK: 50 nanosecond clock signal.
  (f) MEMCLK: 100 nanosecond clock in phase with 20CLK.

10CLK: 100 nanosecond clock phase synchronized with 20CLK.

(g) PWROK: (POWER OKAY) Signal from the computer power supply indicating imminent occurrence of a power failure.

(h) MEMSORRY: (MEMORY SORRY) Control signal from sub-memory 313 to CPU 314 indicating that a requested memory address is not presently available; the memory module in which it is located is currently executing a memory read or write cycle.

(i) MOENB: (MEMORY OUTPUT ENABLE) Signal from bus driver 550 to, e.g., CPU 314, indicating a readout word from memory 313 is present on MEMOUT bus 318.

(j) MODIS: (MEMORY OUTPUT DATA INHIBIT) Inhibit signal from, e.g., ERCO logic 319 in CPU 314, inhibiting sub-memory 313 output to MEMOUT bus 318.

(3) MEMOUT bus 318: (MEMORY OUT) Sub-memory 313 21 line output bus.

(4) Internal Data and Address Busses:

(a) MI bus 535: (BUFFERED MEMORY IN) 21 line data and address bus.

(b) DI bus 537: (DATA IN) 21 line data bus to all banks 20 and 522.

(c) DOA/DOD busses 513/519: 21 line data output busses from memory modules 512 through 518.

(d) MO bus 541: (MEMORY MULTIPLEXOR OUTPUT) 21 line data output bus from output multiplexor 540.

(e) RO busses 543–549: 21 line data output busses from registers 542 through 548.

(f) O bus 551: (OUTPUT) 21 line bus driver 550 input bus.

(g) RA bus 527: (ROW ADDRESS) Seven line bus of row address information from MI bus 535.

(h) CA bus 529: (COLUMN ADDRESS) Seven line bus of column address information from MI bus 535.

(i) ADR bus 530: (READ/WRITE ADDRESS) Seven line bus of row or column address information.

(j) REFADR bus 531: (REFRESH ADDRESS) Seven line bus of refresh address information.

(k) A bus 533: (ADDRESS) Seven line bus of address information from ADR bus 530 or REFADR bus 531.

(l) BMS bus 539: Board, module, and bank selection address bits from MI bus 535.

(5) Control busses and Lines:

(a) CNTL bus 555: (MEMORY CONTROL)

(a1) MODSTART(512, 514, 516, 518): (MODULE START) Signals from logic 538 to timing generators 524 of modules 512 to 518 indicating that the respective module is to initiate a memory read or write cycle.

(a2) MOD(512, 514, 516, 518) SEL (0, 1): (MODULE SELECT) Signals from logic 538 to timing generators 524 of modules 512 to 518 indicating that selected address lies in, respectively, bank 520 (0) or bank 522 (1) of the respective module.

(a3) MOD(512, 514, 516, 518) RDY: (MODULE READY) Signals from respective timing generators 524 of modules 512 to 518 indicating whether the respective memory modules are executing a read/write cycle, or are available for access.

(a4) ACCESSMOD(512, 514, 516, 518): (ACCESS MODULE) Signals from respective timing generators 524 of modules 512 to 518 to logic 538 indicating data requested from the respective module is available on the respective module output bus DOA bus 513 through DOD bus 519.

(a5) MEMCLK, 10CLK, 20CLK: Buffered clock signals from logic 538 to timing generators 524 of modules 512 to 518; MEMCLK, 10CLK, 20CLK are used in memory logic 538.

(b) MUX bus 561: (ROW/COLUMN ADDRESS MULTIPLEX)

(b1) RADRENBMOD(512, 514, 516, 518) (ROW ADDRESS ENABLE) Enabling signal to row address latch 526 to transfer row address onto ADR bus 530.

(b2) CADRENBMOD(512, 514, 516, 518) (COLUMN ADDRESS ENABLE) Enabling signal to column address latch 528 to transfer column address onto ADR bus 530.

(b3) MOD(512,415,516,518)LATCH: Clock signal to latches 526 and 528 to transfer row and column addresses on RA bus 527 and CA bus 529 into latches 526 and 528.

(c) MEM bus 563: (MODULE CONTROL)

(c1) WE: (WRITE ENABLE) Write enable signal to memory elements in banks 520 and 522.

(c2) CAS: (COLUMN ADDRESS STROBE) Column address strobe signal to memory elements in banks 520 and 522, causing column addresses on A bus 533 to be transferred into memory elements.

(c3) RAS(0, 1): (ROW ADDRESS STROBE) Row address strobe signals to, respectively, banks 520 and 522 causing row address information on A bus 533 to be transferred into memory elements of banks 520 and 522 respectively.

(d) REF bus 557: (REFRESH CONTROL)

(d1) REFADRSET: (REFRESH ADDRESS SET) Refresh control signal to timing generators 524, disabling row address latch 526 output for the duration of refresh cycle.

(d2) REFADRCLR: (REFRESH ADDRESS CLEAR) Refresh control signal to timing generators 524, disabling column address latch 528 output for the duration of refresh cycle; also pre-sets timing generators 524 circuitry for normal non-refresh operation after refresh cycle.

(d3) REFRASSET: (REFRESH ROW ADDRESS STROBE SET) Refresh control signal to timing generators 524, enabling signals RAS(0,1) from timing generators 524 to RAM array banks 520 and 522.

(d4) REFRASCLR: (REFRESH ROW ADDRESS STROBE CLEAR) Refresh control signal to timing generators 524, disabling signals RAS(0, 1) at conclusion of refresh cycle; to driver circuits 532 disabling CAS from timing generators 524 to RAM array banks 520 and 522 during battery backup operation.

(e) OUTCNTL bus 559: (OUTPUT CONTROL)

(e1) OUTSEL(U,V): (OUTPUT SELECT) A two binary bit control signal to output multiplexor 540 selecting data on one of DOA, DOB, DOC, or DOD busses to appear on MO bus 541.

(e2) ACCESSCLK(542, 544, 546, 548): (ACCESS CLOCK) Clock signals to registers 542 to 548, causing output data present on MO bus 541 to be transferred into the respective output register.

(e3) OUTPUTSEL(542, 544, 546, 548): (OUTPUT SELECT) Enabling signals to output registers 542 to 548, causing contents of selected register to appear upon O bus 551.

(e4) MEMDRIVE: (MEMORY DRIVE) Enabling signal to bus driver circuit 550, causing data appearing on O bus 551 to appear on bus MEMOUT 318.

(f) DATAINLATCH: (DATA INPUT LATCH) Clock signal from logic 538 to data latch 536, causing data on MI bus 535 to be transferred into data latch 536.

(g) MEMWRITE: (MEMORY WRITE) Write enable signal from buffer 534 to timing generators 524.

(h) MEMSTART: (MEMORY START) Signal from buffer 534 to logic 538 initiating a read or write cycle of memory 313.

C. Operation of Sub-memory 313 (FIG. 5)

Operation of sub-memory 313 will be described with aid of FIG. 5. Discussion of signals referred to in the above signal glossary will be generally deferred to a following timing diagram and detailed circuitry descriptions of sub-memory 313; reference to signals will be made as appropriate to illustrate sub-memory 313 operation.

Four basic modes of operation of sub-memory 313 are memory read, memory write, refresh and battery backup. Memory read and memory write are initiated from CPU 314 or Prefetch Processor 312. Refresh and battery backup mode are primarily controlled by sub-memory 313. Read and write cycles will be described first, followed by a description of refresh operation, and finally by battery backup mode.

During or write operation, memory modules 512 to 518 each operate as a separate and independent memory unit. Each module may require 400 nanoseconds to execute a read or write cycle. Because of independent operation of each module, CPU 314 or PFP 312 may initiate a read or write at 100 nanosecond intervals, i.e., the memory bus cycle period as determined by 20CLK and MEMCLK. A read or write cycle of a single memory module, however, may be initiated only every fourth memory bus cycle, i.e., 400 nanoseconds. Read or write cycles of modules 512 to 518 may be initiated in any desired sequence, so long as the 400 nanosecond limitation on successive read or write cycles is observed. Memory readout words appear on bus MEMOUT 318 in the sequence in which read cycles are initiated; each readout word appears 400 nanoseconds after read cycle is initiated.

Turning first to read cycle operation, each read request comprises an address on MEMIN bus 520 and a MEMSTART pulse through CC bus 553. MEMSTART will be provided to memory logic 538 from buffer 534 and the address will appear on MI bus 535. Six board, module, and bank selection address bits are provided to to logic 538 through BMS bus 539. Seven bits of row address and seven bits of column address appear, respectively, on RA bus 527 and CA bus 529. Assuming that the selected address is located within memory module 512, logic 538 will decode board, module, and bank address bits and initiate module 512 read cycle. Row and column address information on RA bus 527 and CA bus 529 will be transferred, respectively, into row address latch 526 and column address latch 528. Row and column addresses are then transferred sequentially onto ADR bus 530 and through driver circuits 532 and A bus 533 to address inputs of banks 520 and 522. Row and column addresses will be accompanied by bank control signals on MEM bus 563. Requested word data from bank 520 or bank 522 will appear on DOA bus 513. Timing Generator 524 will provide ACCESSMOD 512 to logic 538 to indicate presence of readout word on DOA bus 513. Logic 538 then provides OUTSEL(U,V) to output multiplexor 540 to transfer readout word on DOA bus 513 onto MO bus 541, and thus to registers 542 to 548 inputs. Logic 538 will then provide ACCESSCLK, as will be described further below, to one of registers 542 to 548 to transfer readout word on MO bus 541 into the selected register. Logic 538 will then, again as will be described further below, provide OUTPUTSEL to the selected register and MEMDRIVE to bus driver 550 to transfer readout word from the selected register through O bus 551 and onto MEMOUT bus 318. MEMDRIVE causes bus driver 550 to generate MOENB to indicate readout word is present on MEMOUT bus 318.

Having described a readout cycle of a single module interleaved readout operation of the four modules of sub-memory 313 will now be described. As stated above, read requests may be made to modules 512 to 518 in any desired sequence, with due regard to the 400 nanosecond limitation. Readout words will appear on MEMOUT bus 318 in the sequence requested, with each readout appearing 400 nanoseconds after read initiation. Also, MEMIN bus 320 and MEMOUT bus 318 were described as being asynchronous and independent.

Maintenance of sequence of readout requests and readout words, and synchronism between MEMIN bus 320 and MEMOUT bus 318, is provided by output multiplexor 540, registers 542 to 548, and bus driver 550. Because of independent operation of modules 512 through 518, readout words appear on busses DOA 513 to DOD 519 in the sequence in which read cycles of memory modules 512 to 518 were initiated. Due to the 100 nanosecond minimum interval between memory 313 read requests, only one of busses DOA 513 through DOD 519 will have a valid word present at any given time. There will be a minimum interval of 100 nanoseconds between successive word appearances on busses DOA 513 to DOD 519. ACCESSMOD's (CNTL bus 555) from timing generators 524 of modules 512 to 518 are used by logic 538 to control multiplexor 540; so that readout words from memory modules 512 to 518 appar on MO bus 541 in the same sequence as on busses DOA 513 through DOD 519, i.e., in sequence of read requests. For each ACCESSMOD from a memory module, logic 538 generates an ACCESSCLK (OUTCNTL bus 559) to one of registers 542 to 548, and does so in fixed sequence. The first word is transferred into register 542, second into register 544, and so on. Fifth word is loaded again into register 542, and so on.

Logic 538 provides OUTPUTSEL (OUTCNTL bus 559) to registers 542 to 548 to transfer output register contents onto O bus 551. OUTPUTSEL's are generated in same sequence as ACCESSCLK, so that readout words are read onto MEMOUT bus 318 in same sequence as read requests.

As referenced in signal glossary above, sub-memory 313 is provided with two clock signals at the memory bus cycle rate, 10CLK and MEMCLK. In general, operation of memory modules 512 to 518 is controlled by 10CLK. Transfer of data through multiplexor 540 and into registers 542 to 548 is also controlled by 10CLK. Transfer of words out of registers 542 to 548 and onto MEMOUT bus 318 (i.e., OUTPUTSEL and MEMDRIVE) is controlled by MEMCLK. This allows MEMOUT bus 318 to operate independently of MEMIN bus 320. Transfer of words onto MEMOUT bus 318 may be suspended by inhibiting MEMCLK. Previously requested readouts will continue to be transferred into registers 542 to 548, where they will be stored until MEMOUT bus 318 operation resumes. No requested readout word will be lost because sub-memory 313 suspends acceptance of read and write requests until MEMOUT bus 318 operation resumes. Operation of MEMOUT bus 318 can thereby be suspended for an unlimited time and sub-memory 313 is capable of handling four outstanding memory requests.

Turning to a write cycle, a write request requires a write address on MEMIN bus 320 and concurrent MEMSTART and MEMWRITE signals through CC bus 553. The word to be written into sub-memory 313 is placed on MEMIN bus 320 during 100 nanosecond bus cycle immediately following write address, MEMSTART, and MEMWRITE. A write request therefore requires two consecutive memory bus cycles, i.e., 200 nanoseconds. As in a read cycle, address bits are transferred through busses BMS 539, RA 527 and CA 529 to logic 538 and to inputs of row and column address latches 526 and 528 of modules 512 to 518. MEMWRITE is provided directly from buffer 534 to latches 526 and 528. Logic 538 decodes BMS bus 539 address bits and MEMWRITE and initiates write cycle of timing generator 524 of the memory module containing the write address. The word to be written into memory 313 appears on MI bus 535 100 nanoseconds after-write address, and is transferred into data latch 536 by DATALATCH from memory logic 538. The word appears on DI bus 537 and is provided concurrently to data inputs of banks 520 and 522 of modules 512 to 518. As in a read cycle, timing generator 524 of the selected memory module sequentially transfers row and column addresses through ADR bus 530 and A bus 533 to banks 520 and 522. Control signals are concurrently provided through MEM bus 563 and the word is transferred into the selected address. 400 nanoseconds may be normally required to execute a write cycle. Again, because of independent operation of memory modules, write requests may be initiated in any desired sequence so long as a single module is not requested twice within 400 nanoseconds. Similarly, memory read and write requests may be intermixed in any desired sequence by observing the 400 nanosecond limitation for a single module.

Actual memory elements of banks 520 and 522 are, as stated above, dynamic MOS RAMs and require periodic refreshing to avoid data loss. As previously stated, refresh operation is primarily controlled by sub-memory 313 and maximum interval allowable between refresh cycles for the particular RAM's used in the preferred embodiment is 15.625 microseconds. Refresh circuitry in logic 538 counts 12.8 microsecond intervals. After 6.4 microseconds, refresh circuitry begins watching for a memory bus cycle in which none of the four memory modules are executing a read or write cycle. If such a bus cycle occurs before 6.4 microseconds after start of the 12.8 microsecond refresh interval, refresh circuitry seizes the cycle and executes a simultaneous refresh cycle on all four memory modules. If such a cycle does not appear within 6.4 microseconds, refresh circuitry pre-empts concontrol of sub-memory 313 and executes a refresh cycle. During refresh, logic 538 controls timing generators 524 through REF bus 557 to provide control signals to banks 520 and 522 through MEM bus 563. Concurrently, control signals to driver circuits 532 through REF bus 557 transfer refresh addresses on REFADR bus 531 onto A bus 533. All columns of a single row of addresses within banks 520 and 522 are refreshed during a single refresh cycle. Refresh circuitry generates successive row addresses on successive refresh cycles, so that all rows of banks 520 and 522 have been refreshed after 128 refresh cycles.

As previously stated, two sequential read or write requests cannot be made to the same memory module within a 400 nanosecond interval; nor can such a request be made during refresh. If such a request interference occurs, this event is detected by logic 538 by comparing decoded BMS address bits to signals MODRDY provided by module timing generators 524. Logic 538 then provides MEMSORRY to CPU 314 through CC bus 553. When MEMSORRY occurs, MEMCLK is suspended to CPU 314, PFP 312, and all other devices interfacing with MEMOUT bus 318. MEMCLK resumes when previous requested read or write cycle is completed. This is referred to as an extended memory clock cycle.

As will be discussed below in regard to PFP 312, request interferences between PFP 312 and CPU 314 or other devices are avoided. A signal from CPU 314 to PFP 312 indicates when CPU 314 is requesting memory access, causing PFP 312 to defer memory requests to the next available memory bus cycle. Likewise, a MEMSORRY arising from a PFP 312 generated request and a prior request from another device causes PFP 312 to defer request but does not inhibit MEMCLK.

Turning to battery backup operation, this mode is entered by sub-memory 313 when there is a failure of power to computer 310. Failure is indicated by PWROK to logic 538 through CC bus 553 from computer 310 power supply. In such an event, sub-memememory 313 circuitry goes to power off standby, with exception of refresh circuitry, parts of timing generators 524, driver circuits 532, and banks 520 and 522. Sub-memory 313 reverts out of battery backup mode when power is returned to computer 310. While in battery backup mode, banks 520 and 522 of all four modules are periodically refreshed to prevent loss of data. In this mode, refresh period is 12.8 microseconds. Sub-memory 313 switches into and out of battery backup made only during execution of a refresh cycle. At all times other than during a refresh, it is extremely difficult to ascertain the present state of operation of sub-memory 313 due to independent operation of modules 512 to 518. Further, switching into and out of battery backup mode entails switching of power to parts of logic 538 and timing generators 524 with possible random operation of sub-memory 313. During refresh cycle, however, the operating state of sub-memory 313 is definitely known and controllable. Switching is therefore performed during refresh to avoid data loss.

Having briefly described operation of sub-memory 313 on the block diagram level, sub-memory 313 operation will be presented next with aid of timing diagrams.

D. Memory 313 Timing Diagrams (FIGS. 6–13)

Operation of memory control logic 538 and memory module 512 will now be further described with aid of timing diagrams shown in FIGS. 6 to 13. The majority of timing diagram signals have been defined and discussed in signal glossary or block diagram description above. Previously undefined signals will be defined and discussed as introduced. Sequence of following discussions will follow that of block diagram operation above.

Times of occurrence of events described in following discussions are to be regarded as illustrative only and not as limiting. A time scale is provided and referred to only to enhance clarity of presentation. Actual times of occurrence will vary, e.g., due to component tolerance in the circuits involved. Also, times may change if frequencies of 20CLK, 10CLK and MEMCLK change.

Figure 6:
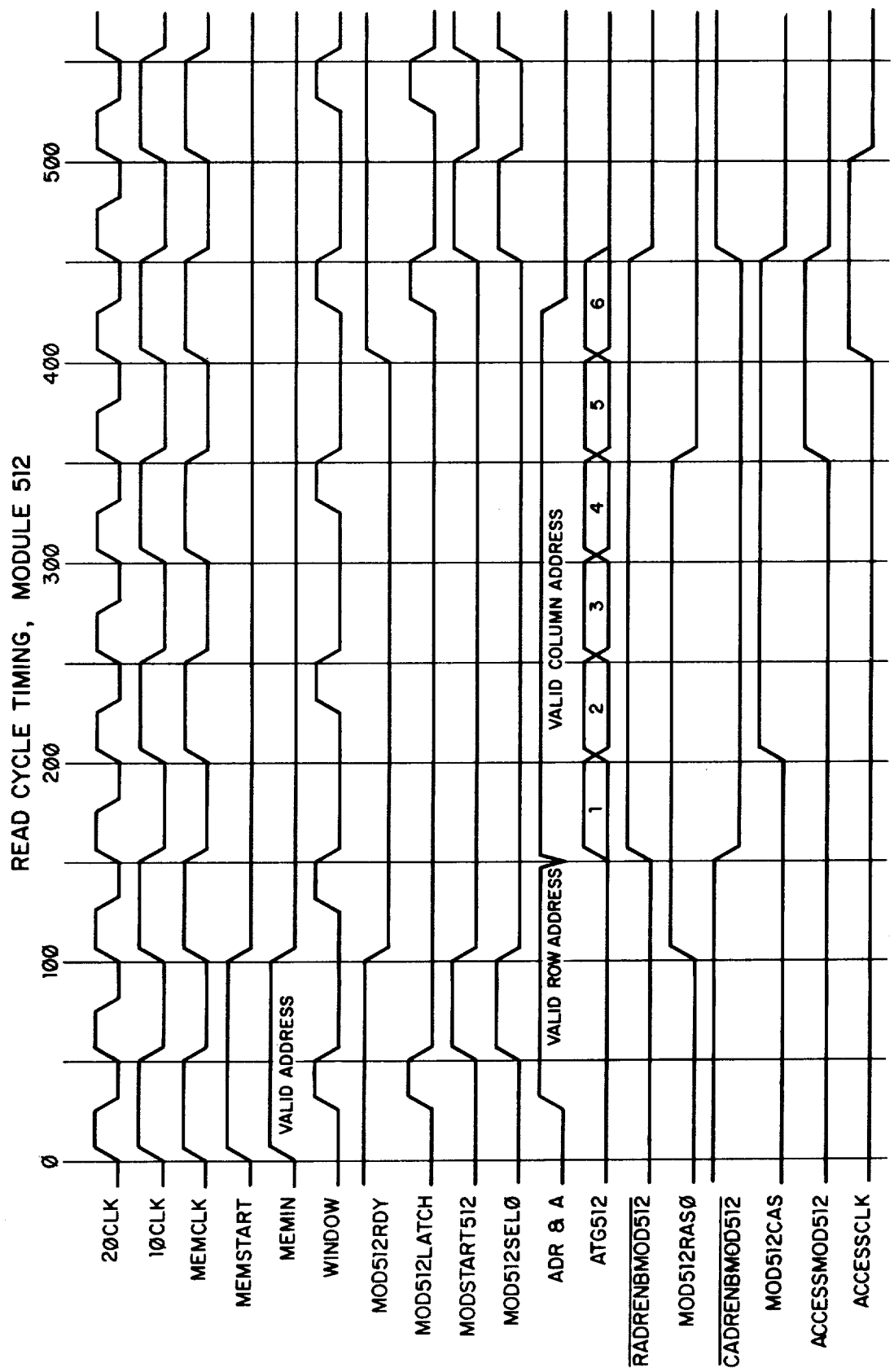
FIG. 6 is a timing diagram illustrating a read cycle of a sub-memory.

Referring to FIG. 6, a timing diagram illustrating a module 512 read cycle is shown. The numeric scale appearing across the top of FIG. 5 represents increasing time in nanoseconds (ns) from start of read cycle sequence. First three lines of FIG. 6 show clock signals 20CLK, 10CLK, and MEMCLK. Memory readout cycle is initiated by a MEMSTART, occurring at time 0 and extending for 100 nanoseconds, and a valid address on MEMIN bus 320. A signal WINDOW, shown here for the first time, is generated in logic 538 during each memory bus cycle when a valid address of data word is expected to be present on MEMIN bus 320. WINDOW is provided concurrently to modules 512 to 518 and is combined with individual MODRDY signals to provide MODLATCH in each memory module. MODLATCH in turn transfers addresses on busses RA bus 527 and CA bus 529 into latches 526 and 528 of each module. In module 512, WINDOW and MOD1-2LATCH are followed by MODSTART512 and MOD512SEL0 or MOD512SEL1 from logic 538 to timing generator 524. Whether MOD512SEL0 or MOD512SEL1 is provided to timing generator 524 depends upon whether the address lies within, respectively, bank 520 or bank 522. These signals initiate operation of timing generator 524, as indicated by MOD512RDY at 100 ns. MOD512RDY indicates that module 512 is executing a memory cycle. MOD512RDY inhibits WINDOW in module 512 so that subsequent MOD512LATCH triggers are not generated; row and column addresses transferred into latches 526 and 528 remain therein. WINDOW in modules 514 to 518 continue to transfer subsequent addresses appearing on MEMIN bus 320 into latches 526 and 528 of those modules. Modules 514 to 518 thereby continue to accept addresses until provided with MODSTART and MODSEL, indicating that last received address pertained to a particular module and initiating operation of that particular module.

Returning to FIG. 6, RADENBMOD512 to row address latch 526 from timing generator 524 causes row address information to be transferred into ADR bus 530 and A bus 533. At 100 ns, generator 524 provides MOD512RAS0 or MOD512RAS1 to banks 520 or 522, respectively, causing row address to be transferred into the selected bank. At 150 ns, generator 524 provides CADRENBMOD512 to latch 528, causing column address to be transferred onto ADR bus 530 and A bus 533. Also, timing generator 524 begins generating signals ATG1 through ATG6 at 50 ns intervals. ATG1 to ATG6 are used internally by generator 524 and will be discussed below with reference to detailed schematics.

At 200 ns, generator 524 provides MOD512CAS to banks 520 and 522, causing column address to be transferred into banks 520 and 522. This complete addressing of module 512 and readout word appears on DOA bus 513. Readout word appears on DOA bus 513 prior to 350 nanoseconds and generator 524 provides ACCESSMOD512 to logic 538 at 350 nanoseconds. ACCESSMOD512 indicates a readout word will be available on DOA bus 513. Logic 538 then generates OUTSEL(U, V) to multiplexer 540 to connect DOA bus 513 to MO bus 541. Readout word then appears at output registers 542 to 548 inputs. At 400 nanoseconds, logic 538 generates ACCESSCLK to a selected output register, causing readout word to be transferred into the selected register. Logic 538 can then provide OUTPUTSEL to the selected register and MEMDRIVE to output driver 550, causing readout word to appear on MEMOUT bus 318.

Figure 7:
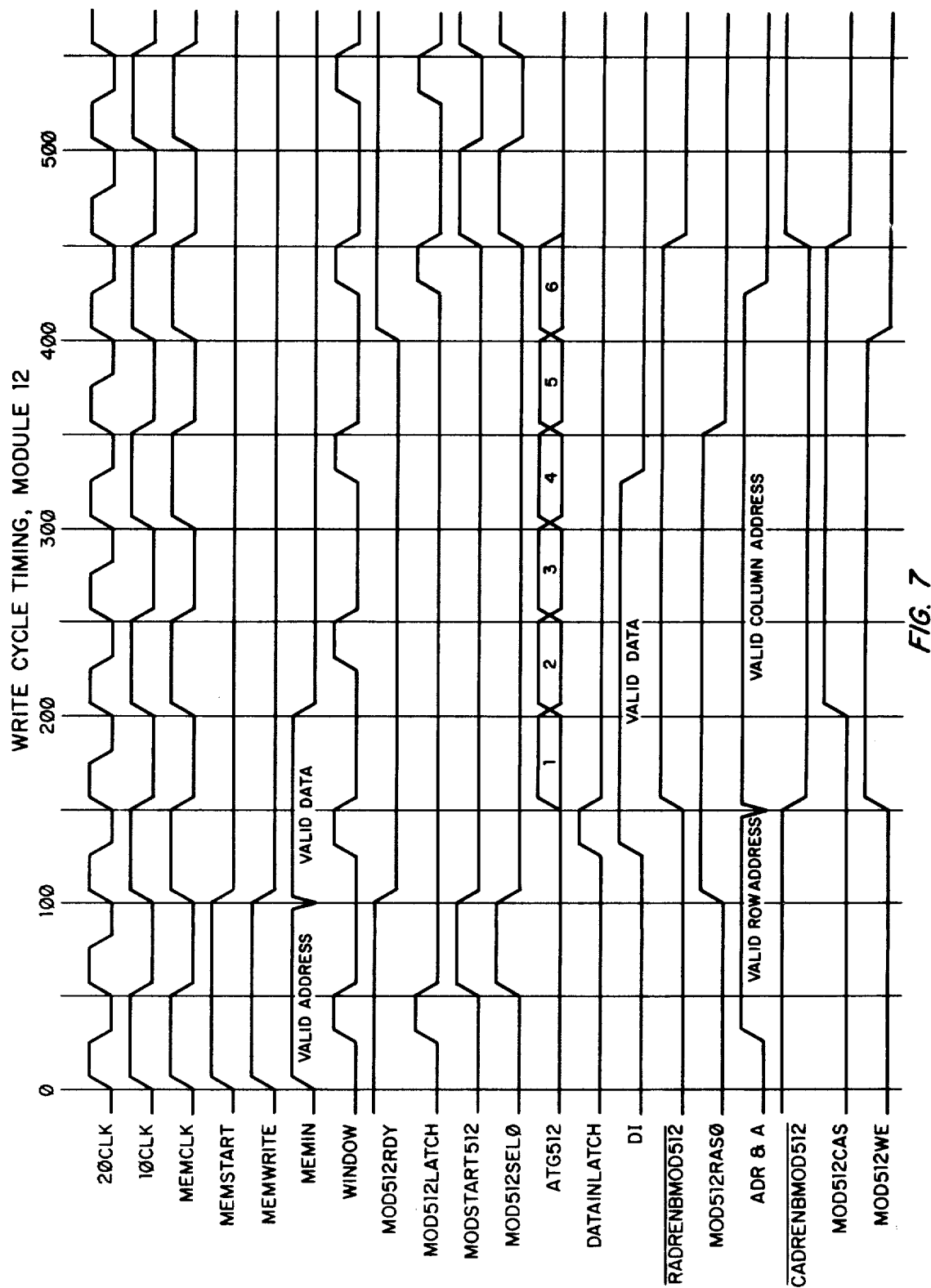
FIG. 7 is a timing diagram illustrating a write cycle of a sub-memory.

Referring to FIG. 7, a timing diagram illustrating execution of a write cycle by module 512 is shown. Sequence of events in a write cycle is very similar to that of a read cycle; only differences between read and write cycles will be discussed herein.

As shown in FIG. 7, sequence of events is identical to that of a read cycle up to 100 nanoseconds; except MEMSTART is accompanied by MEMWRITE, indicating a write cycle is to be executed. At 100 ns, a valid data word appears on MEMIN bus 320. Logic 538 generates DETAINLATCH, transferring the word into data latch 536. The word appears on DI bus 537 and is provided concurrently to data inputs of banks 520 and 522 of modules 512 to 518. Timing generator 24 provides RADENBMOD512, MOD512RAS0 or MOD512RAS1, CADRENMOD512 and MOD512CAS to banks 520 and 522 as in a read cycle.

CADRENBMOD512 is accompanied by MOD512WE, causing the word on DI bus 537 to be written into bank 520 or bank 522, as selected by MOD512RAS0 or MOD512RAS1. Write cycle is complete by 400 nanoseconds. Timing generator 524 provides ACCESSMOD512 and logic 538 provides OUTCNTL bus 559 signals to multiplexer 540, registers 542 to 548, and output driver 550. The word appearing on MEMOUT bus 318, however, is random data but, as will become apparent in the description of PFP312 below, is not accepted, e.g., by PFP312, as it appears after a write request rather than after a read request.

Figure 8:
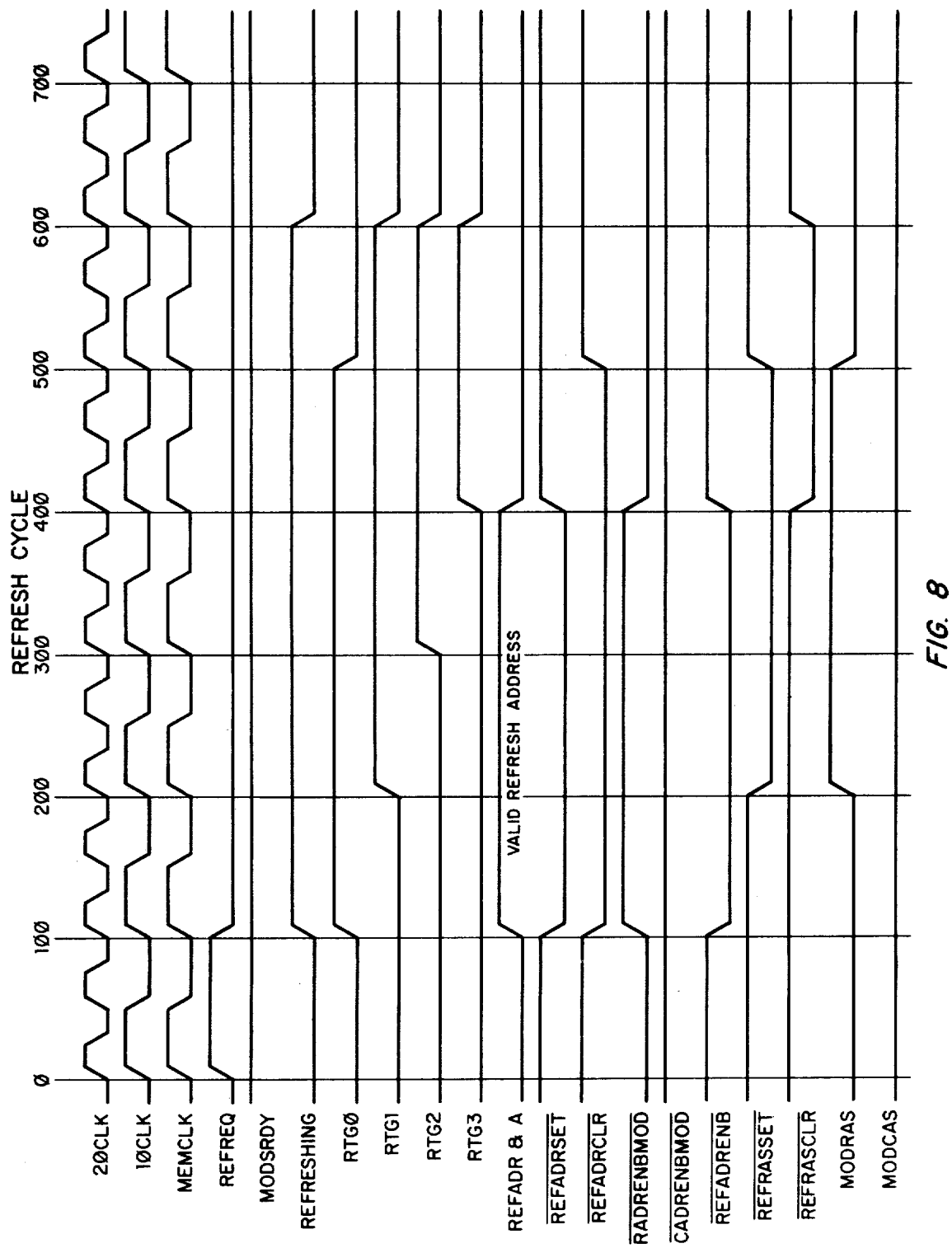
FIG. 8 is a timing diagram illustrating a refresh cycle of computer memory.

Referring to FIG. 8, a timing diagram illustrating execution of a refresh cycle by sub-memory 313 is shown. Refresh is performed on modules 512 to 518 simultaneously. Logic 538 refresh circuitry generates refresh request signal REFREQ at 12.8 microseconds interval. Refresh circuitry compares REFREQ to signal MODSRDY generated within logic 538 from MOD512RDY to MOD518RDY. MODSRDY, which will be discussed further below, indicates none of modules 512 to 518 are currently executing a memory cycle. When MODSRDY indicates modules 512 to 518 are available for a pending refresh cycle and memory 313 has not received a MEMSTART, as indicated in FIG. 8 at 0 ns, refresh circuitry assumes control of sub-memory 313.

Refresh circuitry generates REFRESHING, at 100 nanoseconds, which is used internally by logic 538 to prevent sub-memory 313 from accepting subsequent memory requests. A memory request received after REFRESHING appears will result in a MEMSORRY response to the requestor. Refresh logic simultaneously generates signals REFADRSET and REFADRCLR to timing generators 524 of modules 512 to 518. REFADRSET and REFADRCLR disable outputs RADENBMOD and CADRENBMOD from timing generators 524, thereby disabling row and column address outputs of latches 526 and 528 of modules 512 to 518. REFRASCLR is also applied to driver circuits 532 where it is used as an inhibit input for signals CAS and WE from timing generator 524 to banks 520 and 522. This input is not intended to be effective during a normal refresh operation but, as will be discussed below, inhibits CAS and WE during battery backup mode. REFRESHING inhibits generation of MODSTART and MODSEL by logic 538; so that timing generators 524 remain inactive during refresh cycle and provide no bus MEM 563 signals to banks 520 and 522, except where such outputs are forced by REFRESSET and REFRESCLR. Also at 100 nanoseconds, a valid refresh address appears on REFADR bus 531, and thus on A bus 533 and address inputs of banks 520 and 522 of modules 512 to 518. REFADRENB is used internally by refresh circuitry to enable REFADR bus 531 and will be discussed below. Signals RTG0 through RTG3 are also internal to refresh circuitry, as will be discussed below, and control refresh cycle sequence. At 200 nanoseconds, refresh circuitry generates REFRASSET to timing generators 524 of modules 512 to 518. REFRASSET enables generators 524 outputs MODRAS0 and MODRAS1 to transfer refresh address into bank 520 and bank 522 address inputs of modules 512 to 518. Transfer of addresses by MODRAS initiates refresh operation within bank 520 and 522.

Refresh is completed by 400 nanoseconds, when refresh circuitry generates REFRASCLR to timing generators 524. Also at this time, REFADRSET is released while REFADRCLR remains active; this resets generator 524 to proper state for resumption of nonrefresh operation. REFADRCLR is released at 500 nanoseconds. REFRASSET is also released at this time while REFRASCLR remains active, also operating to set timing generators 524 to proper state for resumption of non-refresh operation. Release of REFRASSET terminates MODRAS0 and MODRAS1. REFRASCLR is then released at 600 nanoseconds and refresh cycle is complete. Total refresh cycle may normally require 600 nanoseconds of refresh circuitry time, but refresh of modules 512 to 518 may normally be completed in 400 nanoseconds so that modules 512 to 518 may resume read and write cycle operation.

Figure 9:
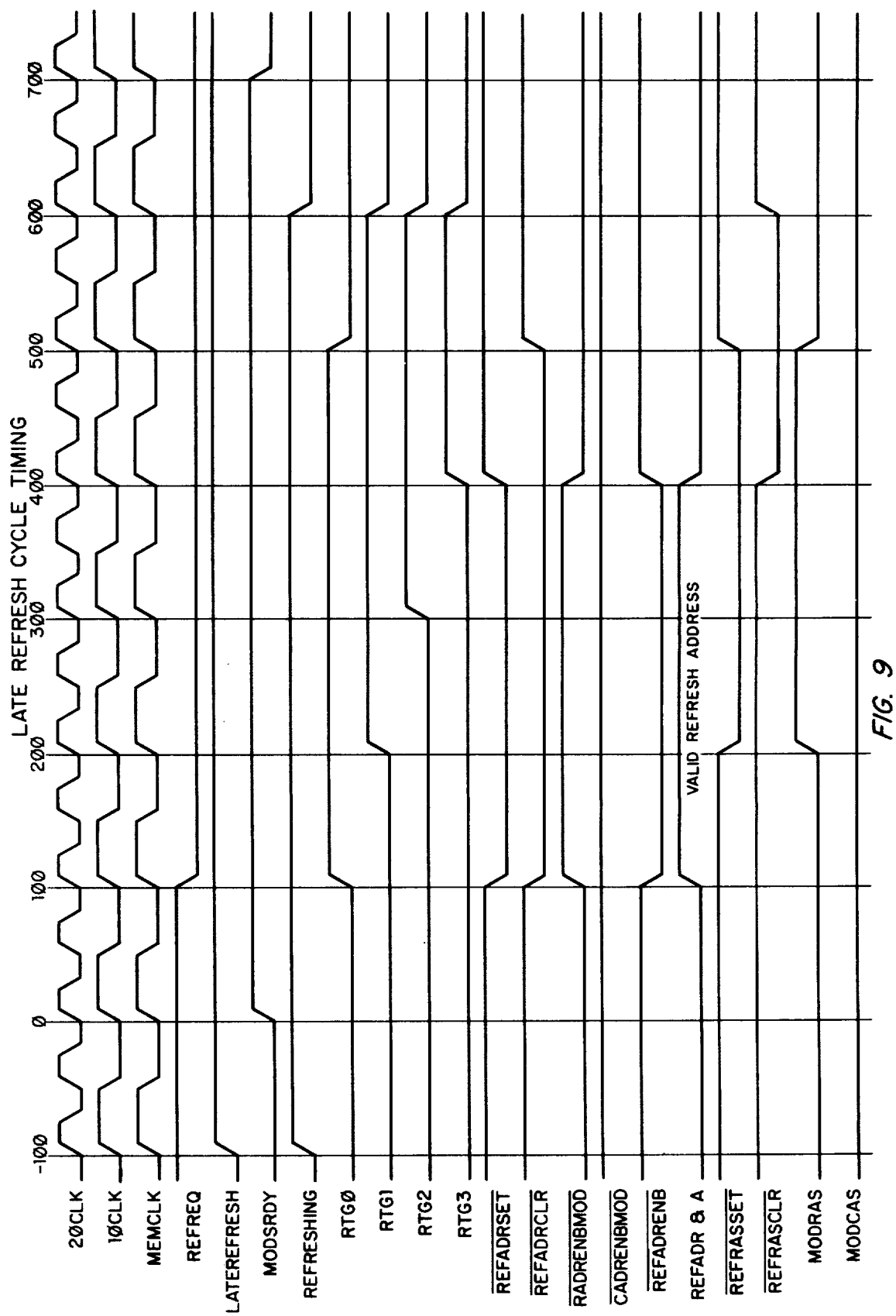
FIG. 9 is a timing diagram illustrating a late refresh cycle of computer memory.

Referring to FIG. 9, a timing diagram illustrating execution of a late refresh cycle is shown. A late refresh cycle is, with exception of first 100 nanoseconds, identical to a normal refresh cycle described above. As such, late refresh cycle will be described herein only up to 100 nanoseconds. REFREQ is shown as having been active since start of present refresh interval. MODSRDY is shown as not indicating an available memory bus cycle since start of REFREQ. At 6.4 microseconds after start of present refresh interval, indicated as 100 nanoseconds, logic 538 refresh circuitry generates LATEREFRESH. LATEREFRESH is used within logic 538 to arbitrarily seize control of sub-memory 313 and initiate a refresh cycle, as shown by REFRESHING becoming active at 100 nanoseconds. Refresh cycle begins at 0 ns, and from this time onwards late refresh cycle is identical to normal refresh cycle.

Figure 10:
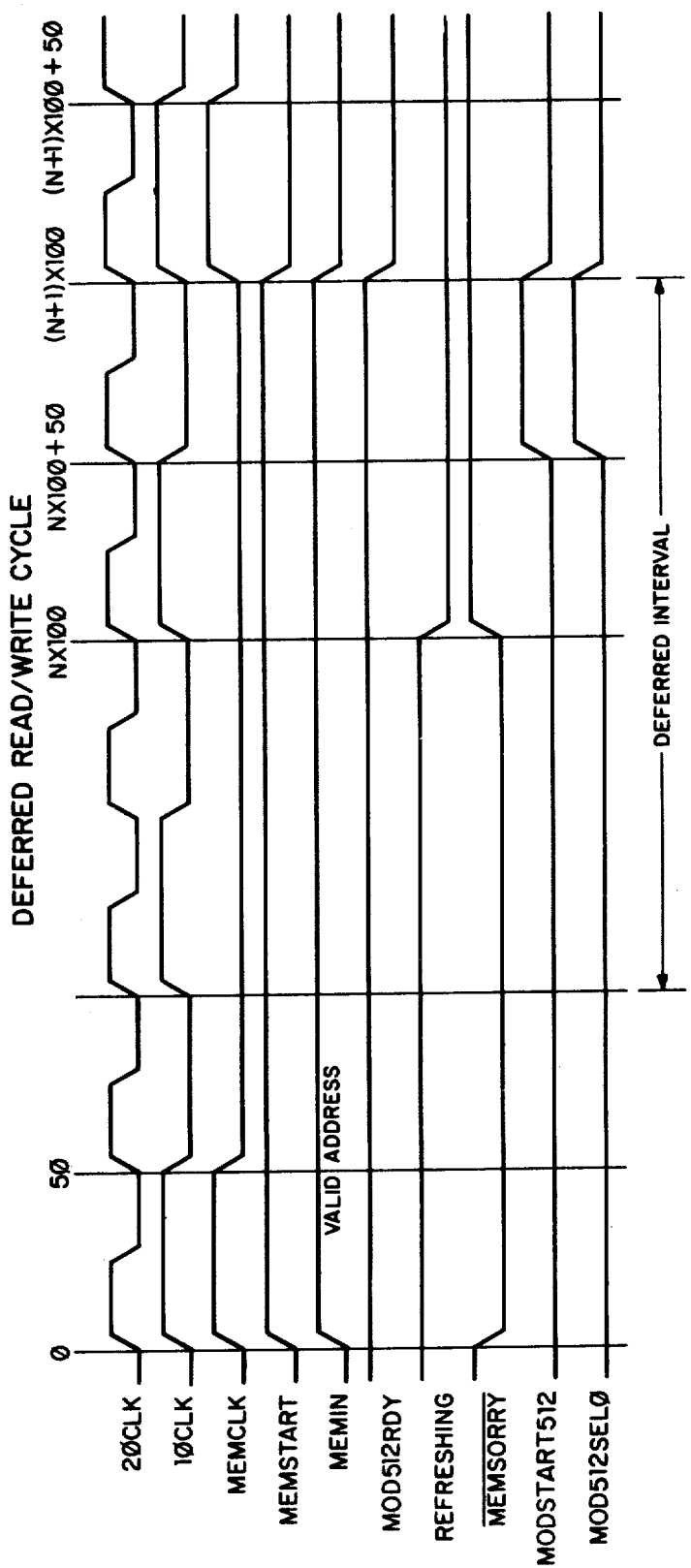
FIG. 10 is a timing diagram illustrating a deferred read/write cycle of computer memory.

Referring to FIG. 10, a timing diagram illustrating an extended memory bus cycle resulting from a memory request interference is shown; i.e., a memory request occurring during a refresh cycle or requesting access to a memory module presently executing a read or write cycle. As shown, MEMSTART occurs at 0 ns, accompanied by a valid address on MEMIN bus 520. Either REFRESHING or MODRDY of the memory module containing the newly requested address is active. Logic 538 will then generate, at 0 ns, MEMSORRY. MEMSORRY is transmitted to requestor to indicate requested address is not presently available. MEMSORRY (except for PFP312 requests) also inhibits memory bus clock, MEMCLK. MEMSORRY remains active, and MEMCLK inhibited, until N × 100 nanoseconds, where N is number of memory bus cycles by which request is deferred. Memory requestor continues to provide MEMSTART and a valid address on MEMIN during entire deferred time. At N × 100 nanoseconds, refresh cycle, or read or write cycle, of the addressed module is complete. MEMSORRY returns inactive state. Sub-memory 313 then accepts MEMSTART and address on MEMIN bus 320, as indicated by MODSTART and MOD512RDY occurring at (N+1) × 100 nanoseconds after termination of MEMSORRY. The addressed module proceeds to execute requested read or write cycle. As shown, MEMCLK resumes 100 nanoseconds after release of MEMSORRY.

Figure 11:
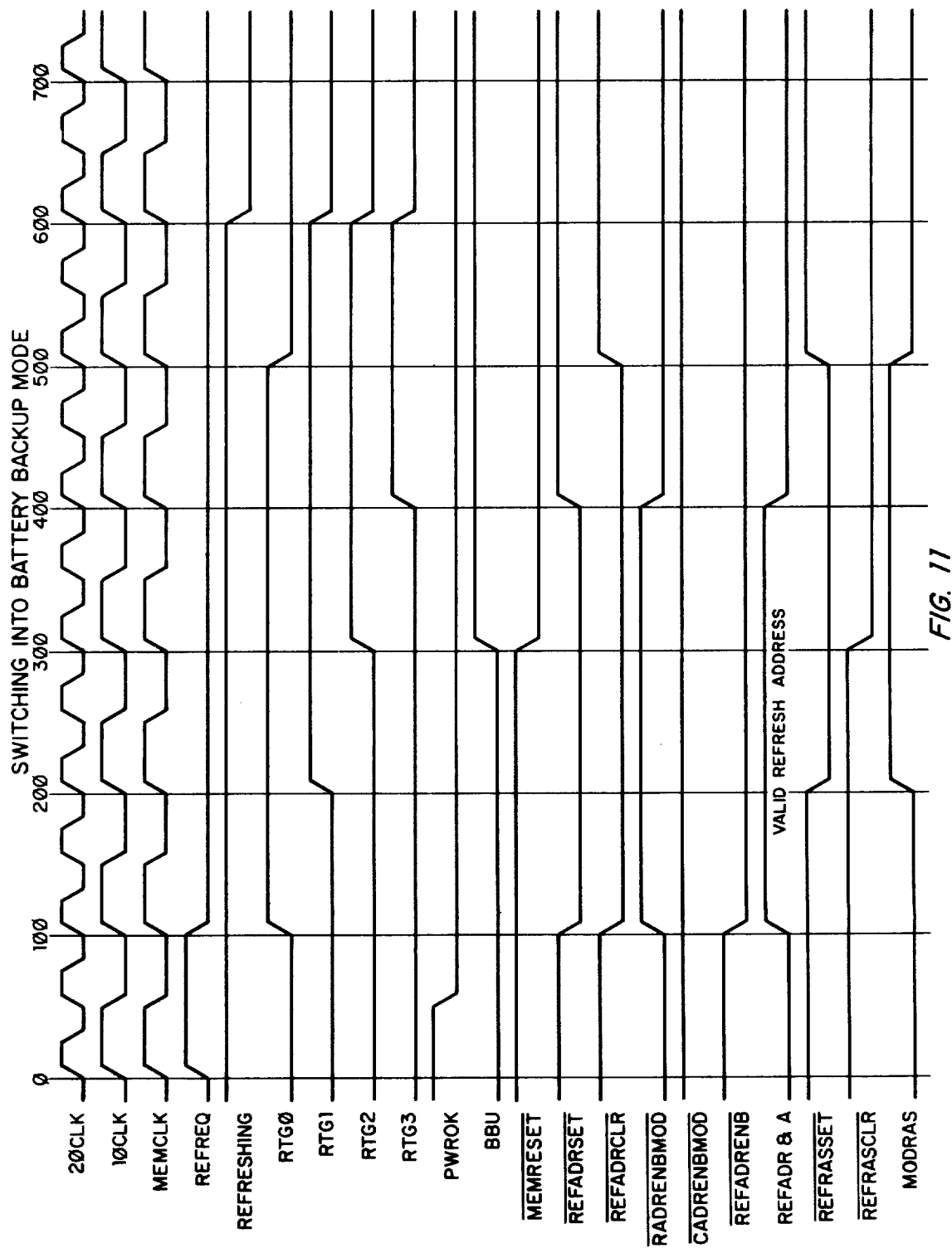
FIG. 11 is a timing diagram illustrating computer memory switching into battery backup mode.

Turning to the battery backup mode, a timing diagram illustrating sub-memory 313 switching into battery backup mode is shown in FIG. 11. Refresh cycle illustrated in FIG. 11 proceeds identically to that shown and discussed with reference to FIG. 8 until 300 nanoseconds. At 300 nanoseconds, a timing signal internal to refresh circuitry of logic 538, RTG2, samples PWROK. At some time prior to 300 nanoseconds, shown here at 100 nanoseconds, PWROK begins to indicate a power failure has occurred. This results in generation of BBU, which indicates sub-memory 313 is to enter battery backup mode.

BBU causes MEMRESET to be generated. MEMRESET is provided to generators 524 and other circuitry within logic 538 where, as previously discussed, it forces circuitry therein into a known operating state. MEMRESET is also provided to refresh circuitry where as indicated in FIG. 11, it forces REFRESCLR to remain in inhibiting state after refresh cycle is completed. Similarly, BBU forces REFADRENB to remain in enabled state after refresh cycle is completed. With exception of REFADREMB and REFRESCLR, refresh cycle continues to completion in a manner similar to that illustrated with reference to FIG. 8. BBU and MEMRESET continue as shown until, as will be discussed further below, sub-memory 313 switches out of BBU mode.

Figure 12:
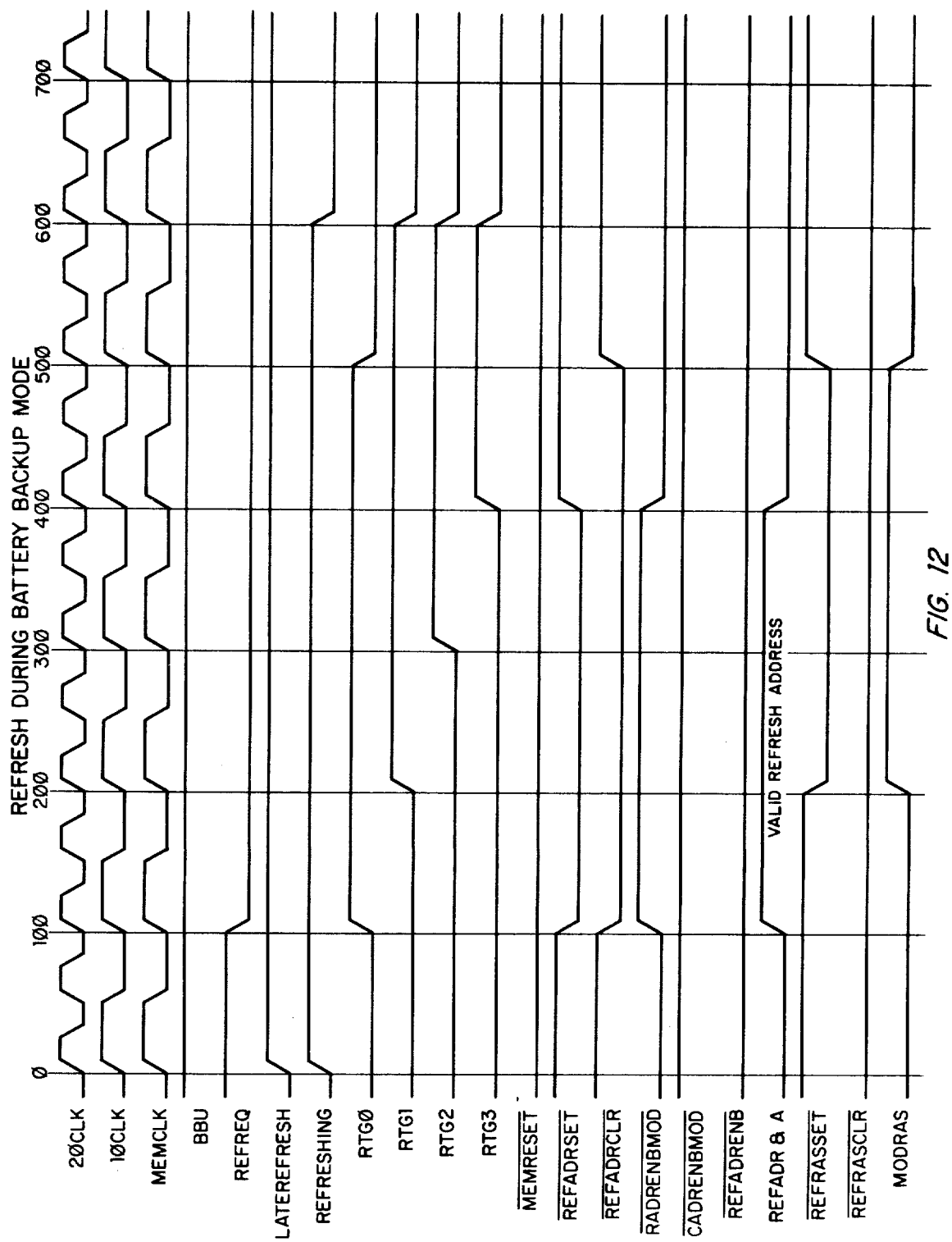
FIG. 12 is a timing diagram illustrating computer refresh cycle in battery backup mode.

FIG. 12 shows a timing diagram illustrating execution of refresh cycle while sub-memory 313 is in BBU mode. As described in block diagram operation above, refresh cycles during battery backup mode are initiated by LATEREFRESH rather than REFREQ. Refresh cycle illustrated in FIG. 12 is identical to a normal refresh cycle, with exception that REFRASCLR is held in inhibiting state and REFADRENB in enabling state by MEMRESET and BBU.

Figure 13:
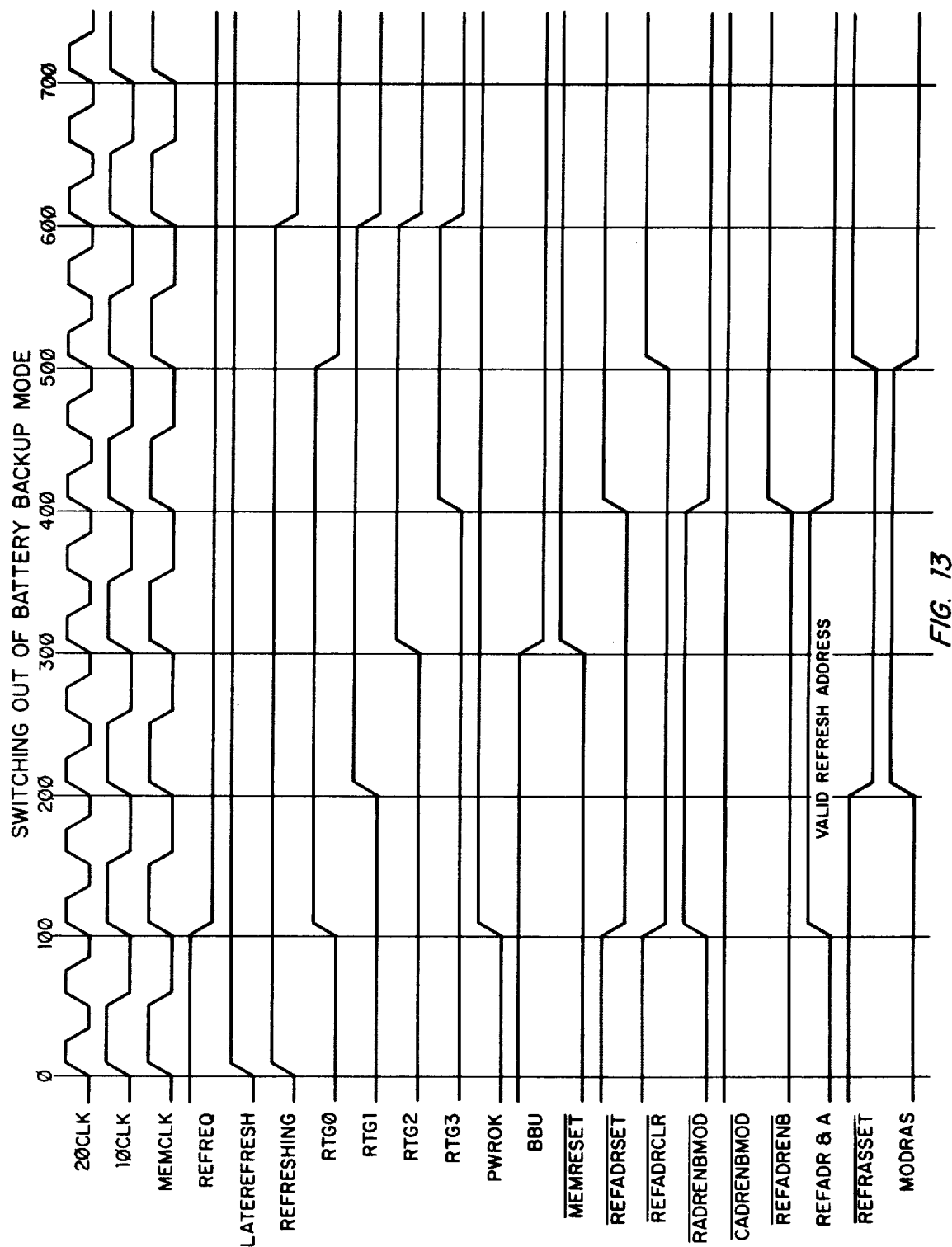
FIG. 13 is a timing diagram illustrating computer memory switching out of battery backup mode.

Referring finally to FIG. 13, a timing diagram illustrating refresh cycle wherein sub-memory 313 switches out of BBU mode is shown. Refresh cycle shown in FIG. 13 proceeds in a manner similar to that shown in FIG. 12, except that PWROK is shown as indicating return of power at 100 nanoseconds. This event is detected by RTG 2 at 300 nanoseconds, causing BBU and MEMRESET to return to normal operation. As indicated by PWROK, power had returned before MEMRESET was released. MEMRESET has thereby forced previously unpowered portions of logic 538 and memory modules 512 to 518 to proper state for resumption of normal operation after completion of refresh cycle. Refresh cycle continues to completion as shown and discussed with reference to FIGS. 8, 9, and 12 above, and sub-memory 313 returns to normal read and write operation.

Having described structure and operation of sub-memory 313 on block diagram level, with aid of timing diagrams, circuitry used in a preferred embodiment of memory 313 will now be presented.

E. Sub-memory 313 Circuitry (FIGS. 14–24)

Schematics of circuitry used in a preferred embodiment of sub-memory 313 is now presented in FIGS. 14 through 24 and related to block diagram and timing discussions above. Structure and interconnection of sub-memory 313 circuitry is shown in FIGS. 14 to 24 and will not be further described except as necessary to illustrate sub-memory 313 operation. Similarly, functions and operation of specific circuit components are discussed in detail only where necessary. Standard and conventional circuit symbols are used throughout All components drawn identical to a component referred to in text and parts list are identical to that referred to. Certain components in following schematics are referred to by footnote *BBU. This note indicates those components to which power is provided during battery backup operation; components not so designated receive power only during normal operation.

Figure 14:
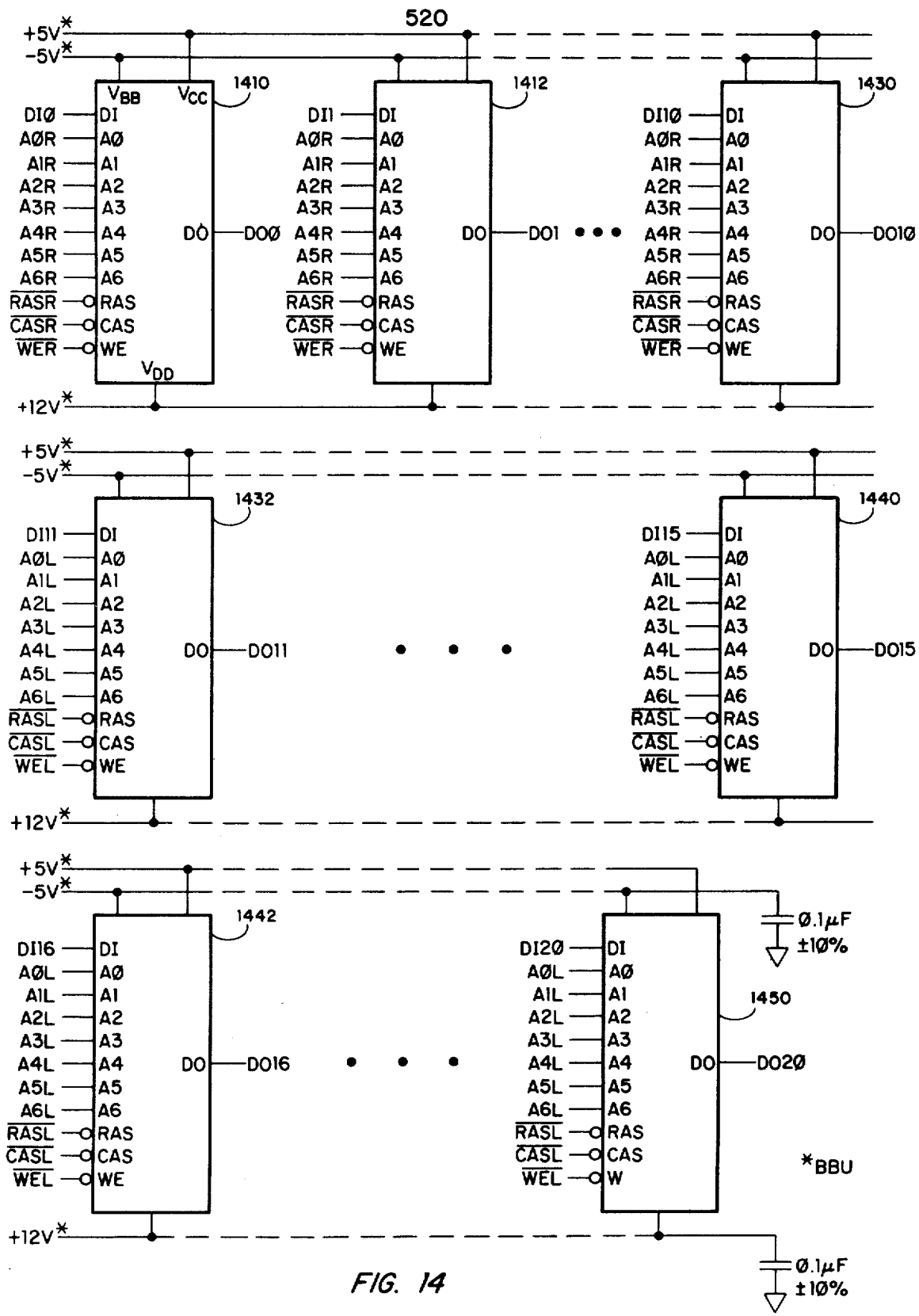
FIG. 14 is a schematic of a memory module bank.

Referring to FIG. 14, a schematic diagram of bank 520 of module 512 is shown. Banks 520 and 522 of modules 512 to 518 are similar. Bank 520 may comprise 21 identical memory elements 1410 to 1450, each storing a single bit of the 21 bit words shown in FIG. 4. Each memory element has a single data input DI (DI0 through DI20) and a single data output DOA, (DOA0 through DOA20). Each data output is connected to a separate lead of DOA bus 513 and in parallel with a similar data output from bank 522. Data inputs DI are each connected to a separate lead of DI bus 533, in parallel with similar data inputs DI of all other banks 520 and 522 of memory 313. Each element has seven address inputs, A0 through A6. Address inputs of elements 1410 through 1430 are connected in parallel to a common address bus, A0R through A6R. Address inputs of elements 1432 through 1450 are connected in parallel to a second address input bus, A0L through A6L. Address bits appearing on bus A0R through A6R and A0L through A6L are identical. Division of bank 520 into two groups of elements, 1410 through 1430 and 1432 through 1450, is, as will be discussed further below, to reduce loading on address drivers of driver circuits 532. Address inputs of elements 1410 through 1450 are, in effect, connected in parallel to A bus 533 through driver circuits 532. Division of bank 520 into two busses appears also in row address strobe (RAS), column address strobe (CAS), and write enable (WE) inputs of elements 1410 through 1450. Bank 520 is also divided into a block of memory elements 1410 through 1440, wherein data bits are stored, and memory elements 1442 through 1450, wherein error correcting code bits are stored. This internal division into 16 bits of data storage and 5 bits of error correcting code storage is not imposed by structure of sub-memory 313. Functionally, sub-memory 313 is a 21-bit wide memory and imposes no restrictions upon words stored therein; e.g., all 21 bits may be used for storage of data. Also, memory elements may be deleted from or added to banks 520 and 522; e.g., so sub-memory 313 is 16 bits wide. Operation of bank 520 will become apparent in the following description of memory element 1410.

Figure 15:
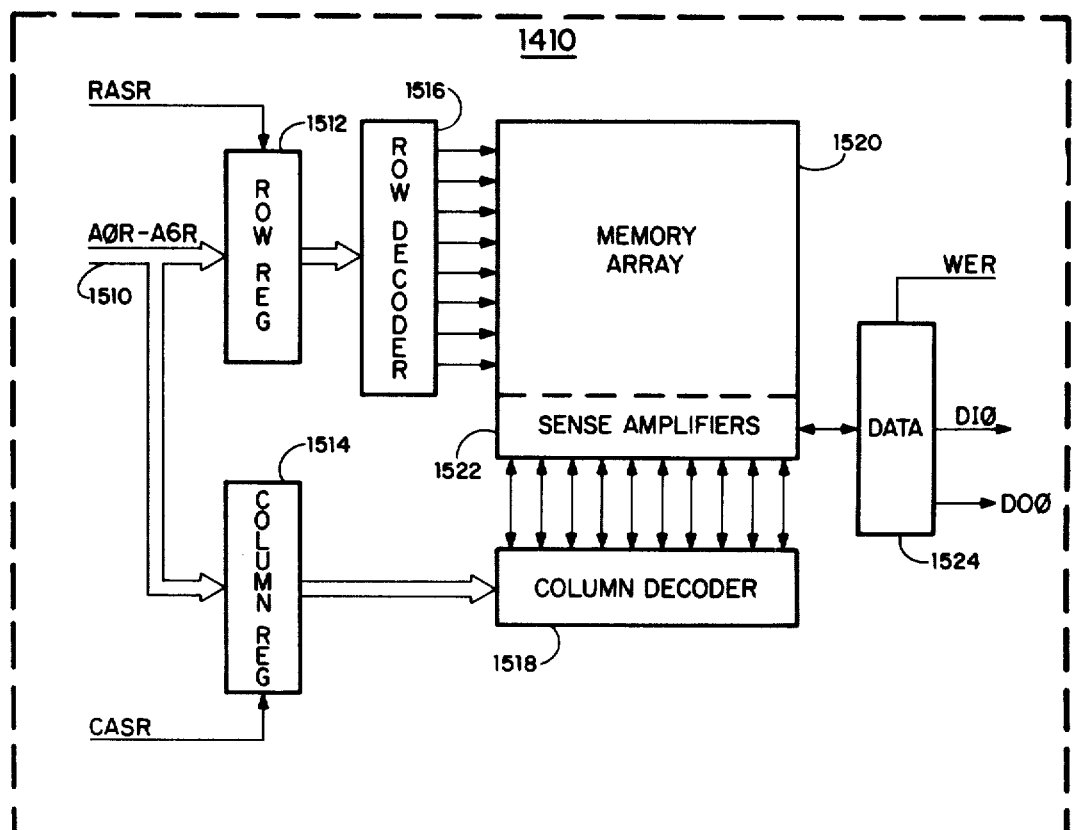
FIG. 15 is a block diagram of a memory element.

Referring to FIG. 15, a block diagram of memory element 1410 of bank 520 is shown. In discussions above, it was stated that row address and row address strobe (RASR) were presented to bank 520 first, followed by column address and column address strobe (CASR). Address input bus 1510 (A0R through A6R) is connected internally to inputs of row address register 1512 and column address register 1514. RASR and CASR are also connected, respectively, to inputs of registers 1512 and 1514. Outputs of register 1512 are connected to inputs of row decoder 1516 and outputs of register 1514 are connected to inputs of column address decoder 1518. Outputs of row decoder 1516 are connected to row selection inputs of memory array 1520. Array 1520 is organized as 128 rows by 128 columns of storage locations, each location storing 1 bit of information. Column outputs of array 1520 are selected through sense amplifiers 1522 and column address decoder 1518. Sense amplifiers 1522 provide data output DOA0 of memory element 1410 through data buffer 1524. DI0 from DI bus 537 is connected to an input of data buffer 1524, as is WER.

In operation, considering a memory read cycle, row address information on A bus 533 is provided through bus 1510 to inputs of register 1512. RASR transfers row address into register 1512. Row address in register 1512 is decoded by row decoder 1516 to enable one of 128 rows of memory array 1520. Information stored in the selected row is then transferred to sense amplifiers 1522. Column address information appearing next on A bus 533 is transferred through bus 1510 to column address register 1514 and transferred into register 1514 by CASR. Column address in register 1514 is decoded by decoder 1516 to select one of 128 bits of information from the selected row in amplifiers 1522. The selected bit appears at data buffer 1524 output. Ability of memory element 1410 to accept row and column address information sequentially on a single bus simplifies address bussing arrangements within memory modules 512 to 518, as will be referred to below.

Write cycle is identical to read cycle, except that, as shown in timing diagrams previously, WER is enabled. In this event, DI0 is transferred through sense amplifier 1520 into column location selected by decoder 1516 and row location selected by decoder 1516. In refresh cycle, only a row address is provided to memory element 1410 and CAS is inhibited. All 128 column locations of the selected row are transferred through sense amplifiers 1522 and, effectively, written back into their identical locations in the selected row. Information, stored in selected row, is thereby refreshed by rewriting.

Figure 16:
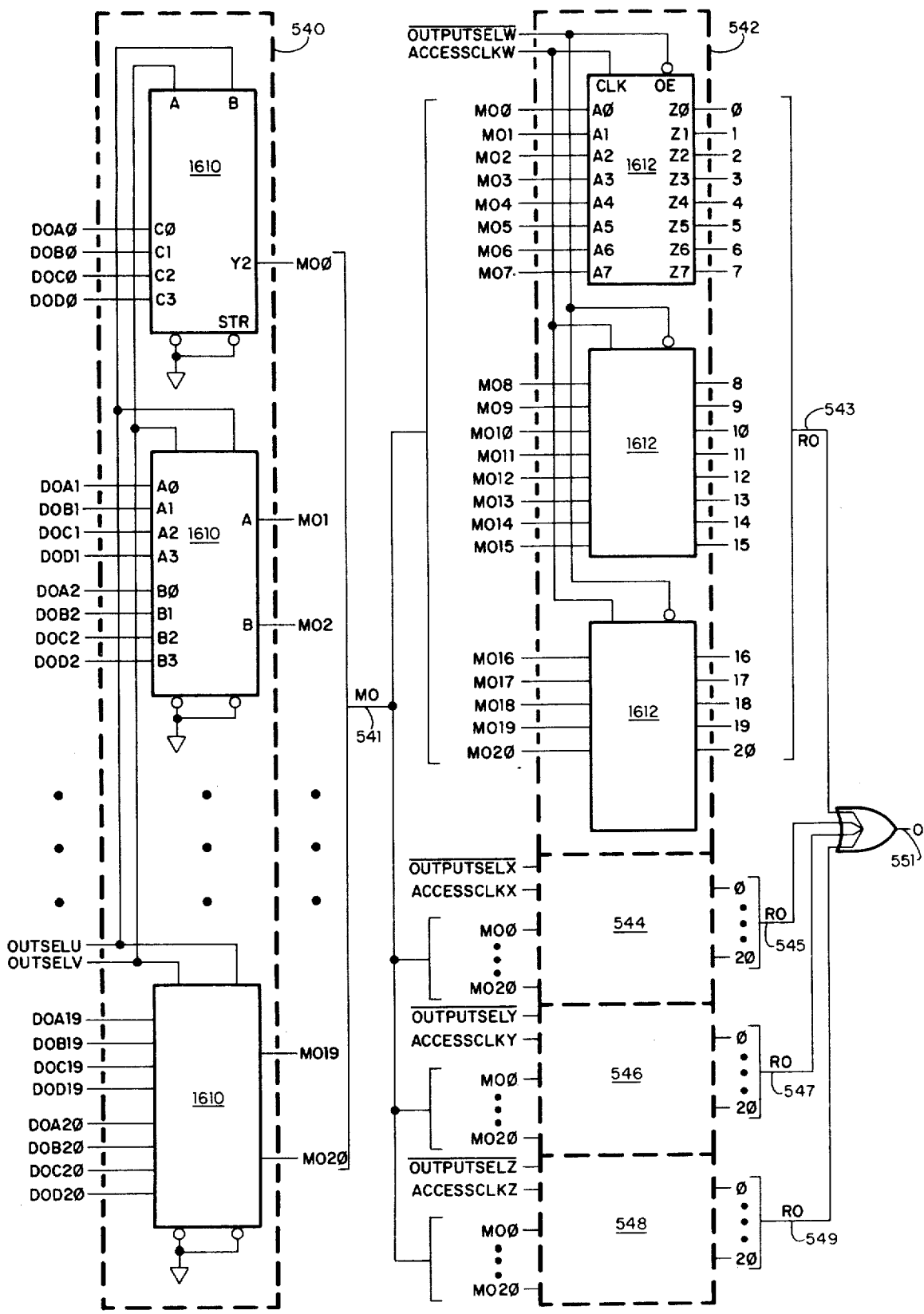
FIGS. 16 and 16A are schematics of memory output circuitry
Figure 16A:
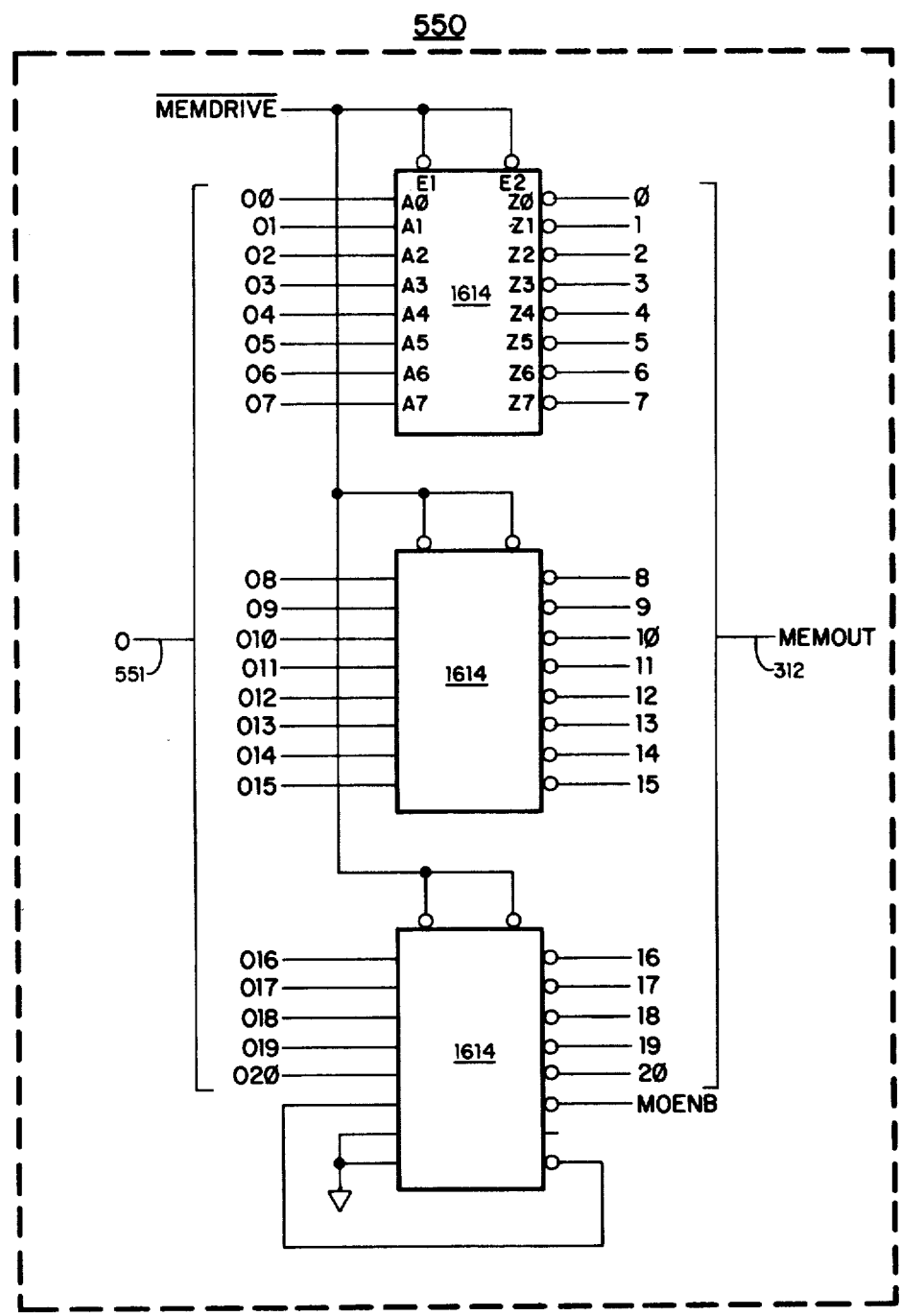

Circuitry by which information is transferred out of memory modules 512 to 518 and onto MEMOUT bus 518 will now be described. Referring to FIGS. 16 and 16A, output multiplexor 540, output registers 542 through 548, and bus driver 550 are shown.

Referring to FIG. 16, output multiplexor 540 comprises 21 four-line to one-line multiplexors implemented in ten dual four-line multiplexor integrated circuits 1610. Output busses DOA bus 513 to DOD bus 519 are connected to multiplexor 1610 inputs. Each multiplexor 1610 receives one output from each of DOA bus 513 to DOD bus 519 (e.g., DOA2, DOB2, DOC2, and DOD2). Multiplexor 1610 control inputs are connected to OUTSELU and OUTSELV of OUTCNTL bus 559. As previously described, OUTSELU and OUTSELV control multiplexors 1610 so that a 21 bit readout word on one of DOA bus 513 to DOD bus 519 appears on MO bus 541. It should be noted that output multiplexor 540 is the only actual, physical multiplexor in sub-memory 313. All other multiplexing operations are performed by sequential transfer of data through a common bus, or by circuitry having tri-state outputs.

Registers 542 to 548 each comprise 21 bits of storage in tri-state logic registers 1612. Twenty-one lines of MO bus 541 are connected to 21 corresponding data inputs MOI of registers 542. MO bus 541 is similarly connected to corresponding inputs of registers 544 to 548. Register 542 clock input is connected to ACCESSCLKW of OUTCNTL 559. Registers 544 to 548 clock inputs are connected to ACCESSCLK X, Y, and Z. Similarly, register 542 control input is connected to OUTPUTSELW of OUTCNTL bus 559; registers 544 to 548 control inputs are connected to, respectively, OUTPUTSEL X, Y, and Z. As previously described, an ACCESSCLK for one of registers 542 to 548 will transfer information on MO bus 541 into registers 1612 of that output register. Also as previously described, enabling signal OUTPUTSEL to one of registers 542 to 548 will transfer contents of registers 1612 of the selected output register onto O bus 551.

Turning now to FIG. 16A, output driver 550 is shown. Driver 550 is a buffer comprised of tri-state logic buffer drivers 1614. Twenty-one lines of O bus 551 are connected to outputs of drivers 1614. Corresponding outputs of drivers 1614 are connected to MEMOUT bus 318. MEMDRIVE of OUTCNTL bus 559 is connected to enabling inputs of drivers 1614 and enables transfer of words from O bus 551 onto MEMOUT bus 318. Bus driver 550 input corresponding to output MOENB is connected to another driver 550 output and driver 550 input corresponding to that second output is connected to ground. MOENB will thereby be logic 0 when MEMDRIVE enables bus driver 550 and indicate a valid readout word is present on MEMOUT bus 318.

Having discussed circuitry by which readout words are transferred from sub-memory 313 onto MEMOUT bus 318, circuitry by which addresses and data are transferred from MEMIN bus 320 to banks 520 and 522 will be discussed next. Following discussions will include buffer 534, data latch 536, row and column address latches 526 and 528, and driver circuits 532, in that order.

Referring to FIG. 17, buffer 534 and data latch 536 are shown. Twenty-one lines of MEMIN, MEMSTART, and MEMWRITE are connected to inputs of buffer amplifier circuits 1710 of buffer 534. Outputs MI0 to MI20 of buffers 1710 are connected to MI bus 535. MI0 to MI20 are connected to inputs of registers 1712 of data latch 536. MI0 to MI6 are connected to RA bus 527. MI7 to MI13 are connected to CA bus 529 and MI14 to MI19 are connected to BMS bus 539. MEMSTART and MEMWRITE outputs of buffers 1710 are connected to, respectively, memory logic 538 and timing generators 524. Enable inputs of registers 1712 are connected to DATAINLATCH from memory logic 538. Information present on MI0 through MI20 is transferred into registers 1712 to appear on register outputs DI0 to DI20 to DI bus 537 when DATAINLATCH appears on registers 1710 enabling inputs.

Figure 18:
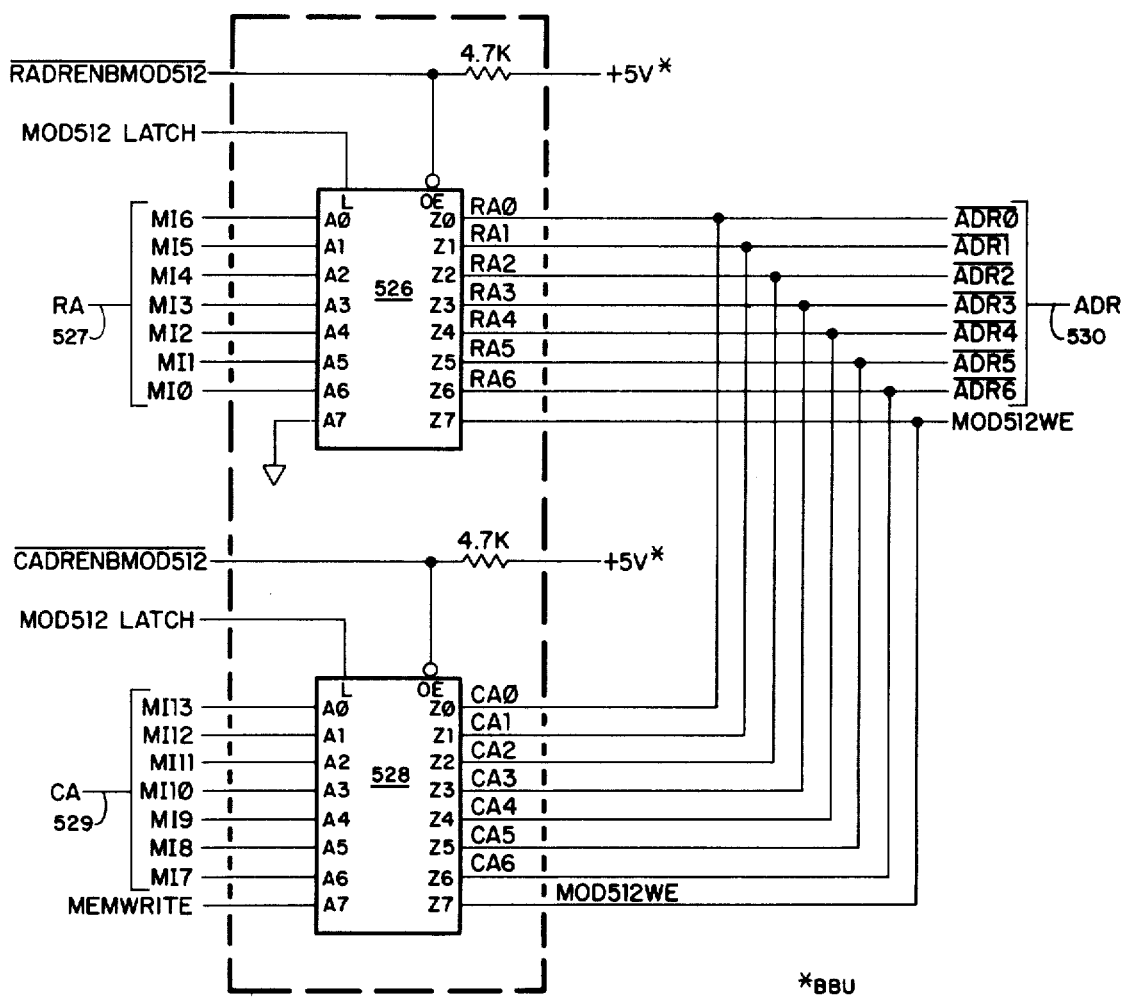
FIG. 18 is a schematic of memory module input circuitry.

Referring to FIG. 18, row address latch 526 and column address latch 528 are shown. Seven lines of RA bus 527 are connected to inputs of latch 526. Seven lines of CA bus 529 are connected to inputs of latch 528. One input of latch 528 is connected to MEMWRITE from buffer 534, and a corresponding input of of latch 526 is connected to ground. Input enabling inputs of latches 526 and 528 are connected to MOD512LATCH. MOD512LATCH transfers addresses on RA bus 527 and CA bus 529 into latches 526 and 528. Corresponding outputs of latches 526 and 528, ADR0 through ADR6, are connected together to comprise ADR bus 530 to driver circuits 532. Outputs MOD512WE, corresponding to input MEMWRITE and ground input of latch 526, are connected together to provide MOD512WE to driver circuits 532. Output enabling inputs of latches 526 and 528 are connected to RADRENBMOD512 and CADRENBMOD512, respectively, from timing generator 524. Addresses in latches 526 and 528 are transferred onto ADR bus 530 when RADRENBMOD512 or CADRENBMOD512 is active. When RADRENBMOD512 is active, latch 526 row address will appear on ADR bus 530; when CADRENBMOD512 is active, latch 528 column address will appear on ADR bus 530. When CADRENBMOD512 is active, MOD512WE will be ground if there is not a MEMWRITE and will be active is there is a MEMWRITE.

Figure 19:
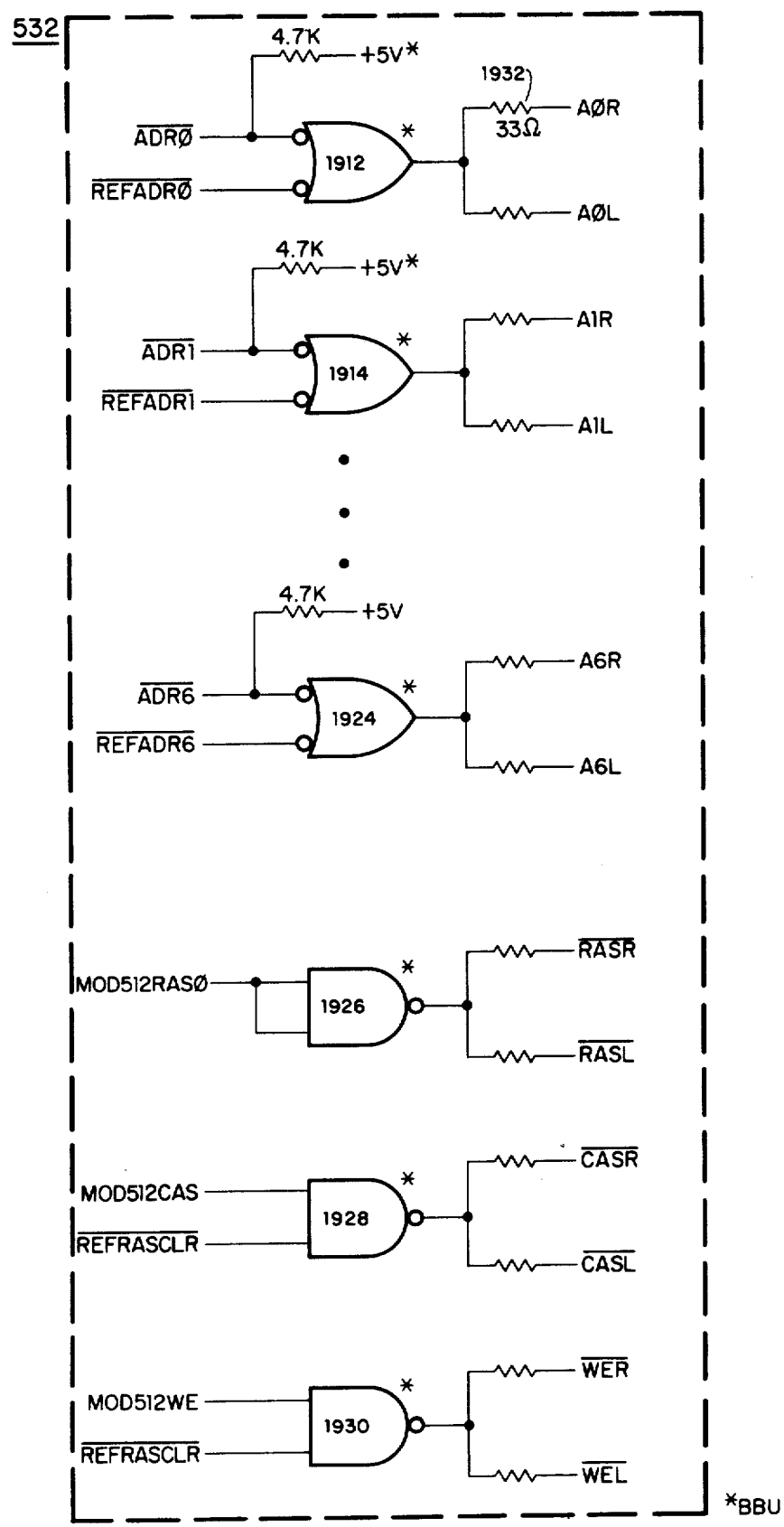
FIG. 19 is a schematic of memory module bank driver circuitry.

Driver circuits 532 of bank 520 of module 512 are shown in FIG. 19. Driver circuits 532 of banks 520 and 522 of modules 512 through 518 are identical. Address inputs of bank 520 are provided by gates 1912 to 1924 which, as described above, have separate R and L outputs to R and L halves of bank 20. Each gate 1912 to 1924 has a first input from ADR bus 530 and a second input from REFADR bus 531. ADR bus 530 inputs are read and write addresses. REFADR bus 531 inputs are refresh addresses. Gates 1912 to 1924 perform an ORing function to transfer inputs from ADR bus 530 or REFADR bus 531 onto A bus 533. Only one of ADR bus 530 on REFADR bus 531 will be active at a time, the other will carry logic 0's. Gates 1926 to 1930 each again have outputs to R and L halves of bank 520. Gate 1926 receives MOD512RAS0 to provide outputs RASR and RASL to bank 520; a similar gate (not shown for clarity of presentation) receives MOD512RAS1 and provides RASR and RASL to bank 522 of module 512. Provision of separate MOD512RAS outputs to banks 520 and 522 is used in addressing memory 313. Addresses are selected in bank 520 or 522 by, e.g., enabling MOD512RAS0 to energize memory elements in bank 520 when the address lies in bank 520. Gates 1928 and 1930 provide control signals MOD512CAS and MOD512WE, respectively, to bank 520 and, as described before, can be inhibited by REFRASCLR during refresh. Pull up registers 1932 provide impedance matching to inputs of module 512 memory elements. Registers 1932 also slow switching transitions to reduce crosstalk.

Figure 20:
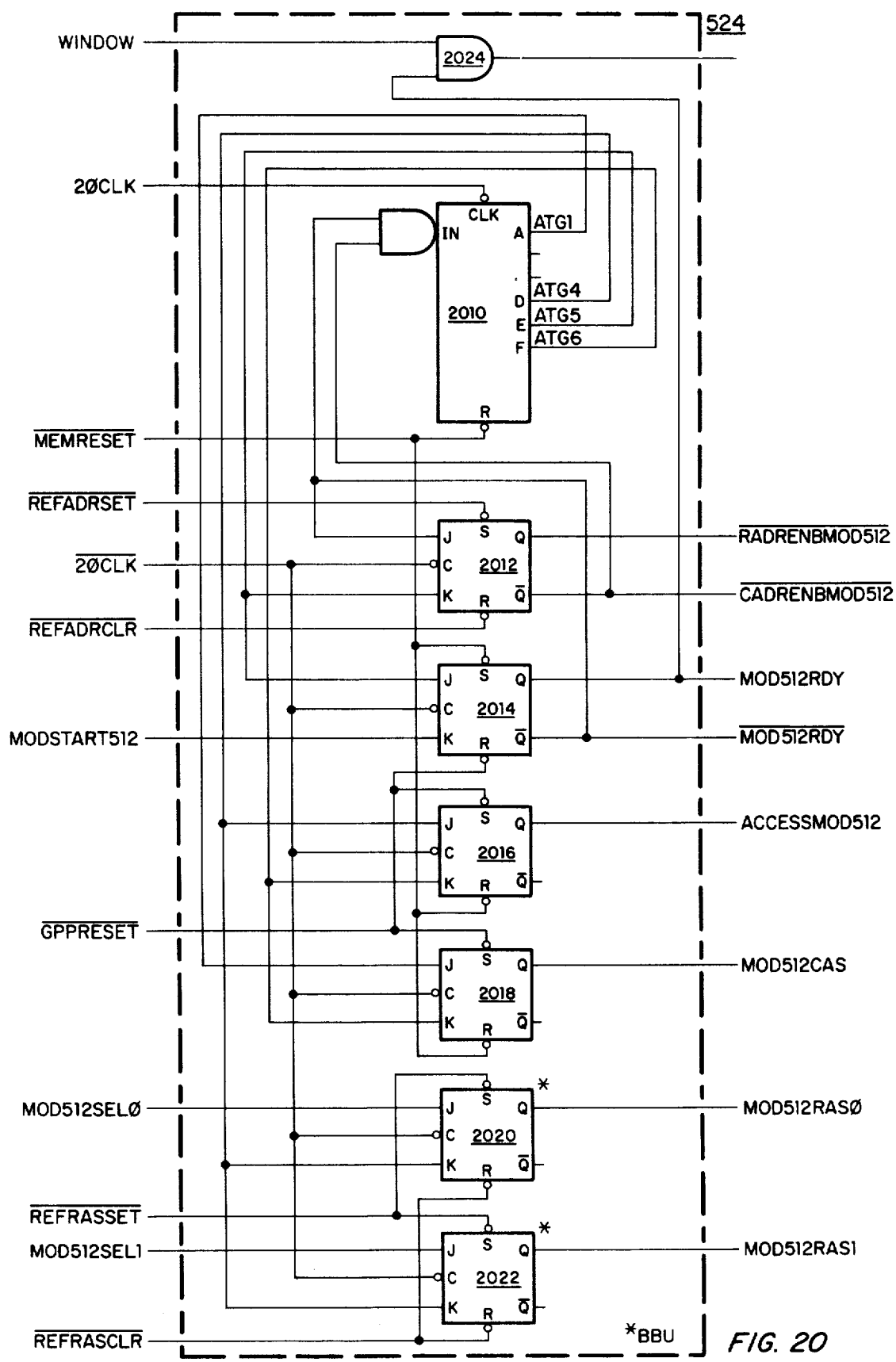
FIG. 20 is a schematic of module control circuitry.

Timing generator 524 of module 512 is shown in FIG. 20. Timing generator 524 comprises timing sequence generator 2010, control registers 2012 to 2022, and gate 2024. Generator 2010 and registers 2012 to 2022 are clocked by 20CLK. Sequence generator 2010 is a shift register. A logic 1 is loaded into generator 2010 when timing generator 524 is initiated. Generator 2010 then provides a succession of output pulses ATG1 to ATG6 which, in turn, enable control outputs of registers 1012 to 1022. ATG1 appears one 20CLK period after generator 524 is initiated. Outputs ATG4, 5, and 6 appear, respectively, at 4, 5, and 6 20CLK periods after initiation.

Referring to FIG. 20 and timing diagrams of FIGS. 6 and 7, $\overline{\text{CADRENBMOD512}}$ goes to logic 1 at conclusion of refresh cycle or module 512 read or write cycle. $\overline{\text{CADRENDMOD512}}$ thereby enables sequence generator 2010 input to accept a start command from logic 538. Inputs of registers 2014, 2022, and gate 2024 are connected to MODSTART512, MOD512SEL0, and MOD512SEL1. Occurrence of these inputs from memory logic 538, together with WINDOW into gate 2026, will initiate timing generator 524. At 50 nanoseconds, MOD512RDY (from register 2014) and WINDOW are gated together by gate 2024 to provide MOD512LATCH to row and column address latches 526 and 528. MOD512LATCH transfers row and column addresses from RA bus 527 and CA bus 529 into latches 526 and 528. $\overline{\text{RADRENBMOD512}}$ is active to transfer latch 526 row address onto ADR bus 530; $\overline{\text{CADRENB-MOD512}}$ inhibits latch 528 output. At next 20CLK pulse (100 ns), MODSTART512, and MOD512SEL0 or MOD512SEL1, are loaded into registers 2014 and 2020 or 2022. MOD512RAS0 or MOD512RAS1 will become active. MOD512RDY to logic 538 will go to logic 0, indicating module 512 is executing a memory cycle. Simultaneously, $\overline{\text{MOD512RDY}}$ goes to logic 1, enabling sequence generator 2010 and an input of register 2012. At next 20CLK pulse (150 ns), $\overline{\text{CADRENB-MOD512A}}$ will become active to transfer column address from latch 528 onto ADR bus 530, while RA-$\overline{\text{DRENBMOD512}}$ inhibits latch 526 output. Simultaneously ATG1 from generator 2010 to register 2018 becomes active so that MOD512CAS becomes active on next following 20CLK (200 ns). ATG4 to inputs of registers 2016, 2022, and 2022 becomes active three 20CLK pulses after ATG1 (300 ns). On next 20CLK pulse (350 ns), ACCESSMOD512 becomes active while MOD512RAS0/MOD512RAS1 is terminated. One 20CLK pulse after ATG4 (350 ns), ATG5 becomes active and enables inputs of registers 2012 and 2014. On next 20CLK pulse (400 ns) $\overline{\text{RADRENBMOD512}}$ becomes active while $\overline{\text{CADRENBMOD512}}$ inhibits latch 526. At this time, MOD512RDY to logic 538 goes to logic 1, indicating module 512 is ready to accept another memory cycle. $\overline{\text{MOD512RDY}}$ also inhibits inputs of sequence generator 2010 and register 2012. Concurrently, ATG6 becomes active to enable inputs of registers 2016 and 2018, so that at next 20CLK pulse (450 nx) ACCESSMOD512 and MOD512CAS are terminated. This terminates a cycle of timing generator 524.

Registers 2012 through 2022 have set/reset inputs $\overline{\text{REFADRSET}}$, $\overline{\text{REFADRCLR}}$, $\overline{\text{REFRASSET}}$, and $\overline{\text{REFRASCLR}}$ from REF bus 557. These inputs control timing generator 524 during refresh, as previously discussed and which will be discussed further below. Registers 2012 through 2022 also have set/reset inputs $\overline{\text{MEMRESET}}$, as previously discussed and which will also be discussed further below. Registers 2014, 2016, and 2018, also receive $\overline{\text{GPPRESET}}$, not previously mentioned. $\overline{\text{GPPRESET}}$ is a computer 310 general purpose preset signal used to reset timing generator 524 when sub-memory 313 is reset.

Memory logic 538 is shown in FIGS. 21 through 24, and will now be described.

Figure 21:
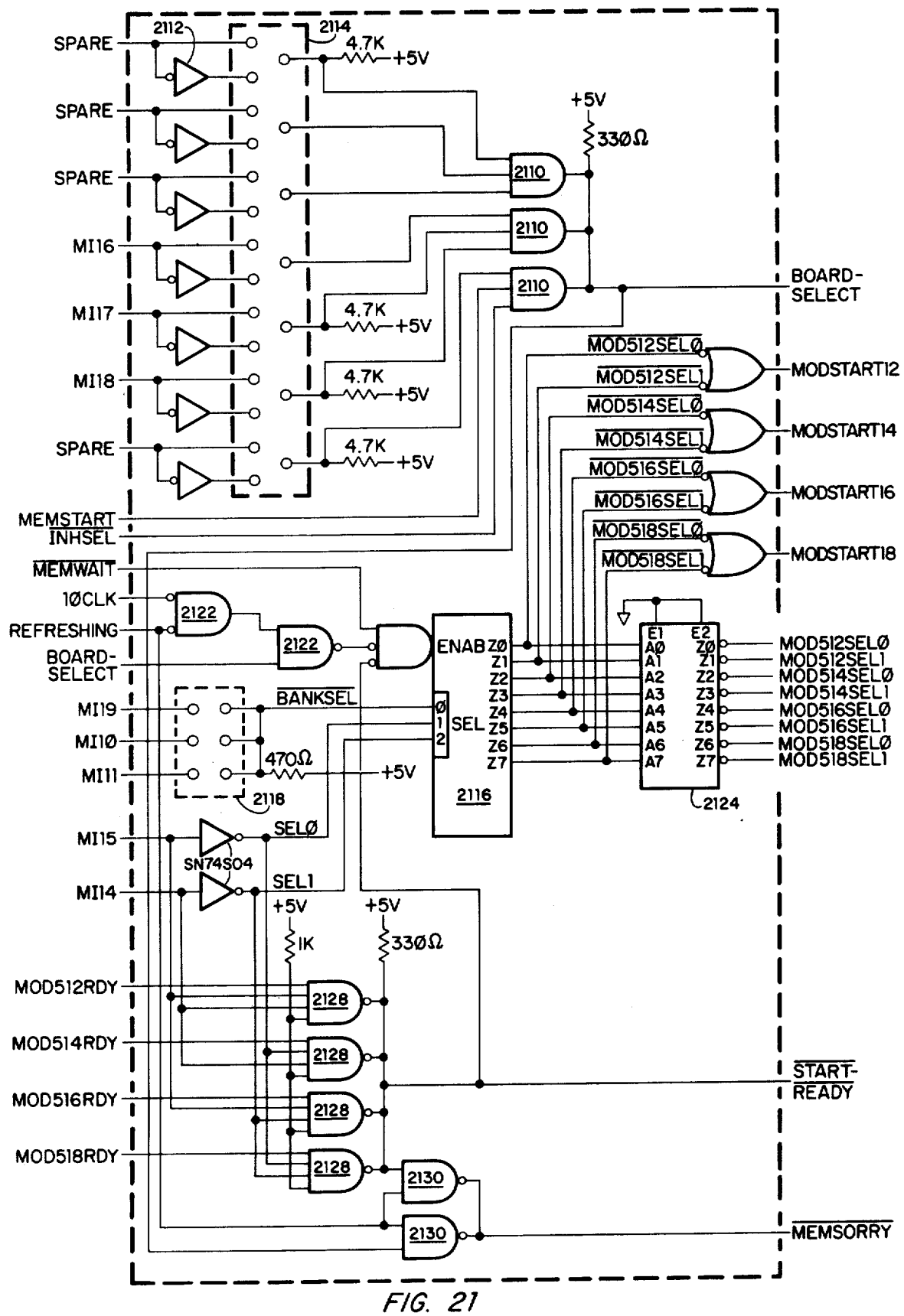
FIG. 21 is a schematic of memory control circuitry.

Referring to FIG. 21, circuitry receiving and decoding board, module, and bank selection address bits of BMS bus 539 is shown. This circuitry provides signals MODSTART(512,514,516,518), MOD(512,514,516,518)SEL(∅, 1), MEMSORRY, and other signals used within memory logic 538.

As previously stated, up to eight sub-memory 313's may be connected in parallel to provide one megaword of memory capacity for computer 310. Accordingly, it is necessary to selectively address any one of eight possible sub-memory 313's. Three input AND gates 2110, and their associated input circuitry, performs this addressing function. Gates 2110 receive and decode address bits MI16, MI17, and MI18 and are enabled by MEMSTART and INHSEL to provide BOARDSELECT. BOARDSELECT then indicates that the selected address lies within the particular sub-memory 313 and initiates operation of that sub-memory 313. INHSEL in a separate control input to sub-memory 313 which inhibits initiation of sub-memory 313 operation and effectively serves as an additional address bit. INHSEL allows multiple devices having same 20-bit address field as memory 311 to be connected to MEMIN and MEMOUT busses 320 and 318 and selectively enabled, thereby avoiding addressing conflicts. Address bits MI16 through 18 may be applied to gates 2110 inputs directly or through inverters 2112, as selected by jumper wire programming network 2114. Jumper wire network 2114 allows each sub-memory 313 to be individually programmed to respond to a separate combination of board selection bits MI16 through 18, thereby performing a one of eight decoding function. Also shown are four spare inputs to gates 2110. Spare inputs allow flexibility in programming gates 2110; e.g., to allow variation in arrangement of board selection address bits within address words.

One-of-eight decoder 2116 receives bank selection bit MI19 and module selection bits MI14 and MI15 from BMS bus 539. Decoder 216 provides outputs, $\overline{\text{MOD(512,514,516,518)SEL(0,1)}}$. These eight outputs indicate whether the selected address lies in module 512, 514, 516, or 518, and in bank 520 or bank 522 of the selected module. $\overline{\text{MOD(512,514,516,518)SEL(0,1)}}$ are inverted by inverter gates 2124 to provide MOD(512,514,516,518)SEL(0,1) to timing generators 524 of memory modules 512 to 518. Outputs $\overline{\text{MOD512,514,516,518)SEL(0,1)}}$ are ORed by OR gates 2126 to provide MODSTART(512,514,516,518) to memory modules 512 to 518, respectively.

Inverters 2120 invert module selection bits $\overline{\text{MI14}}$ and $\overline{\text{MI15}}$ to provide proper polarity signals to decoder 216. MI19 is bank select bit, but three alternate bank selection inputs are provided, through jumper wire network 2118, to allow flexibility in locating bank selection bit within address words.

Decoder 2116 is gated by REFRESHING, through gates 2122, to inhibit operation of decoder 2116 during a refresh cycle. 10CLK is applied to gates 2122 input to control timing of decoder 2116 outputs.

$\overline{\text{MEMWAIT}}$, previously described, is applied to an enabling input of decoder 2116 to inhibit outputs of decoder 2116 and delay generation of MODSTART(512,514,516,518). E.g., when data is to be transferred between memory 311 and a slower memory, both memories may be concurrently addressed and sub-memory 313 delayed until the slower memory is ready for transfer.

Decoder 2116 also receives enabling input $\overline{\text{STARTREADY}}$ from four input NAND gates 2128. Gates 2128 compare MODRDY from modules 512 to 518 with module selection address bits MI14 and MI15. Each gate 2128 provides an output indicating whether the selected memory module is currently executing a memory cycle. $\overline{\text{STARTREADY}}$ enables decoder 2116 if the addressed module is not currently executing a cycle. Decoder 2116 is inhibited if the selected module is currently executing a cycle.

$\overline{\text{STARTREADY}}$ and REFRESHING are compared with BOARDSELECT by gate 2130 to generate $\overline{\text{MEMSORRY}}$ if sub-memory 313 is currently engaged in a refresh cycle, or the selected module is executing a read or write cycle.

Figure 22A:
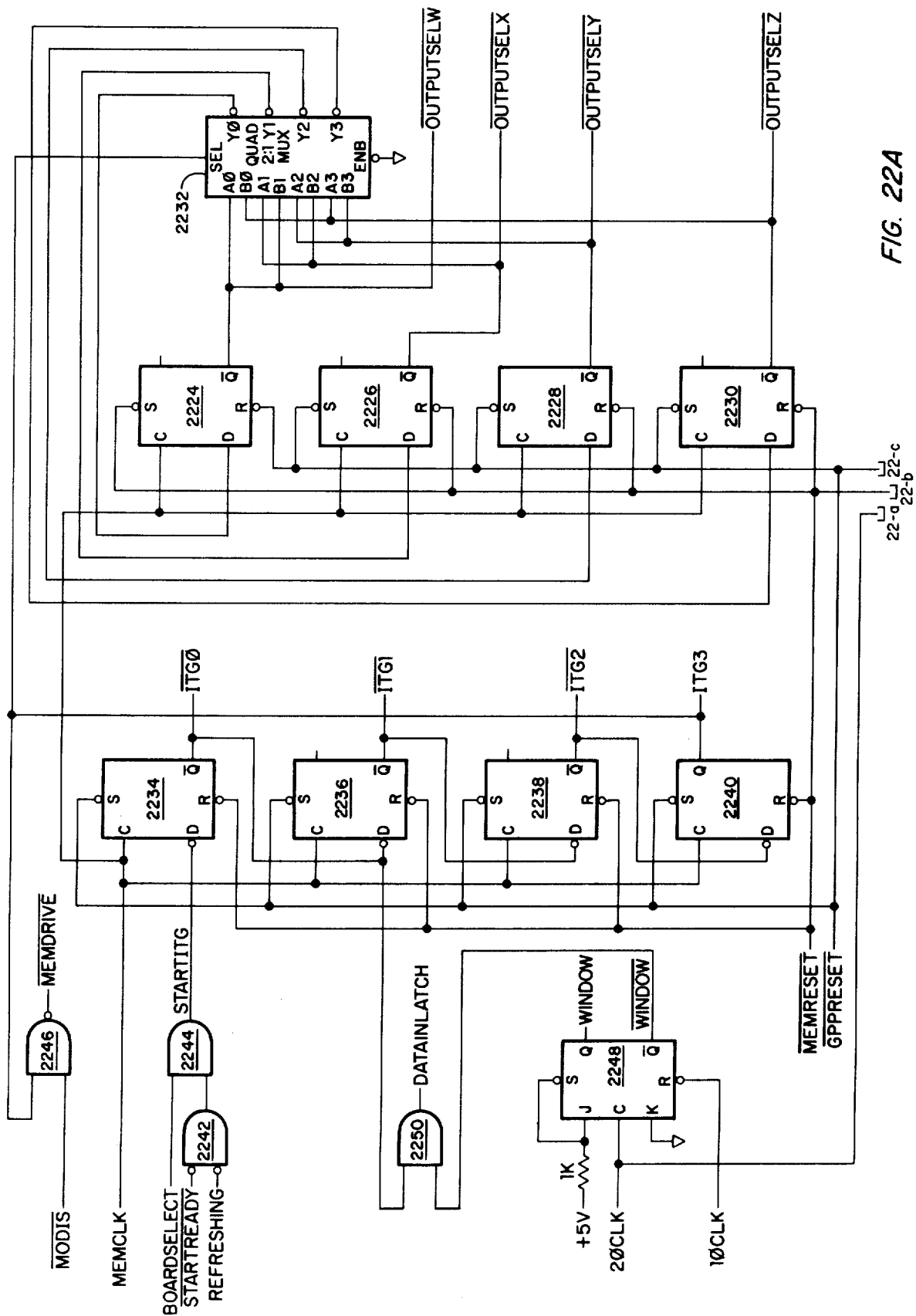

Referring now to FIGS. 22 and 22A, memory logic 538 circuitry generating DATAINLATCH and OUTCNTL bus 559 signals (i.e., OUTSEL(0,1), ACCESSCLK(W,X,Y,Z), OUTPUTSEL(W,X,Y,Z), and MEMDRIVE) is shown. This circuitry is primarily concerned with transfer of data from modules 512 to 518 to MEMOUT bus 318.

Referring to FIG. 22, two input NAND gates 2210 receive ACCESSMOD512,514, and 516 from modules 512 to 516. Gates 2210 decode these inputs to provide OUTSEL0 and OUTSEL1 to output multiplexor 540. As previously described OUTSEL0 and OUSET1 control transfer of data from DOA bus 513 to DOD bus 519 onto MO bus 541. ACCESSMOD518 is not required for this decoding function and is not used.

Also shown in FIG. 22 is circuitry for generating ACCESSCLK(W,X,Y,Z). This circuitry generates sequential ACCESSCLK signals to output registers 542 to 548, to transfer data from modules 512 to 518 to registers 542 to 548. ACCESSCLK(W,X,Y,Z) are provided from flip-flops 2212, 2214, 2216, and 2218, respectively, which comprise a four-bit shift register. $\overline{\text{MEMRESET}}$ and $\overline{\text{GPPRESET}}$ are connected to set and reset inputs of slip-flops 2212 to 2218 to initially set the shift register so that flip-flop 2212 contains a logic 1 and flip-flops 2214 to 2218 contain logic 0's. Outputs of flip-flops 2212 to 2214 are connected to inputs of quadruple two-line to one-line multiplexor 2220, whose outputs are connected to inputs of flip-flops 2212 to 2218. Multiplexor 2220 can transfer outputs of flip-flops 2212 to 2218 to their respective inputs, or to inputs of next adjacent flip-flops. A logic one first appearing in flip-flop 2212 can thereby be transferred to successively appear at outputs of flip-flops 2214, 2216, and 2218, in that sequence, and then again at output of flip-flops 2212. Transfer operation i.e., whether a flip-flop output is fed back to its inputs or to input of next adjacent flip-flop, is controlled by inputs ATG4 to NOR gate 2222 from memory modules 512 to 518. Gate 2220 output is delayed one 20CLK period by flip-flop 2223 and provided to multiplexor 2220 select input.

Occurrence of an ATG4 will therefore cause logic 1 in one flip-flop, indicating the output register in which a word was stored on a previous read cycle, to be transferred into the next flip-flop to clock next output register in sequence. As discussed above, sequence generators 2010 of timing generators 524 provide at ATG5 concurrently with ACCESSMOD. ACCESSMOD, indicates that a valid word is present on memory module output bus. Shift register transfer thereby occurs each memory read cycle, so that successive readout words are stored successively in registers 542 to 548. Flip-flops 2212 to 2218 are clocked by 20CLK, as are sequence generators 2010, so that selection of an output register and transfer of data are synchronized.

Turning to FIG. 22A, circuitry generating OUTPUTSEL(W,X,Y,Z) is shown. OUTPUTSEL(W,X,Y,Z) are generated by a four-bit shift register comprising flip-flops 2224 to 2230 and multiplexor 2232, which operate in same manner as the shift register of FIG. 22. Inverted outputs $\overline{Q}$ of flip-flops 2224 to 2230 provide $\overline{\text{OUTPUTSEL}}(\overline{W},\overline{X},\overline{Y},\overline{Z})$. Again, flip-flops 2224 to 2230 are set and reset by $\overline{\text{MEMRESET}}$ and $\overline{\text{GPPRESET}}$. They are clocked, however, by MEMCLK. A logic 1 is transferred sequentially from flip-flop 2224 to flip-flop 2230 and back to flip-flop 2224 by multiplexor 2232, which is controlled by ITG3. ITG3 is generated by a four-bit shift register comprising flip-flops 2234 to 2240. Flip-flops 2234 to 2240 are also clocked by MEMCLK, and their initial starting condition is set by $\overline{\text{MEMRESET}}$ and $\overline{\text{GPPRESET}}$. In this case, flip-flops 2234 to 2240 are initially set to contain all logic 0's. Flip-flop 2234, first flip-flop in the shift register, is provided with input STARTITG from gates 2242 and 2244. STARTITG may be provided when gate 2244 receives BOARDSELECT (memory 313 is to execute a read or write cycle) but can be inhibited through gate 2242 by $\overline{\text{STARTREADY}}$ and REFRESHING (sub-memory 313 is executing a refresh cycle or a request interference has occurred). When STARTITG appears, a logic 1 propagates through the shift register and appears at flip-flop 2240 output as ITG3 four MEMCLK periods later, i.e., 400 nanoseconds. This is delay time between initiation of a memory request and appearance of a readout word on one of DOA bus 513 to DOD bus 519. ITG3 to multiplexor 2232 causes STARTITG in flip-flops 2224 to 2230 to advance when MEMCLK occurs, sequentially enabling outputs of registers 542 to 548. STARTITG is active so long as BOARDSELECT is active and not inhibited by STARTREADY or REFRESHING. A continuous string of logic 1's will therefore flow through flip-flops 2234 to 2240 and sequential data transfer between output registers 542 to 548 and MEMOUT bus 318 will occur at MEMCLK intervals.

If BOARDSELECT becomes inactive, or STARTITG is inhibited by STARTREADY or REFRESHING, ITG3 terminates 400 nanoseconds thereafter. This is delay time for the last required memory readout word to be transferred into output registers 542 to 548 by ACCESSCLK(W,X,Y,Z) and onto MEMOUT by $\overline{\text{OUTPUTSEL}}(\overline{W},\overline{X},\overline{Y},\overline{Z})$. If MEMCLK is suspended, e.g., due to MEMSORRY, operation of shift register flip-flops 2234 to 2240 and 2224 to 2230 will be spended and transfer of words from output registers 542 to 548 will be suspended.

ITG3 is an input to gate 2246 to generate $\overline{\text{MEMDRIVE}}$ to output driver 550. ITG3 is gated with $\overline{\text{MODIS}}$, an external inhibit signal, e.g., from ERCC logic 319, preventing data transfer from O bus 551 onto MEMOUT bus 318.

Also shown is flip-flop 2248, having clock input 20CLK and reset input 10CLK. Flip-flop 2248 generates WINDOW as previously described. $\overline{\text{WINDOW}}$ is provided as one input of gate 2250, as is ITG0 from flip-flop 2234, to provide DATAINLATCH to data latch 536. ITG0 appears one MEMCLK period after appearance of BOARDSELECT and thus at desired time to transfer data words from MI bus 535 into data latch 536.

Figure 23:
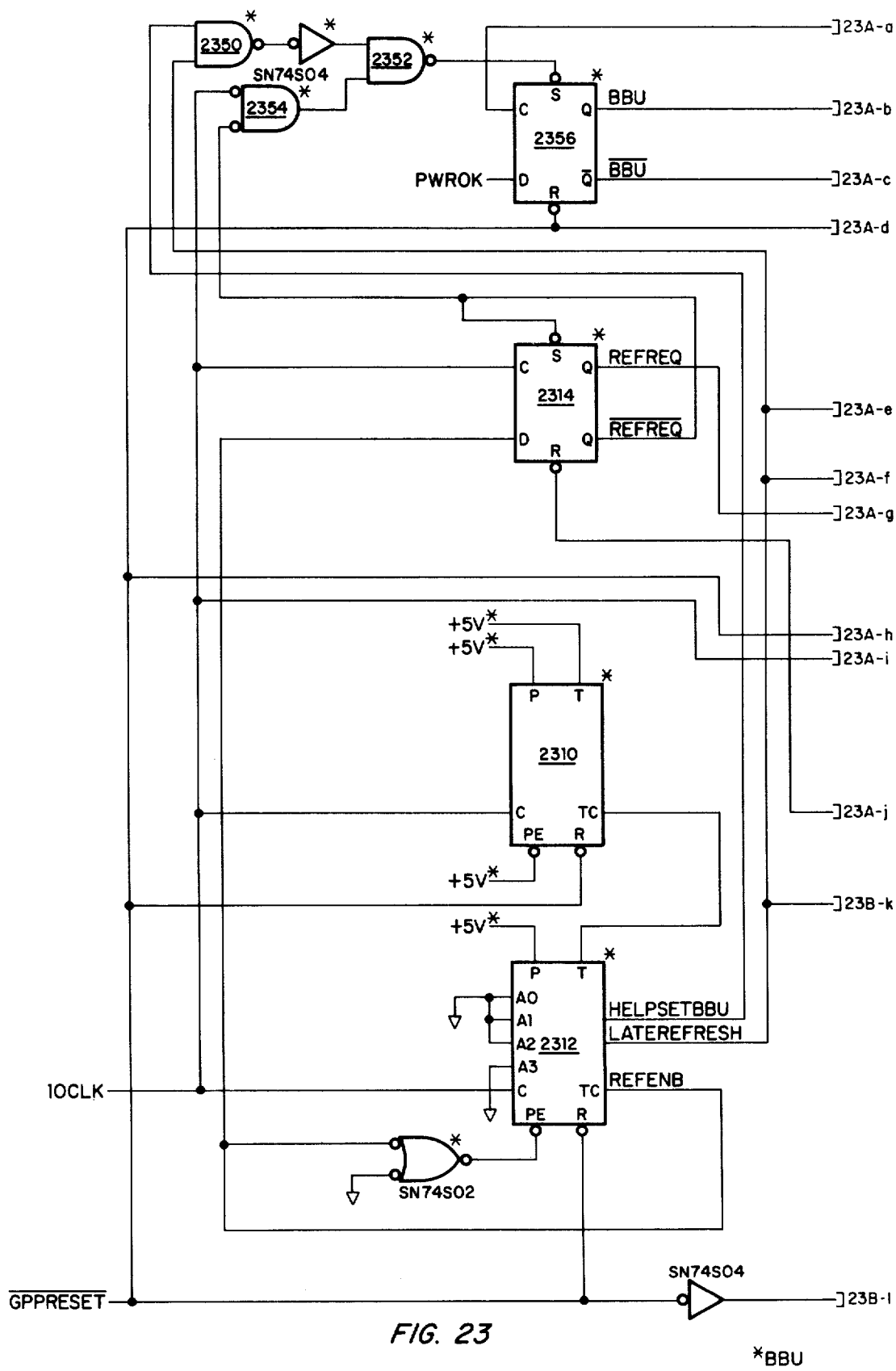
FIGS. 23, 23A, and 23B are schematics of memory refresh and battery backup control circuitry.
Figure 23A:
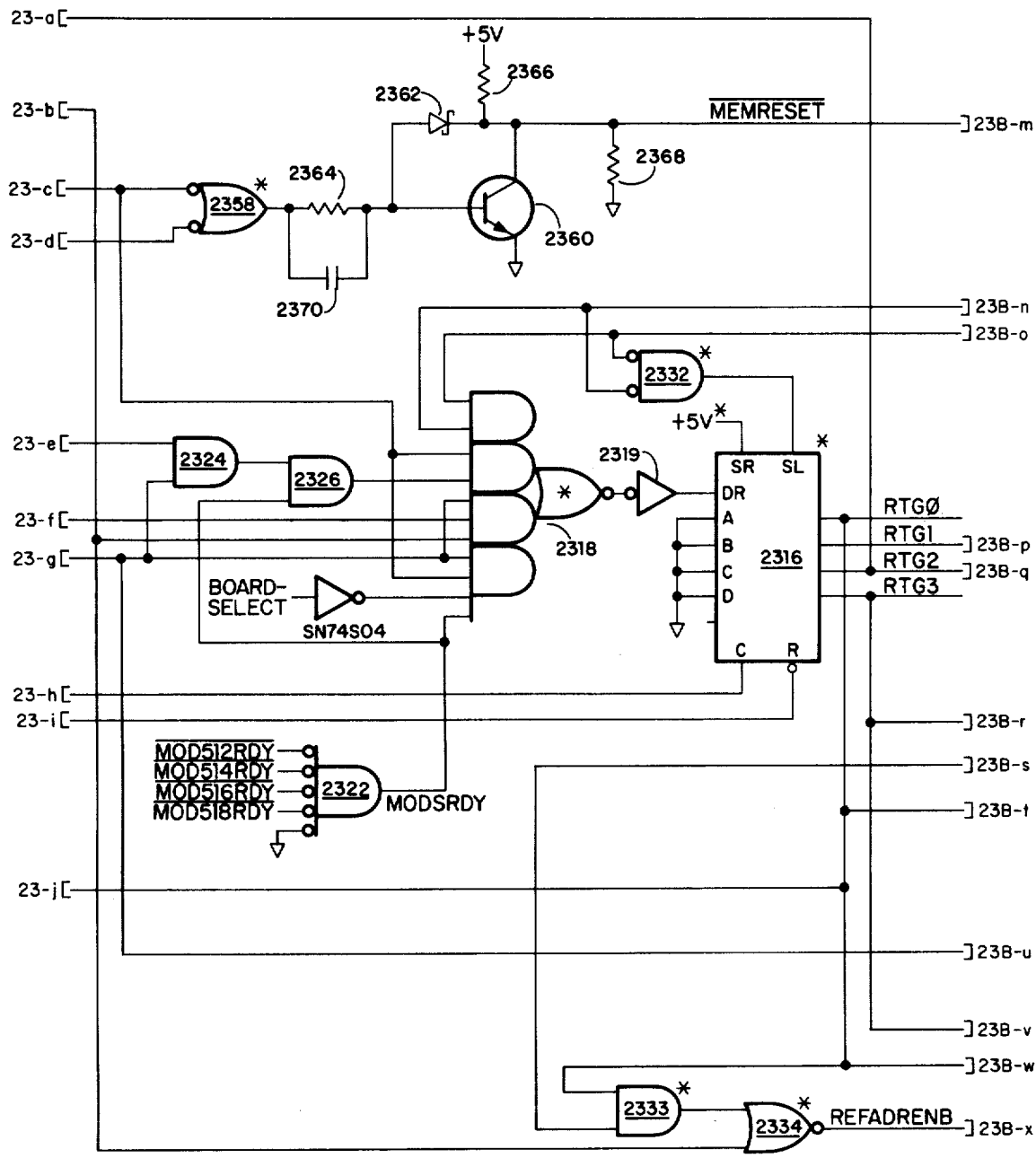
Figure 23B:
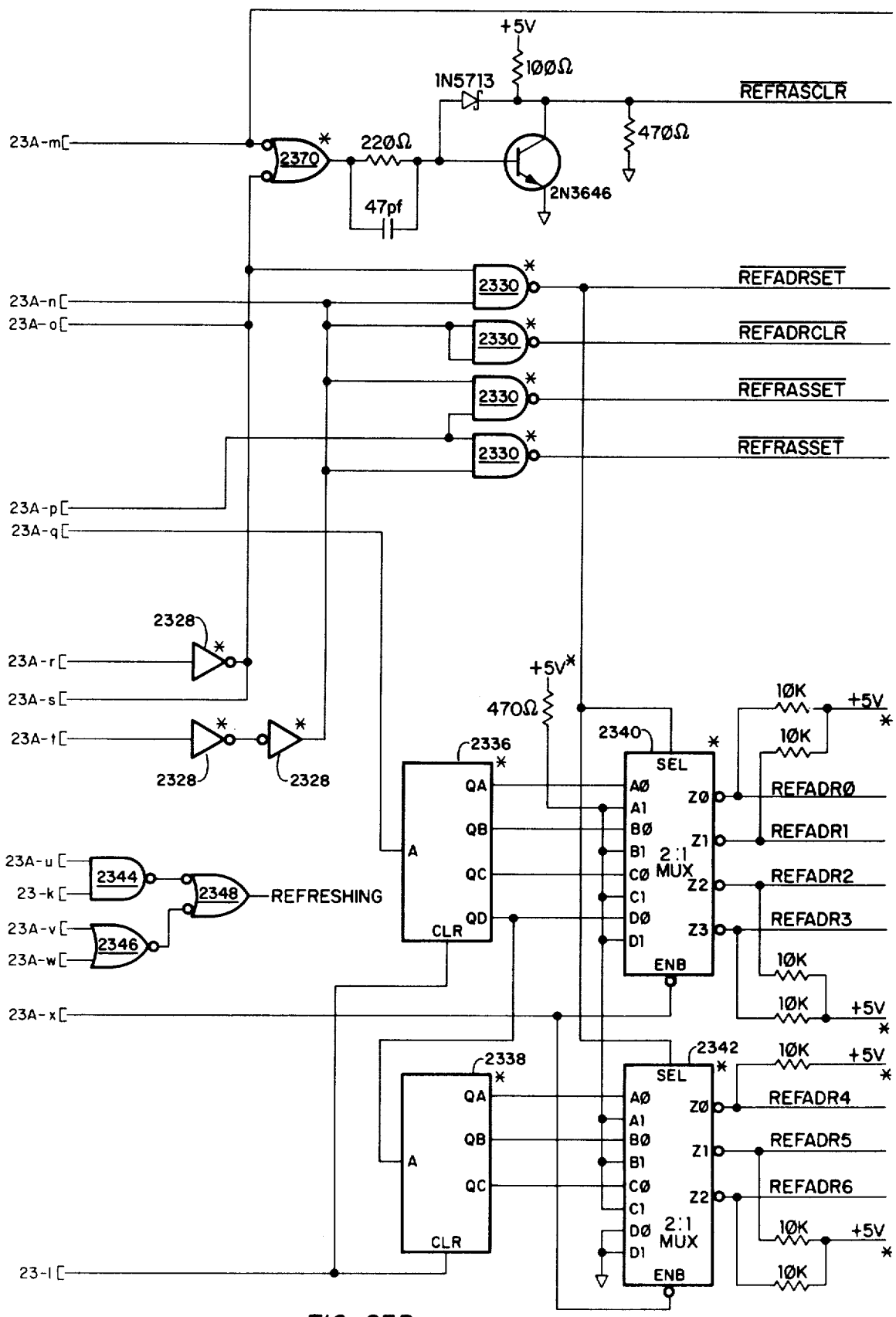

Referring to FIGS. 23, 23A, and 23B, memory logic 538 circuitry controlling memory refresh and battery backup (BBU) operation is shown.

Referring first to FIG. 23, counters 2310 and 2312 are clocked by 10CLK and measure time between a previous refresh request, next refresh request, REFREQ, and LATEREFRESH condition. Counter 2312 provides output REFENB, enabling generation of REFREQ; LATEREFRESH, indicating that maximum allowable time has elapsed; and HELPSETBBU, used to initiate BBU operation when LATEREFRESH interval has been exceeded. REFENB is provided to flip-flop 2314, which is clocked by 10CLK and provides REFREQ. REFREQ is fed back to flip-flop 2314 set input to lock flip-flop 2314 in REFREQ condition until a refresh cycle is initiated. Circuitry generating BBU is also shown in FIG. 23, but discussion of this circuitry will be deferred until refresh circuitry in FIGS. 23A and 23B has been discussed.

Referring to FIG. 23A, counter 2316 is clocked by 10CLK and provides timing pulse outputs RTG0 through RTG3, controlling sequence of events during a refresh cycle. Counter 2316 operation is initiated by an input from multiple input gate 2318. Gate 2318 detects three conditions for initiating a refresh cycle, and a counter 2316 output terminating refresh cycle.

First condition calls for sub-memory 313 to seize first available memory cycle after a refresh request to execute a refresh cycle. This condition occurs when $\overline{BOARDSELECT}$, inverted by inverter 2320, indicates no request is currently being made of memory 313; $\overline{BBU}$ indicates sub-memory 313 is not currently in backup operation; MODSRDY from gate 2322, having inputs $\overline{MOD(512,514,516,518)RDY}$ from modules 512 to 518, indicates none of modules 512 to 518 are executing read or write cycle; and REFREQ indicates a refresh cycle is requested.

Second condition represents initiation of a late refresh cycle; a refresh cycle has been requested but a memory cycle has not been available until 6.4 microseconds has expired. In this case, gate 2318 receives $\overline{BBU}$ and inputs from gates 2324 and 2326. Gate 2324 has inputs REFREQ and LATEREFRESH, indicating that a refresh is requested and has extended past 6.4 microseconds. Gate 2326 has input MODSRDY, indicating that modules 512 to 518 are not executing a read or write cycle.

In third condition, gate 2318 receives REFREQ, BBU, and LATEREFRESH; this case represents initiation of a refresh cycle while sub-memory 313 is in battery backup mode.

Gate 2318 provides a logic 1, through inverter 2319, to shift register 2316 data input if any of these conditions is met. Logic 1 then appears successively at outputs RTG0 through 3, with logic 1 outputs of RTG0 through 3 overlapping in time as shown in timing diagram FIGS. 7 and 9 to 13.

Referring to both FIGS. 23A and 23B, RTG0 to RTG3 are inputs to circuitry comprising inverters 2328 and two-input NAND gates 2330. Gates 2330 in turn generate $\overline{REFADRSET}$, $\overline{REFADRCLR}$, and two $\overline{REFRASSET}$ outputs. Two $\overline{REFRASSET}$ outputs are provided to divide load imposed on gates 2330.

$\overline{RTG3}$ and RTG0 inputs to gates 2318 and 2332 from inverters 2328 inputs terminate refresh control sequence input to shift register 2316, thereby terminating refresh cycle.

RTG0 and $\overline{RTG3}$ are inputs to gate 2333. Gate 2333 output, with BBU, are inputs of NOR gate 2334, which generates $\overline{REFADRENB}$. $\overline{REFADRENB}$ is an enabling signal to counters 2336 and 2338 and multiplexors 2340 and 2342, which generate refresh addresses REFADR (0-6). Counters 2336 and 2338 are clocked by RTG2 and generate successive refresh addresses for each refresh cycle. Multiplexors 2340 and 2342, controlled by $\overline{REFADRSET}$, invert counters 2336 and 2338 outputs to place $\overline{REFADR(0-6)}$ on REFADR bus 531 during refresh, and logic 0's at all other times.

LATREFRESH and REFREQ inputs of NAND gate 2344 and RTG0 and RTG3 inputs of NOR gate 2346 indicate, respectively, a late refresh cycle is being forced or a refresh cycle is being executed. Outputs of gates 2344 and 2346 are connected to inputs of two-input OR gate 2348, which generates REFRESHING.

Returning to FIG. 23 and BBU circuitry, PWROK is connected to flip-flop 2356 D input and flip-flop 2356 is clocked by RTG2, thereby causing PWORK to be sampled, as described above, during each refresh cycle. Outputs BBU and $\overline{BBU}$ are provided to circuitry of FIGS. 23A and 23B as previously discussed. LATEREFRESH and HELPSETBBU inputs to gate 2350 generate a signal to gate 2352 indicating period for initiating a late refresh has been exceeded. 10CLK and REFREQ inputs to gate 2354 provide a clocked signal to gate 2352 that a refresh has been requested. Gate 2352 output is connected to flip-flop 2356 set input, to force generation of BBU and thereby drive memory 313 into battery backup mode. This feature protects against possibility of a failure to refresh memory 313 due to an undetected power failure, or upon computer 310 turn-on.

Referring to FIG. 23A, $\overline{BBU}$ and $\overline{GPRESET}$ are inputs of OR gate 2358. Gate 2358 provides an output to high powered driver circuit 2359 comprising transistor 2360, diode 2362, resistors 2364 to 2368, and capacitor 2370. Driver 2359 in turn provides $\overline{MEMRESET}$ to memory 313 circuitry whenever memory 313 enters battery backup mode or receives a $\overline{GPRESET}$.

Continuing to FIG. 23B, $\overline{MEMRESET}$ and $\overline{RTG3}$ are inputs to OR gate 2370. Gate 2370 drives high power driver circuit 2371 identical driver 2359 $\overline{MEMRESET}$, to provide $\overline{REFRASCLR}$ whenever $\overline{MEMRESET}$ occurs, or upon occurrence of $\overline{RTG3}$ during a refresh cycle.

Figure 24:
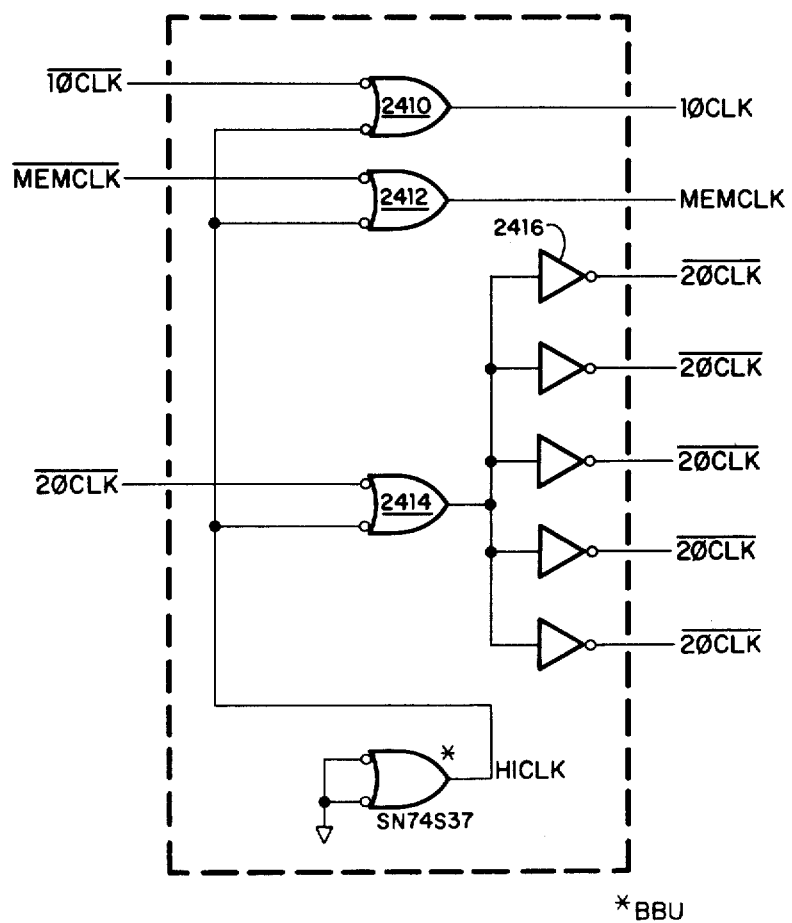
FIG. 24 is a schematic of memory input clock circuitry.

Referring finally to FIG. 24, clock distribution circuits of sub-memory 313 are shown. 10CLK and MEMCLK are buffered through driver gates 2410 and 2412, respectively, to be distributed to sub-memory 313 circuitry as described above. 20CLK is inverted and buffered by gate 2414 and buffered again through power inverter 2416 to provide 20CLK outputs to sub-memory 313. Multiple 20CLK outputs are provided because of extensive use of 20CLK in sub-memory 313, thereby reducing loading on each 20CLK output.

Discussion of sub-memory 313 circuitry and operation is hereby concluded and certain features of sub-memory 313 are summarized below.

F. Summary of Sub-memory 313 Features

Certain features of sub-memory 313, which features and others were described above, are:

First, provision of separate MEMIN bus 320 and MEMOUT bus 318. Each bus, therefore, has either a single driver circuit and multiple receivers or multiple drivers and a single receiver. This feature reduces capacitance loading on MEMIN bus 320 and MEMOUT bus 318, e.g., due to bus wiring, back panel connectors, and I/C inputs and outputs, and reduces bus reflections due to multiple terminations. This allows a computer designer to determine where each bus should be terminated for minimum noise and, by reducing loading on the busses, increases data band width which can be supported by busses MEMIN and MEMOUT.

Second, memory modules 512 to 518 and memory logic 538 execute all memory operations, i.e., read cycles, write cycles, and refresh cycles, within the same interval (which may normally be 400 nanoseconds). Sub-memory 313 cycle period in turn is a multiple of memory bus cycle period (which may be 100 nanoseconds). This, with independent and interleaved operation of modules 512 to 518, allows memory access at memory bus cycle intervals. In addition, interface between, e.g., CPU314 or PFP312, and MEMIN and MEMOUT busses is simplified. As will be described further below with reference to PFP312, a device interfacing with memory 313 executes a write cycle by placing write address on MEMIN bus during a first memory bus cycle and data to be written on MEMIN bus in the next memory bus cycle. A read cycle requires only that a requesting device place read address on MEMIN bus 320 during one memory bus cycle, wait an integer number (e.g., 4) memory bus bus cycles and transfer data on MEMOUT bus 318 into its own input registers. Read cycle interface is further simplified by provision of MEMSORRY to generate an extended bus cycle when a memory request interference occurs.

Third, transparency of sub-memory 313 to error correcting code bits of words provides increased flexibility in using memory 313. Words may be organized in any manner required by the user. Further, by performing error correction in CPU314, rather than within sub-memory 313, complexity of sub-memory 313 circuitry is reduced. This allows greater memory capacity on a single circuit board and reduces throughput delay time of sub-memory 313.

Fourth, overhead load on CPU314 is reduced by making refresh an internal function of sub-memory 313. Further, refresh of sub-memory 313 provides maximum access to memory 313; submemory 313 performs refresh operations only during those memory cycles not required for access by CPU314, PFP312, or other devices. This also effectively reduces sub-memory 313 overhead time.

Fifth, provision of individual sequence control circuitry for each of memory modules 512 to 518 provides maximum operational flexibility of sub-memory 313. A further feature of sub-memory 313 circuitry, e.g., of timing generators 524, is the simplicity by which timing sequences are generated. Timing sequences are generated by a shift register whose operation is initiated by some event and which provides successive timing pulse ouputs.

Sixth, data and address bussing in sub-memory 313 reduces total area of sub-memory 313 circuit board occupied by busses. This allows sub-memory 313 to be constructed on a single circuit board, with maximum area therein devoted to data storage. One aspect of sub-memory 313 bussing is use of a single common bus to transfer data words or addresses in parallel to multiple receiving points; control signals then transfer bussed words into selected receiving points. This appears in busses MI, DI, RA, CA, MO, and REFADR. ADR bus 530 represents a further development of this aspect; addresses to banks 520 and 522 are transferred sequentially, thereby halving address bus requirements of banks 520 and 522. A particular feature of ADR and A busses is use of memory elements 1410, capable of sequentially accepting row and column addresses. A second development appears in busses RA and CA, wherein addresses are continually transferred in parallel to latches 526 and 528 of modules 512 to 518. An addressed module thereby seizes an address merely by ceasing acceptance of subsequent addresses. This reduces time required to address any particular memory module.

A second aspect of sub-memory 313 bussing appears on O bus 551; registers 542 through 548 use tri-state logic to multiplex data onto O bus 551. This method is not used between DOA bus 513 to DOD bus 519 and MO bus 541; tri-state memory elements 1410 switch too slowly to avoid mutual interference at data rates involved. Instead, output multiplexor 540 is used. As shown in FIG. 5, output multiplexor 540 is the only actual, physical multiplexor in sub-memory 313.

Seventh, switching of sub-memory 313 and out of battery backup (BBU) mode occurs only during a refresh cycle. Operating states of memory modules 512 to 518, and memory logic 538, are therefore known, avoiding possible random operation of memory 313 and loss of data.

An eighth feature is cutoff of the power to major portions of memory logic 538 and memory modules 512 to 518 during BBU operation. This reduces power requirements of sub-memory 313 to banks 520 and 522 and battery backup and refresh control circuitry.

In conclusion, it should be noted that there are other features of sub-memory 313 and sub-memory 313 can be easily reconfigured to resemble memory 111 of computer 110, with separate data and address input busses. A second buffer 534 would be added, for data input bus 120b, providing data outputs to data latch 536. MEMIN bus 520 and buffer 534 of FIG. 5 then transfer only address information into sub-memory 313. This would decrease write access time of sub-memory 313 from two MEMIN bus 320 cycles, i.e., 200 nanoseconds, to a single bus cycle by allowing write addresses and data to enter sub-memory 313 in parallel. This requires a change in time of occurrence of DATAINLATCH, e.g., by utilizing WINDOW as DATAINLATCH.

Description of sub-memory 313 is thus concluded and prefetch processor 312 will be described next.

4. Pre-fetch Processor (PFP)312 (FIGS. 3, 25–27)

PFP 312 performs instruction look-ahead for CPU 314 by fetching from memory 311, and storing in PFP memory 303, a sequence of instructions in advance of the instruction currently being executed by CPU 314.

Structure and general operation of PFP 312 have been described previously in discussion of architecture and operation of computer 310. The following discussion will begin with a glossary of signals present in PFP 312, followed by a discussion of PFP 312 operation on block diagram level. Circuitry of PFP 312 will then be presented and, finally, cerain features of PFP 312 will be summarized.

A. PFP 312 Signal Glossary (1) Bus signals:
  (a) MEMOUT(0–19): (MEMORY OUT) 20-bit instruction word appearing on MEMOUT bus 318.

(b) MEMIN(0–19): (MEMORY INPUT) 20-bit physical address to Memory 311.

(c) CPUPC(8–15): (CPU PROGRAM COUNT) Eight low-order logical address bits in CPU PC register 364; used as program count and read address input to PFP memory 330.

(d) PFPPCR(0–19): (PFP PROGRAM COUNT, REQUESTED) 20-bit physical address in PFP PCR register 336.

(e) PFPPCF(12–15): (PFP PROGRAM COUNT, FETCHED) Low-order logical address bits in PFP PCF register 332; used as write address inputs to PFP memory 330.

(f) HIADR(0–5, 16–19): (HIGH ORDER ADDRESS) Direct or mapped high-order physical address bits appearing on HIADR bus 328.

(g) ALUOUT(9–15): (ALU OUTPUT) Low-order physical address bits appearing on ALUOUT bus 326 and bus 326c.

(2) Individual Control Signals (a) ALCCRFEXT: (ALC CLEAR TO REQUEST FETCH, EXTENDED) Signal indicating CPU 314 is executing an ALC instruction allowing PFP 312 to execute a fetch operation.

(b) ALC CYCLE: Signal indicating CPU 314 is about to execute an arithmetic and logic class (ALC) instruction.

(c) CONSOLEMODE: (CONSOLE MODE) Signal indicating computer 310 is operating under control of an external console.

(d) CRF: (CLEAR TO REQUEST FETCH) Signal enabling PFP 312 to execute a fetch operation.

(e) CTEQ0: Signal indicating PFP 312 has no instructions for CPU 314.

CTEQ1: Signal indicating PFP 312 has only one remaining instruction in memory 330 for CPU 314.

(g) CTGT1: Signal indicating PFP 312 has more than one instruction stored in memory 330 for CPU 314.

(h) DONECURRBLK: (DONE CURRENT BLOCK) Signal indicating PFP 312 has reached end of the block of memory 311 addresses currently available to PFP 312.

(i) ENB10CLK: (ENABLE 10CLK) General enabling signal used to synchronize MEMCLK and USEQCLK with 10CLK and thus with 40CLK.

(j) ENDUCYCLE: (END MICROCYCLE) Signal indicating microinstruction logic 342 is completing current microinstruction sequence and a new microinstruction will begin.

(k) EOCB: (END OF CURRENT BLOCK) Signal indicating PFP 312 has fetched last available address of block of memory 311 addresses currently accessible by PFP 312.

(l) FETCHSTARTED: (FETCH STARTED) Signal indicating PFP 312 is performing a prefetch operation.

(m) FULL: (FULL) Signal indicating PFP memory 330 is full and PFP 312 should generate no further instruction fetches.

(n) GPPRESET: (GENERAL PURPOSE PRESET) General purpose preset signal for computer 310.

(o) GPRESET: (GENERAL PURPOSE RESET) General purpose reset signal for computer 310.

(p) HSCREQ: (HIGH-SPEED CHANNEL REQUEST) Signal indicating a high-speed channel device has seized access to memory 311.

(q) INCPC: (INCREMENT PROGRAM COUNT) Clock signal to CPUPC register 364 to increment CPUPC.

(r) INCPCENB: (INCREMENT PROGRAM COUNT ENABLE) Signal indicating PC is to be incremented.

(s) INSTSAGEALC: (INSTRUCTION SAGE ALC) Signal from microinstruction logic 542 indicating CPU 314 is about to execute an ALC instruction; indicates PFP 314 may execute a fetch operation.

(t) LOADINST: (LOAD INSTRUCTION) Clock pulse indicating requested instruction word is present on MEMOUT bus 318; used to load instruction word from MEMOUT bus 318 into PFP memory 330; used to increment four-bit PFPPCF in PFP PCF register 332.

(u) MEMCLK: (MEMORY CLOCK) 100 nanosecond memory bus clock phase synchronized with 40CLK.

(v) MEMCLKENB: (MEMCLK ENABLE) Signal inhibiting MEMCLK on occurrence of MEMSORRY or MEMWAIT.

(w) MEMSORRY: (MEMORY SORRY) Signal indicating a memory 311 request interference has occurred.

(x) MEMSTART: (MEMORY START) Signal to memory 311 initiating memory 311 read or write cycle.

(y) MEMSTARTCPU: (MEMORY START, CPU) MEMSTART provided by CPU 314.

(z) MEMSTARTPFP: (MEMORY START, PFP) MEMSTART provided by PFP 312.

(aa) MEMWAIT: (MEMORY WAIT) Signal delaying memory 311 operation after read or write cycle has been initated; used to coordinate operation of memory 311 and another device having a slower data transfer rate.

(bb) $\mu$SEQCLK: (MICROSEQUENCE CLOCK) Clock signal provided by microinstruction logic 342; used to load high-order bits of physical address into PFP PCR register 336.

(cc) $\mu$SEQTEST: (MICROSEQUENCE TEST) Signal indicating condition being tested by computer 310.

(dd) NANOCLK: (NANOCLOCK) MEMCLK derived clock signal used within PFP 312; inhibited for single MEMCLK periods when memory 311 access seized by a high-speed channel.

(ee) PCDEST: (PROGRAM COUNT DESTINATION) Signal used to load low-order bits of logical address into CPU PC register 364 for use as PC.

(ff) PCDESTENB: (PROGRAM COUNT DESTINATION ENABLE) Signal indicating fetch of a new block of instruction addresses in memory 311 is to be initated; enables loading of new logical and physical addresses into PFP PCR register 326, CPU PC register 364, and PFP PCF register 332; used to enable memory 330 outputs to transfer a stored instruction work onto PFP bus 322; used to load four lowest order bits of logical address into PFP PCF register 332.

(gg) PCSRCENB: (PROGRAM COUNT SOURCE ENABLE) Enabling signal to CPU

PC register 364 to transfer CPUC onto ALUIN bus 324.

(hh) PFPDESTENB: (PFP DESTINATION ENABLE) Enable signal to PFP memory 330 to transfer instruction onto PFP bus 322.

(ii) PFPPCTC2: (PFP PROGRAM COUNT TERMINAL COUNT 2) Signal indicating PFP 312 has reached last available address in block of memory 311 addresses currently accessible by PFP 312.

(jj) PFPREADY: (PFP READY) Signal to CPU 314 indicating instruction requested by CPU 314 is available in PFP 312.

(kk) PFPREQ: (PFP REQUEST) Signal indicating PFP 312 is requesting memory 311 access to perform a prefetch operation.

(ll) PFPREQFETCH: (PFP REQUEST FETCH) Signal indicating PFP 312 is enabled to request memory 311 access for a pre-fetch operation.

(mm) RANDCRF: (RANDOM MICROINSTRUCTION CLEAR TO REQUEST FETCH) Signal from microinstruction logic 542 indicating a microinstruction is being executed that allows PFP 312 to execute a fetch operation.

(nn) SAGDUPDATEPC: (SAGE UPDATE PROGRAM COUNT) Signal from microinstruction logic 342 indicating CPUPC to be incremented.

(oo) TESTRESET: (TEST RESET) Reset signal used during computer 310 test sequence.

(pp) UPDATEPC: (UPDATE PROGRAM COUNT) Signal from ALU 356 indicating CPUPC is to be incremented.

(qq) WCBF: (WRITE CURRENT BLOCK FAULT) Signal indicating a possible instruction conflict exists between a modified instruction in the block of memory 311 addresses accessible to PFP 312 and an instruction stored in memory 330.

(rr) WRITECURRCLK: (WRITE CURRENT CLOCK) Signal indicating a memory 311 write cycle is occurring in the block of memory 311 addresses currently accessible by PFP 312.

(ss) 10CLK: 100 nanosecond clock phase synchronized with 10CLK.

(tt) 20CLK: 50 nanosecond clock phase synchronized with 40CLK.

(uu) 40CLK: 25 nanosecond clock.

B. Operation of PFP 312 (FIG. 3)

Referring to FIG. 3, as previously discussed a sequence of instructions comprising a user program is generally stored in successive address locations in memory 311. CPU 314 tracks program execution by storing part of logical address of an instruction being executed by CPU 314 in CPU PC register 364 as CPU program count (CPUPC). CPUPC is, in part, used by ALU 356 and MAP 354 to generate direct and mapped physical addresses to memory 311.

When a program is executed, CPUPC of first instruction address is loaded into CPU PC register 364. This initial CPUPC is then used to generate an initial physical address which, as described below, is loaded into PFP PCR register 336. Part of initial CPUPC is also loaded into PFP PCF register 332. CPUPC is subsequently incremented as this or subsequent instruction steps are executed by CPU 314, to call successive instructions from PFP 330. When instructions are not located in successive memory 311 addresses, e.g., due to jump instruction, a new initial CPUPC is loaded into CPU PC register 364. The new CPUPC then generates a new initial physical address for the new block of sequential instructions.

Initial physical addresses, generated from CPUPC at start of each block of sequential instructions, are loaded into prefetch processor program count requesting (PFP PCR) register 336 as PFPPCR. At the same time, low order bits 12 to 15 of CPUPC are loaded into pre-fetch processor program count fetched (PFP PCF) register 332 as PFPPCF. As described above (Instruction and Data Words), low order bits 6 to 15 of logical and direct or mapped physical addresses are identical. Low order initial address bits stored in registers 364, 336, and 332 are thereby identical at start of a block of instructions.

After receiving initial PFPPCR and PFPPCF, PFP 312 uses memory bus cycles not required by CPU 314, or other devices, to perform pre-fetch. As will be described further below, PFP 312 receives signals indicating when no other computer element currently requires access to memory 311. PFP 312 then transfers initial PFPPCR onto MEMIN bus 320, generates MEMSTARTPFP, and generates pre-fetch request signal (PRFREQ). PRFREQ is compared to MEMSORRY from memory 311. If MEMSORRY indicates a request interference has occurred, PFP 312 delays its request to a subsequent memory bus cycle. PFP 312 will continue requesting that address on each memory bus cycle until access is granted.

When access is granted, PFP 312 begins counting MEMIN bus 320 cycles as previously described. At the same time, 7 lowest order bits 9 to 15 of PFPPCR are incremented by one to generate a new PFPPCR. New PFPPCR is physical address of next instruction to be fetched. PFP 312 continues to request instructions from memory 311 as just described: PFP PCR register 336 thereby generates sequential PFPPCR read addresses to memory 311 and tracks instructions requested from memory 311.

Instructions requested by PFP PCR register 336 appear on MEMOUT bus 318 four memory bus cycles after request initiation, and are transferred into PFP memory 330. Memory 330 may contain 16 address locations. Locations of instructions in memory 330 are selected by 4-bit PFPPC write address in PFP PCF register 332. PFPPCF is incremented as each instruction is received. Instructions are thereby stored in sequential addresses in memory 330 (e.g., locations 0 to 15; then 0 again, and so on) and PFP PCF register 332 tracks fetched instructions.

As discussed above, CPUPC represents an instruction to be executed by CPU 314, and is incremented at or near start of execution of that instruction. Four lowest order bits 12 to 15 of CPUPC are used as PFP memory 330 readout address, so that the next instruction to be executed is requested from memory 330 as a current instruction is being executed. Since CPUPC and PFPPCF are initially identical, and are each incremented sequentially, instructions are read from memory 330 in same sequence as written in. CPU 314 will therefore receive instructions in same sequence as originally stored in memory 311.

Certain restrictions may be placed on operation of PFP 312 to avoid instruction fetch errors and to ensure efficient operation. First, as indicated above, PFP PCR register 336 may vary only 7 lowest order bits 8 to 15 of physical address PFPPCR. Higher order bits 0 to 5 and 16 to 19 of PFPPCR can be changed only by loading a new initial PFPPCR into PFPPCR register 366. As discussed previously, there is a one-to-one relationship between low order bits 6 to 15 of logical and physical addresses. High order bits 0 to 5 of logical address, however, may be MAPped into bits 0 to 5 and 16 to 19 of physical address. Therefore, allowing PFP 312 to modify high order bits 0 to 5 and 16 to 19 of PFP PCR could result in reading instructions from another user's program. This can be avoided by limiting PFP 312 to operating with 7 low order bits 9 to 15 of PFPPCR.

Second, bits 12 to 15 of PFPPCF correspond to four lowest order bits 12 to 15 of CPUPC. This may limit fetching by PFP 312 to at most 16 instructions ahead of the instruction currently being executed by CPU 314. This limitation may be provided because of probability of a jump instruction occurring in a sequence of instructions. A jump requires discarding pre-fetched instructions stored in memory 330 and fetching of a new block of instructions jumped to. Operating efficiency of PFP 312 is thereby enhanced by providing sufficient look-ahead so that CPU 314 rarely need wait for instructions while minimizing discard of unnecessarily fetched instructions.

In summary, PFP 312 has pre-fetch access to a block of 128 consecutive address locations in memory 311, as defined by 7 variable bits 9 to 15 of PFPPCR. First address in block is determined by initial physical address PFPPCR loaded into PFP PCR register 336. Pre-fetch is performed within a moving window within the block. Pre-fetch window is a maximum of 16 addresses long. First window address is determined by CPUPC and last fetched window address is determined by PFPPCF. PFP 312 may reach end of the current 128 address block before receiving a new initial PFPPCR. If this occurs, PFP 312 generates DONECURRBLK, indicating it has reached end of its accessible address space. DONECURRBLK inhibits operation of PFP 312 until new initial PFPPCR and PFPPCF are provided. It is understood that other fetch window and accessible instruction block lengths may be used in PFP 312.

Turning to other elements of PFP 312, PFP READY logic (PFPRDY) 334 compares PFPPCF and CPUPC to provide outputs indicating whether memory 330 contains only 1 or several instructions in advance of that currently executing in CPU 314. These outputs in turn generate PFPREADY indicating whether PFP 312 is ready to provide an instruction requested by CPUPC. PFPRDY 334 also provides output FULL indicating memory 330 is full and thus unable to accept further instructions. In this case, operation of PFP 312 is suspended until CPU 314 has read at least one instruction out of memory 330.

Write Current Block logic (WCB) 338 monitors memory 311 write operations, e.g., by CPU 314. WBC 338 compares PFPPCR to any CPU 314 write address appearing on MEMIN bus 320. If CPU 314 writes into a memory 311 address within the block of instructions currently accessible by PFP PCR 336, WCB 338 provides an indication of this event. This feature warns of possible conflict between a subsequently modified instruction in memory 311 and a corresponding, previously fetched unmodified instruction in memory 30.

C. PFP 312 Circuitry (FIGS. 25–27)

Figure 25:
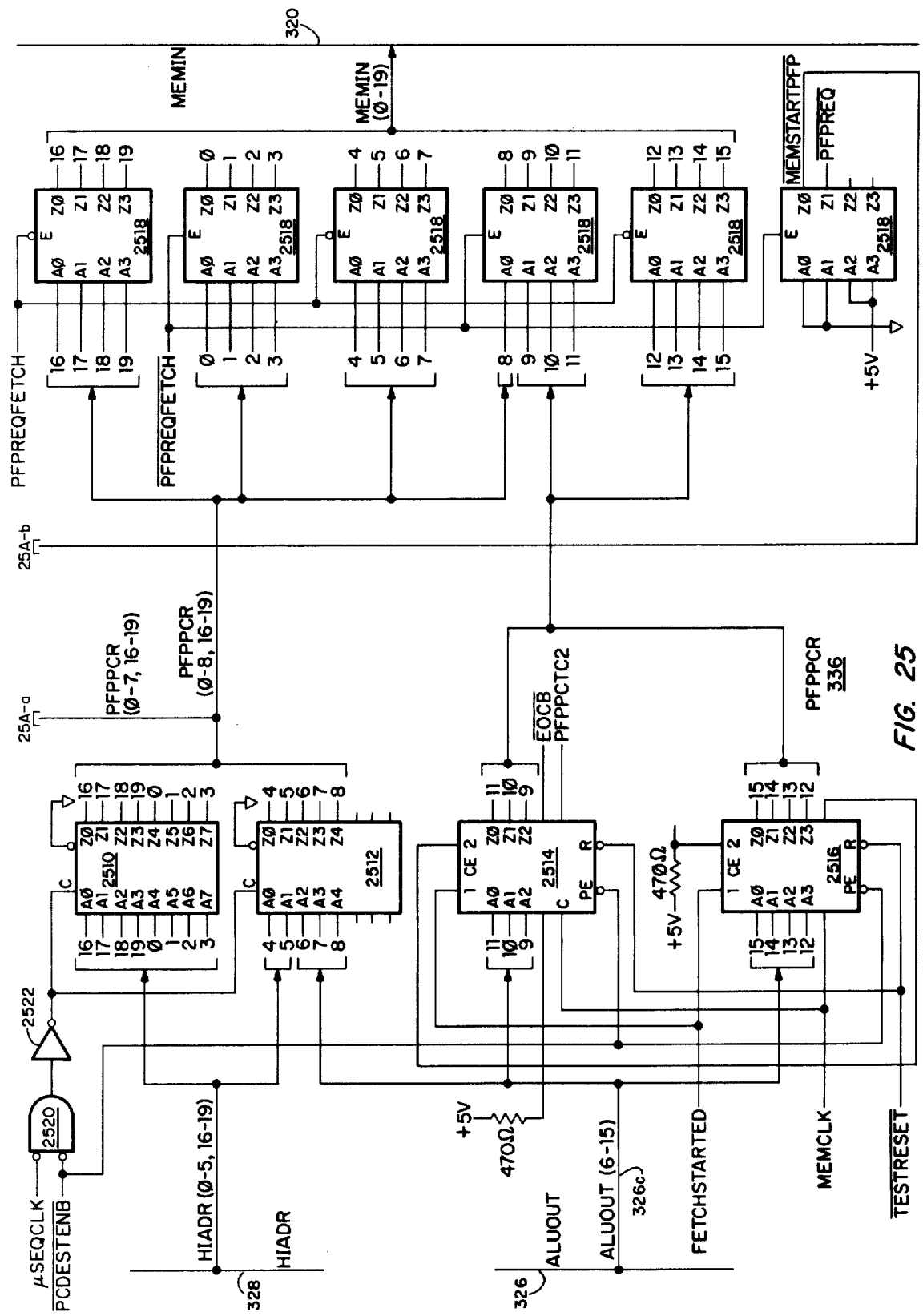
FIGS. 25 and 25A are schematics of pre-fetch processor instruction request circuitry.
Figure 26:
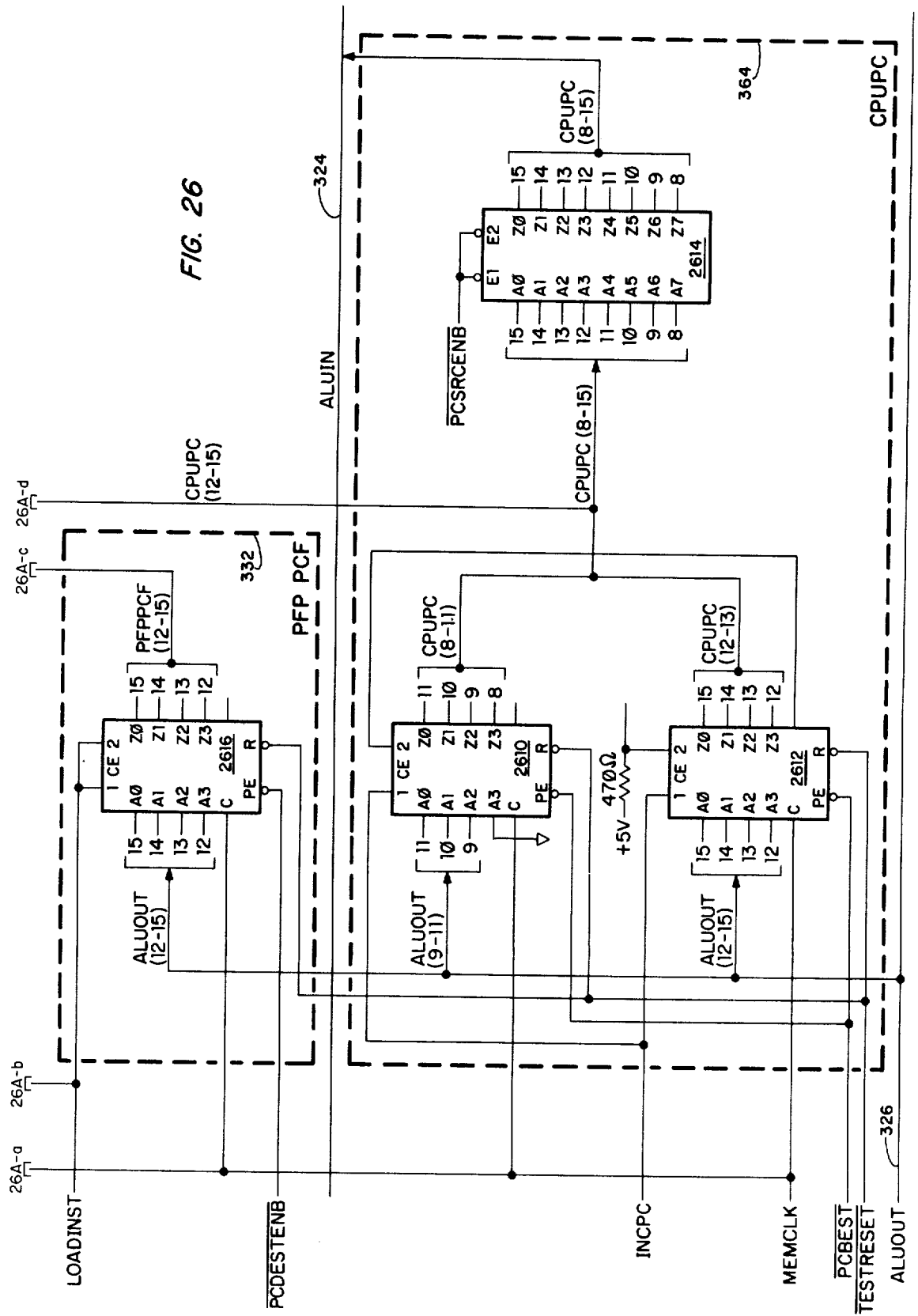
FIGS. 26 and 26A are schematics of pre-fetch processor memory circuitry.
Figure 27:
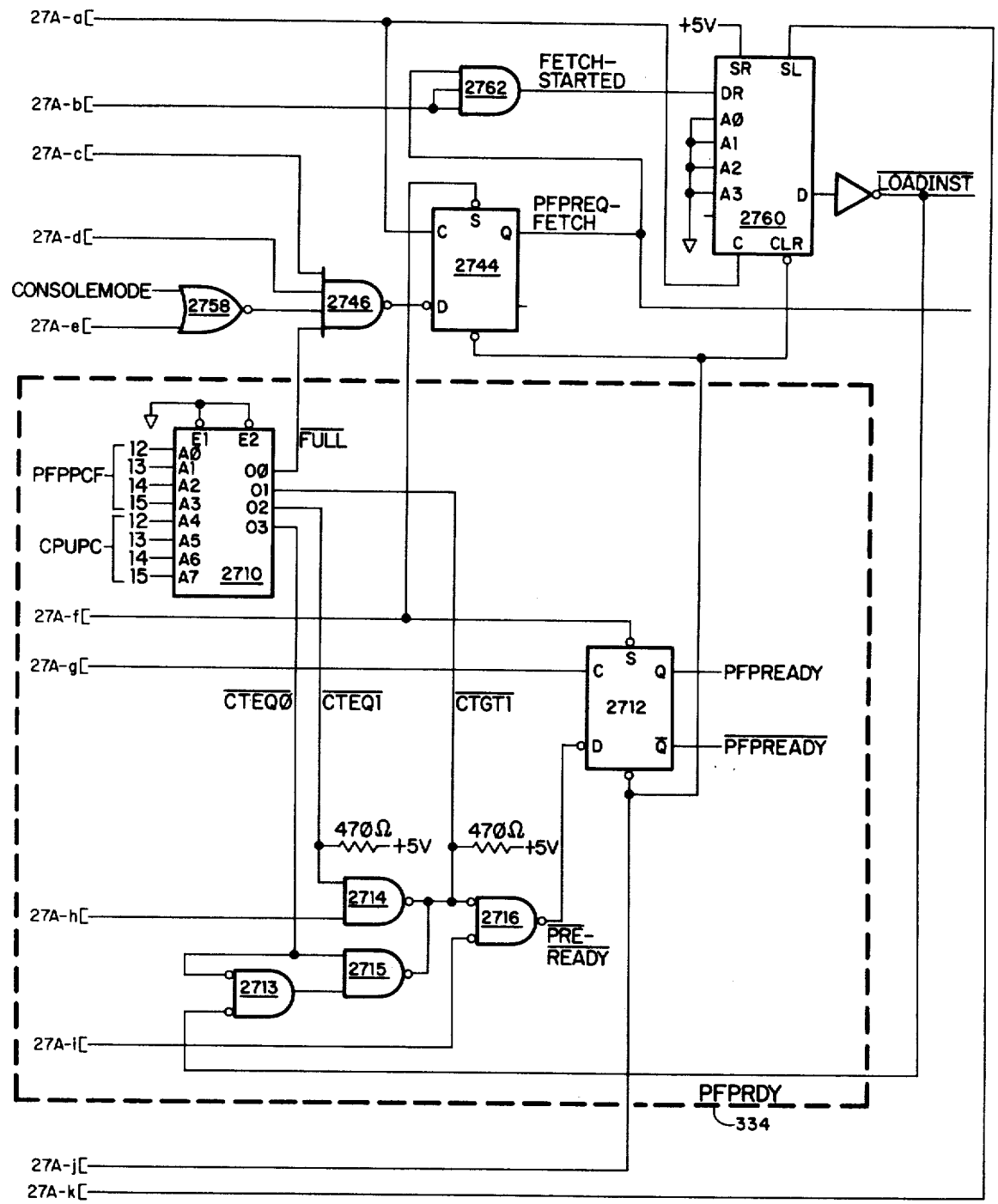
FIGS. 27 and 27A are schematics of pre-fetch processor control circuitry.

Circuitry used in the presently preferred embodiment of PFP 312 is presented in FIGS. 25, 26, and 27. As in discussion of memory 311, detailed structure and operation of this circuitry will be described only where necessary to illustrate operation of PFP 312. Conventional circuit symbols are used throughout and structure and operation of circuitry will be understood by one ordinarily skilled in the art. Only those components necessary to illustrate operation of PFP 312 will be designated by a reference numeral and in the following parts list. All components drawn in same manner as those referenced are to be considered identical to, and operating same as, those referenced.

Figure 25A:
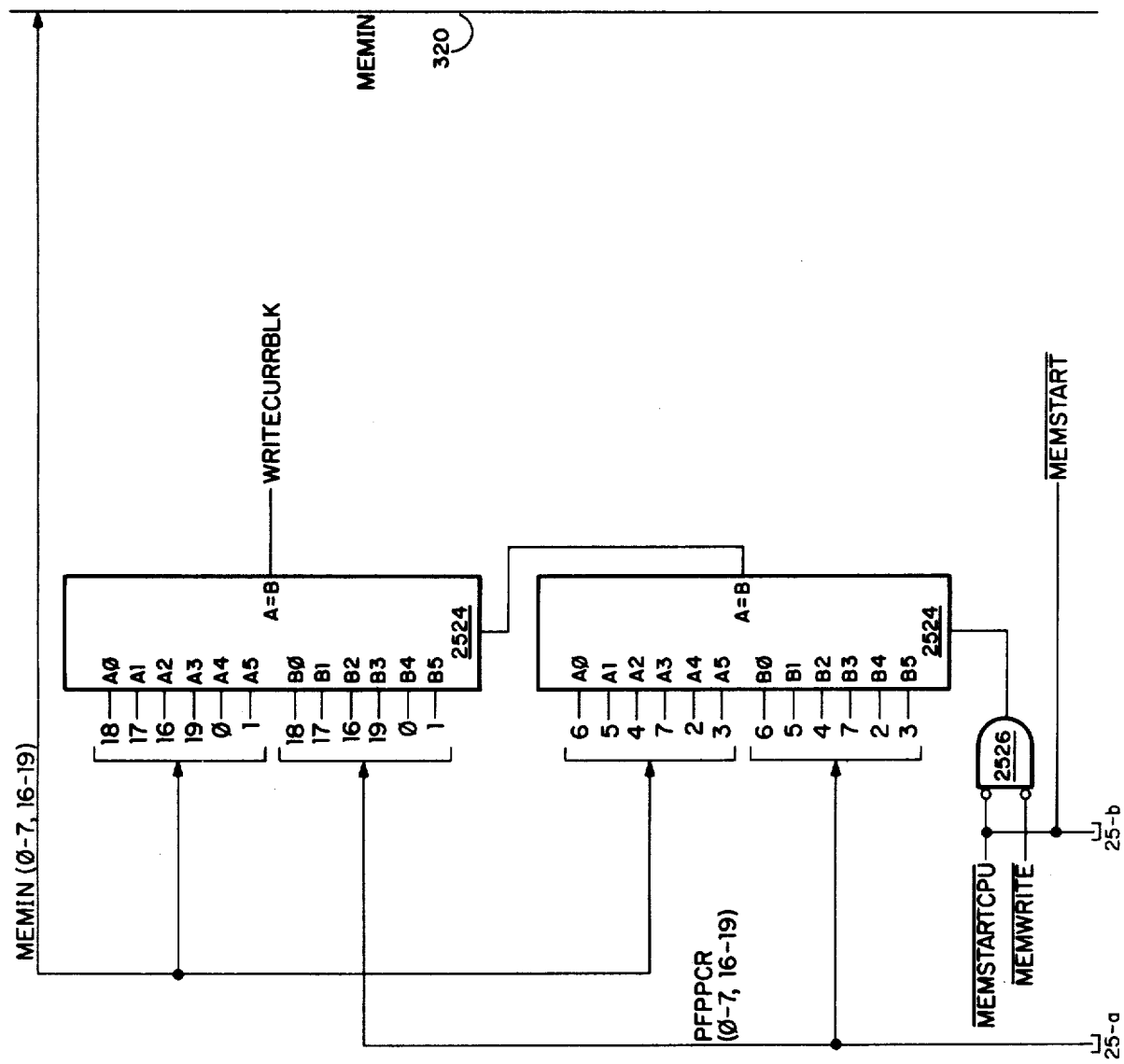

PFP PCR register 336 and WCB 338 are shown in FIGS. 25 and 25A. Referring to FIG. 25, PFP PCR register 336 comprises registers 2510 and 2512, counters 2514 and 2516, and tri-state buffer drivers 2518. As discussed previously, high order bits 0 to 5 and 16 to 19 of physical address appear on HIADR bus 328 as signals HAIDR 0 to 5 and 16 to 19. HIADR 0 to 5 and 16 to 19 are connected to inputs of registers 2510 and 2512. Low order bits 6 to 15 of physical address appear on ALU-OUT bus 326 as signals ALUOUT 6 to 15. ALUOUT 9 to 15, corresponding to seven variable bits 9 to 15 of PFP PCR, are connected to inputs of counters 2514 and 2516. Low order address bits ALUOUT 6 to 8, corresponding to non-variable bits 6,7 and 8 of PFP PCR are connected to inputs of register 2512. PFPPCR appears on outputs of registers 2510 and 2512 and counters 2514 and 2516 as PFPPCR 0 to 19. PFPPCR is connected to inputs of buffer drivers 2518. Corresponding physical address bits MEMIN 0 to 19 appear on buffer drivers 2518 outputs, which are connected to MEMIN bus 320.

An initial physical address appearing on ALUOUT bus 326 and HIADR bus 328 is loaded into registers 2510 and 2512 and counters 2514 and 2516 upon occurrence of $\overline{\text{PCDESTENB}}$. $\overline{\text{PCDESTENB}}$ enables parallel entry (PE) inputs of counters 2514 and 2516. Initial physical address is then transferred into counters 2414 and 2515 by MEMCLK to counters 2514 and 2516 clock inputs. In registers 2510 and 2512, $\overline{\text{PCDESTENB}}$ enables gate 2520 to provide µSEQCLK through inverter 2522 to registers 2510 and 2512 clock inputs. Thereafter, PFPPCR 9 to 15 in counters 2514 and 2516 is incremented by MEMCLK each time counters 2514 and 2516 receive count enable input FETCHSTARTED. As will be described below in discussion of FIG. 22, FETCHSTARTED occurs each time PFP 312 requests an instruction from memory 311. $\overline{\text{TESTRESET}}$ to counters 2514 and 2516 reset inputs is used to reset PFPPCR 9 to 15 to zero, e.g., during a computer 310 test sequence.

Counters 2514 and 2516 also provide outputs EOCB and PFPPCTC2 to PFP 312 control circuitry shown in FIG. 27. EOCB indicates last available address of current block is being requested. PFPPCTC2 becomes active when last available address is being requested and inhibits further pre-fetch requests.

Buffer drivers 2518 are enabled to place PFPPCR on MEMIN bus 320 by PFPREQFETCH. PFPREQFETCH is generated by PFP 312 when, as described further below, PFP 312 has requested and been granted access to memory 311. PFPREQFETCH also causes buffer drivers 2518 to generate $\overline{\text{MEMSTARTPFP}}$. $\overline{\text{MEMSTARTPFP}}$ is wire ORed with $\overline{\text{MESTARTCPU}}$ from CPU 314 to provide $\overline{\text{MEMSTART}}$ to memory 311. Similarly, drivers 2518 generate $\overline{\text{PFPREQ}}$ to PFP 312 control circuitry to indicate a PFP request has been initiated. As described further below, $\overline{\text{PFPREQ}}$ is compared to MEMSORRY to defer PFP 312 fetch if a memory request interference occurs.

Referring to FIG. 25A, WCB 338 comprises comparators 2524 and gate 2526. Comparators 2524 compare physical address bits PFP PCR 0 to 7 and 16 to 19 with corresponding address bits MEMIN 0 to 7 and 16 to 19 of MEMIN bus 320. Comparators 2524 are enabled through gate 2526 by simultaneous occurrence of $\overline{\text{MEM START}}$ and $\overline{\text{MEMWRITE}}$ to memory 311. $\overline{\text{MEM WRITE}}$ occurs only when some computer 310 element other than PFP 312, e.g., CPU 314, writes into memory 311. Comparators 2524 generate WRITECURRBLK if comparison of PFPPCR and MEMIN indicates a write has occurred in block of addresses currently accessible to PFP 312.

Figure 26A:
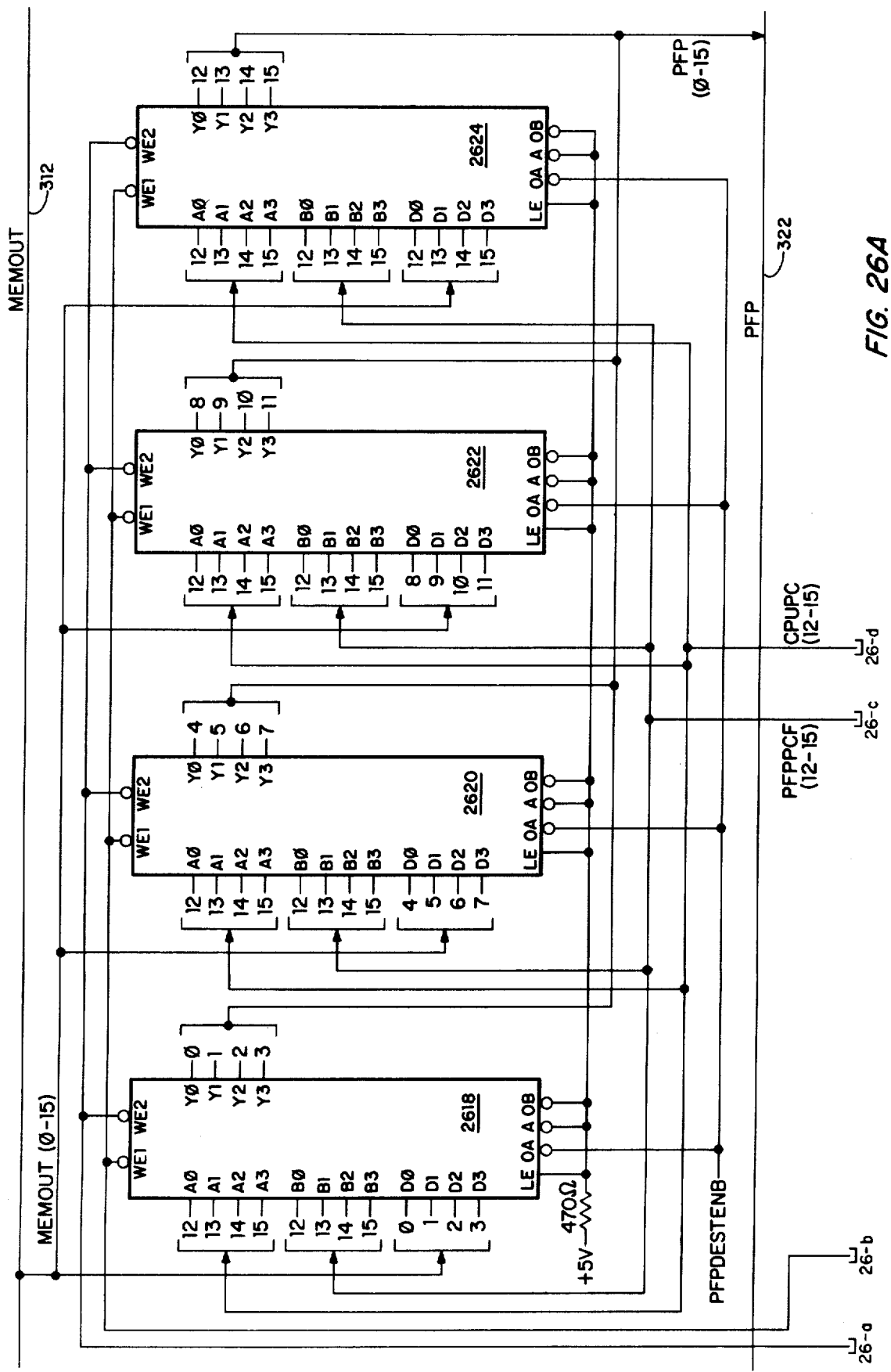

CPU PC register 364, PFP PCF register 332, and PFP memory 330 are shown in FIGS. 26 and 26A. Referring to FIG. 26, CPU PC register 364 comprises counters 2610 and 2612 and buffer driver 2614. Counters 2610 and 2612 data inputs are connected to low order logical address bits ALUOUT 9 to 15 from ALUOUT bus 326. ALUOUT 9 to 15 correspond to seven variable address bits PFPPCR 9 to 15 as data inputs. An eighth data input bit of counters 2610 and 2612 is connected logic 0 (ground) and corresponds to ALUOUT 8 and PFP PCR 8. ALUOUT 9 to 15 and logic 0 eighth bit are loaded into counters 2610 and 12 by parallel enter enable input $\overline{\text{PDCEST}}$ and clock input MEMCLK.

CPUPC appears on counter 2610 and 2612 outputs as CPUPC 8 to 15 and is incremented by MEMCLK when count enable input INCPC is active. INCPC enables counters 2610 and 2612 as instructions are executed by ALU 356. Again, reset input $\overline{\text{TESTRESET}}$ is provided to reset CPU PC 8 to 15 to 0.

CPUPC 8 to 15 are connected to inputs of inverting buffer amplifiers 2614. Buffer amplifier 2614 are enabled to place inverted CPUPC on ALUIN bus 324.

As will be discussed with reference to FIG. 26A, CPUPC is connected to readout address inputs of PFP memory 330 and to inputs of PFPRDY 334.

Referring to FIG. 26A, PFP Memory 330 is shown. Memory 330 comprises random access memories (RAM) 2618, 2620, 2622, and 2624. RAMs 2618 to 2624 may each be 16 word by 4-bit wide memories collected in parallel, so that memory 330 may comprise a 16-word by 16-bit wide memory. As stated previously, memory 330 may be other than 16 bits wide by 16 words long.

CPUPC 12 to 15 from CPU PC register 364 are connected to read address inputs of RAMs 2618 to 2624. PFPPCF 12 to 15 from PFP PCF register 332 are connected to write address inputs of RAMs 2618 to 2624. RAMs 2618 to 2624 data inputs are connected to MEMOUT bus 318 (MEMOUT 0 to 19). MEMOUT0 to MEMOUT3 are connected to RAM 2618 data inputs and MEMOUT4 to MEMOUT7 connected to RAM 2620 data inputs. MEMOUT8 to MEMOUT11 are connected to RAM 2622 data inputs and MEMOUT12 to MEMOUT15 connected to RAM 2624 data inputs. MEMOUT 15 to 19 are, as discussed previously, error correction bits used by ERCC logic 319 and are not stored in PFP memory 330. RAMs 2618 to 2624 data outputs, PFP0 to PFP15 are connected to PFP bus 322. Instructions on MEMOUT bus 318 are written into memory 330 when RAMs 2618 to 2624 receive simultaneous write enable inputs MEMCLK and $\overline{\text{LOADINST}}$. Stored instructions are read from memory 330 when RAMs 2618 to 2624 receive output enable input $\overline{\text{PFPDE STENB}}$. This would be the normal condition.

Figure 27A:
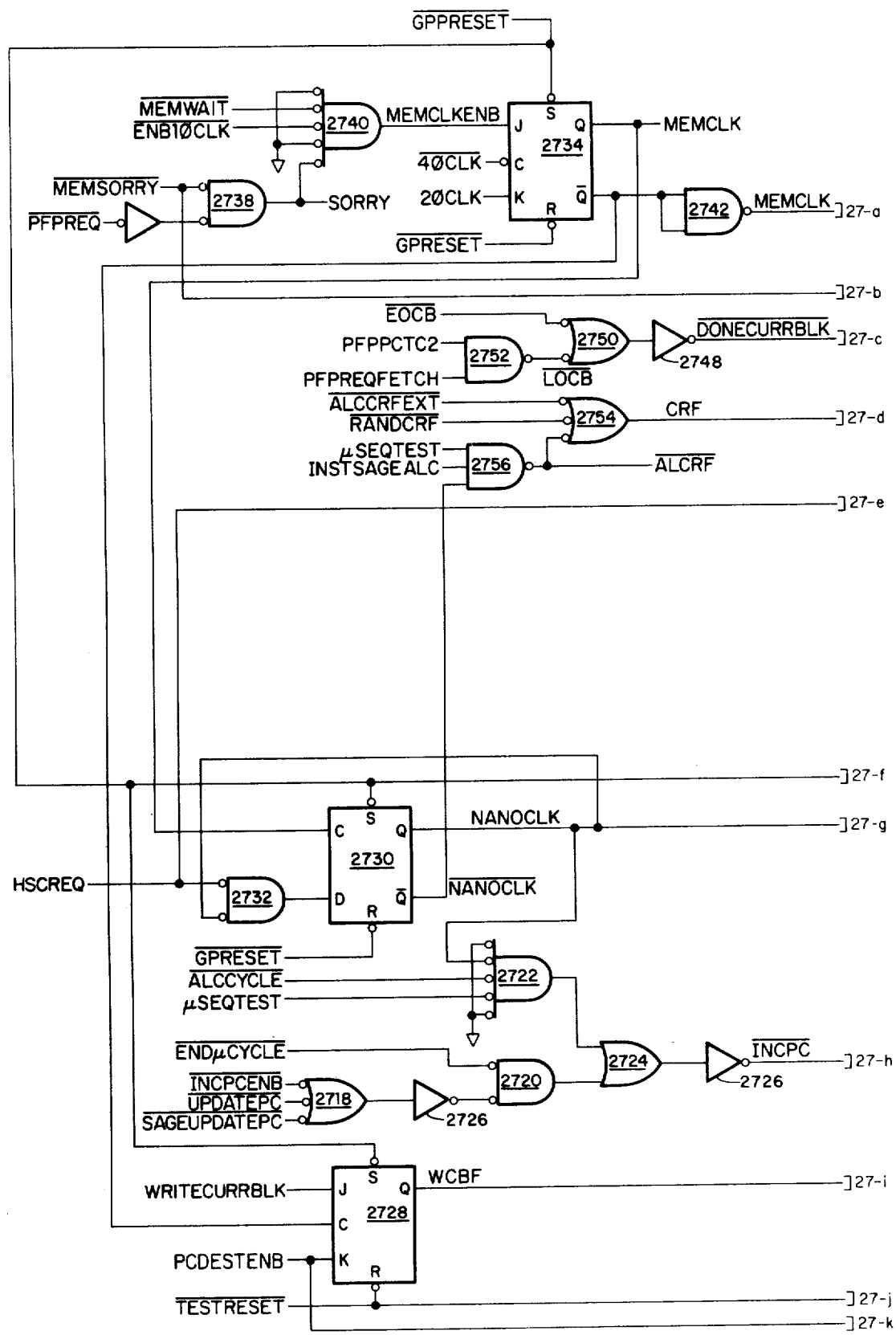

PFP RDY 334 and PFP 312 control circuitry are shown in FIGS. 27 and 27A. Referring to FIG. 27, PFP RDY 334 comprises programmable read only memory (PROM) 2710, flip-flop 2712, and gates 2714, 2715, and 2716. PROM 2710 acts as a comparator for read (CPUPC) and write (PFPPCF) addresses to memory 330. PROM 2710 provides output $\overline{\text{FULL}}$, indicating memory 330 is full; $\overline{\text{CTGT1}}$, indicating more than 1 instruction is available for CPU 314; CTEQ1, indicating memory 330 contains only 1 instruction in advance of that currently executing in CPU 314; and CTEQ0, indicating memory 330 contains no instructions.

CTEQ1 and $\overline{\text{INCPC}}$ are connected to inputs of gate 2714, which provides an output indicating memory 330 contains only one instruction. $\overline{\text{INCPC}}$, discussed further below, is a signal indicating whether CPU 314 is about to read an instruction from memory 330. Gate 2714 output is wire ORed with CTGT1 and gate 2713 output. CTGT1 represents that more than 1 instruction is available in memory 330. Gate 2713 input $\overline{\text{LOADINST}}$ indicates PFP 312 is presently transferring an instruction from memory 311 into PFP memory 330. Gate 2713 output thereby indicates PFP 312 presently does not have an instruction for CPU 314 but an instruction will be available at end of current MEMCLK cycle. Gate 2713 output is then ANDed with $\overline{\text{INCPC}}$ by gate 2715 to provide gate 2715 output. ORed output of gate 2714 is connected to an input of gate 2716, as is WCBF (Write Current Block Fault, discussed below). Gate 2716 output $\overline{\text{PREREADY}}$ indicates whether PFP 312 will be unable to deliver instructions to CPU 314; either because instructions are not available or because there is a possible conflict between instructions stored in memories 313 and 311. PREREADY is connected to flip-flop 2712 data input. Flip-flop 2712 clock input NANOCLK, discussed below, samples $\overline{\text{PREREADY}}$ to generate output PFPREADY. PFPREADY indicates whether PFP 312 is ready to provide instructions to CPU 314.

PFP 312 control circuitry will now be described. Referring to FIG. 27A, circuitry generating INCPC, WCBF, and NANOCLK, referred to above, will be discussed first.

$\overline{\text{INCPC}}$ is generated by gates 2718 to 2724 and associated inverters 2726. As stated above, $\overline{\text{INCPC}}$ occurs when an instruction is to be read from memory 330. More particularly, INCPC indicates CPUPC is to be incremented by MEMCLK to CPU PC register 364, e.g., on a skip instruction.

Inputs $\overline{\text{INCPCENB}}$, $\overline{\text{UPDATEPC}}$, and SAGEUPDATEPC to gate 2718 indicate CPUPC is to be incremented. These are inputs from hardwired logic detecting microinstruction conditions requiring CPUPC to be incremented. Gate 2718 output and $\overline{\text{END}\mu\text{CYCLE}}$ are connected to inputs of gate 2720. $\overline{\text{END}\mu\text{CYCLE}}$ indicates a current microinstruction is ending and a new microinstruction is to begin.

ALCCYCLE input to gate 2722 CPUPC is to be forcibly incremented due to an ALC skip instruction. $\mu$SEQTEST input to gate 2722 from microinstruction logic 342 represents a microinstruction test condition indicating whether an ALC skip instruction is true. Input NANOCLK to gate 2722 is a PFF312 inhibit described below.

Finally, gates 2720 and 2722 outputs are ORed by gate 2724, which provides output INCPC. Inverters 2725 and 2726 invert gates 2724 and 2718 outputs to provide desired polarity signals to gates 2720 and 2714.

WCBF is generated by flip-flop 2728. J input WRITE CURRBLK of flip-flop 2728, discussed previously, indicates a write cycle has occurred in memory 311 in the block of instructions currently accessible by PFP 312. PCDESTENB, also discussed previously, indicates a new physical address is to be loaded into PFP PCR register 336, to assigning a new block of instructions to PFP 312. Flip-flop 2728 clock input $\overline{\text{MEMCLK}}$ samples WRITECURRBLK and PCDESTENB. WCBF thereby indicates, after a WRITECURRBLK, that a possible instruction conflict is present and, after a PCDSTENB, that the conflict has been resolved by re-initiating PFP 312 fetch operation. Flip-flop 2728 set and reset inputs $\overline{\text{GPPRESET}}$ and $\overline{\text{TESTRESET}}$ can clear or set flip-flop 2728, thereby generating WCBF.

Circuitry generating NANOCLK and MEMCLK is regarded as part of CPU 314 but is presented here to aid understanding of PFP 312. NANOCLK is generated, by flip-flop 2730 and gate 2732, from MEMCLK. NANOCLK output of flip-flop 2730 is connected to flip-flop 2730 data input through gate 2732, which inverts NANOCLK. Inverted NANOCLK is thereby sampled by MEMCLK so that NANOCLK occurs at one-half MEMCLK frequency. HSCREQ input to gate 2732 inhibits flip-flop 2730 data input, and thus NANOCLK and PFP 312 operation, when a high-speed channel device has seized access to memory 311. A high-speed channel device, not shown in FIG. 3 for clarity of presentation, interfaces directly with MEMIN bus 320 and MEMOUT bus 318 to rapidly transfer data directly into and out of memory 311. Flip-flop 2730 set and reset inputs are connected to $\overline{\text{GPPRESET}}$ and GPRESET, allowing these inputs to enable or inhibit NANOCLK and PFP 312.

Circuitry generating MEMCLK will be discussed next, followed by circuitry initiating fetch operations by PFP 312. Finally, circuitry comprising PFP 312 interface with MEMIN bus 320 and MEMOUT bus 318 will be described, with reference again to FIG. 27.

Referring to FIG. 27A, MEMCLK is generated by flip-flop 2734, inverter 2736, and gates 2738 to 2742. 20CLK is connected to flip-flop 2734 K input and 40CLK is connected to flip-flop 2734 clock input. 40CLK samples 20CLK so that flip-flop 2734 Q and $\overline{\text{Q}}$ outputs provide MEMCLK and $\overline{\text{MEMCLK}}$. Gate 2742 is a buffer amplifier used to reduce loading on MEMCLK output of flip-flop 2734.

Flip-flop 2734 J input MEMCLKENB from gate 2740 is an enable input inhibiting MEMCLK and thus PFP 312. Inputs of gate 2740 are $\overline{\text{MEMWAIT}}$, $\overline{\text{ENB10CLK}}$, and SORRY from gate 2738 output. $\overline{\text{MEM WAIT}}$ has been previously discussed with reference to memory 310. $\overline{\text{ENB10CLK}}$ is used to synchronize MEMCLK with 40CLK. PRFREQ input of inverter 2736, as discussed previously, is generated when PFP 312 is allowed to generate a read request to memory 311. As discussed with reference to memory 311, if a PFP 312 request results in a memory request interference memory 311 will respond by providing $\overline{\text{MEM SORRY}}$. PFPREQ and MEMSORRY inputs to gate 2738 generate output SORRY, which indicates a PFP 312 read request has resulted in a memory interference condition. SORRY then inhibits generation of MEMCLK to inhibit PFP 312 operation until $\overline{\text{MEM SORRY}}$ indicates request interference has cleared. As previously discussed, PFP 312 will then proceed to repeat the previously interfering memory request. Flip-flop 2734 set and reset inputs are connected to $\overline{\text{GPPRE SET}}$ and $\overline{\text{GPRESET}}$; these inputs allow MEMCLK to be suspended and are used to set starting condition of MEMCLK.

Referring to FIGS. 27A and 27, pre-fetch cycles of PFP 312 are initiated by flip-flop 2744 output PPFREQFETCH, which indicates a fetch has been initiated.

As previously discussed, PFP 312 is enabled to perform pre-fetch operations when a higher priority device, e.g., CPU 314, does not require access to memory 311. Flip-flop 2744 data input is connected to an enable signal from gate 2746 output so that gate 2746 output is sampled by clock input MEMCLK. Gate 2746 has four inhibit signal inputs. $\overline{\text{DONECURRBLK}}$ is provided through inverter 2748 from gate 2750 and 2752. Gate 2752 has inputs PFPCT2 and PFPREQFETCH. PFPCTC2 from PFP PCR register 336 indicates PFPPCR is within one address of end of the block of instructions current accessible to PFP 312. PFPREQ FETCH from flip-flop 2744 output indicates a fetch has been initiated. Gate 2752 output $\overline{\text{LOCB}}$ thereby inhibits initiation of a subsequent PFP 312 request while last accessible instruction is being fetched. $\overline{\text{LOCB}}$ and $\overline{\text{EOCB}}$ are inputs of gates 2750. $\overline{\text{EOCB}}$ from PFP PCR register 336 indicates PFP 312 has fetched the last available instruction. DONECURRBLK output of gate 2750 and inverter 2748 thereby inhibits PFP 312 from fetching instructions outside the currently available block of instructions.

Gate 2746 input $\overline{\text{FULL}}$ from PROM 2710 in PFPRDY 334 indicates memory 330 is full. $\overline{\text{FULL}}$ inhibits generation of fetch requests by PFP 312 until CPU 314 requests further instructions from memory 330 and frees at least one memory 330 address location to accept further instructions.

Gate 2746 input from gate 2758 is also an inhibit signal. Gate 2758 input HSCREQ, discussed above, indicates a high-speed channel device is claiming priority access to memory 311. PFP 312 is inhibited from requesting access to memory 311 until HSCREQ is terminated. CONSOLEMODE, as discussed further below in regard to Soft Console ROM 358, indicates computer 310 is operating in console mode. In console mode, all normal operation of computer 310 is suspended, including pre-fetch; computer 310 is the controlled by an external teletype device operating through soft console 358.

Gate 2746 input CRF from gate 2754 is an enable signal indicating PFP 312 is allowed to perform prefetch operations. Gate 2754 input $\overline{\text{RANDCRF}}$ from microinstruction logic 342 indicates PFP 312 is allowed to fetch during a microinstruction asserting RANDCRF. ALCCRFEXT is a hardwired signal indicating PFP 312 is allowed to fetch during execution of an arithmetic and logic class (ALC) instruction. Gate 2754 input ALCCRF from gate 2756 is similar to ALCC RFEXT and indicates PFP 312 is allowed to fetch during an ALC instruction. Gate 2756 INSTSAGEALC indicates an ALC instruction is occurring during which PFP 312 may be allowed to fetch. Gate 2756 input μSEOTEST from microinstruction logic 342 s is a test condition indicating whether PFP 312 may fetch during that ALC instruction. CRF output of gate 2754 thereby indicates PFP 312 is allowed to perform pre-fetch during a microinstruction or ALC instruction.

Flip-flop 2744 thereby generates PFPREQFETCH when enabled by CRF and not inhibited by DONECURRBLK, FULL, CONSOLEMODE, or HSCREQ. As stated above, PFPREQFETCH then enables PFP 312 to execute a pre-fetch operation.

Finally, circuitry comprising PFP 312 interface with MEMIN bus 320 and MEMOUT bus 318 is shown in FIG. 27. PFP 312 interface circuitry comprises shift register 2760, gate 2762 and inverter 2764. Gate 2762 input PFPREQFETCH, as discussed, indicates PFP 312 is enabled to execute a pre-fetch cycle. PFPREQFETCH transfers physical address PFPPCR onto MEMIN bus 320 and generates MEMSTARTPFP and $\overline{PFPREQ}$. $\overline{PFPREQ}$ is compared to $\overline{MEMSORRY}$ to determine if a request interference has occurred. $\overline{MEMSORRY}$ is also connected to another input of gate 2762 to inhibit gate 2762 output FETCHSTARTED if a memory request interference occurs. If no interference occurs, gate 2762 generates FETCHSTARTED, which indicates a fetch has been requested and accepted by memory 311. FETCHSTARTED provides a logic 1 to shift register 2760 data input. Logic 1 is then shifted through register 2760 by MEMCLK. FETCHSTARTED will thereby appear in shift register 2760 output LOADINST four MEMCLK periods (i.e., 400 nanoseconds) after fetch was initiated. As discussed above, the requested instruction is then available on MEMOUT bus 318 and $\overline{LOADINST}$ transfers the instruction into PFP memory 330.

Having described structure and operation of PFP 312, certain features of PFP 312 will be summarized below.

D. Summary of PFP 312 Features

Certain features of PFP 312, which features and others were described above, are:

First, PFP 312 enhances operating efficiency of computer 310 by fetching from memory 311, and storing in PFP memory 330, instructions in advance of the instruction currently executing in CPU 314. CPU 314 thereby rarely needs to suspend its operation to execute a 400 nanosecond memory 311 read cycle to obtain instructions. Instead, the next instruction required by CPU 314 is present on PFP bus 322 when CPU 314 completes execution of the current instruction. Further, CPU 314 may execute instructions stored in PFP memory 330 during intervals when high priority devices (e.g., a high-speed channel) pre-empts access to memory 311. CPU 314 can thereby continue operation while denied access to memory 311.

Second, by minimizing CPU 314 memory requests, PFP 312 increases availability of memory 311 to other devices.

Third, PFP 312 performs pre-fetch during memory bus cycles not required by higher priority devices, such as CPU 314 or a high-speed channel. This again increases availability of memory 311 to these devices.

Fourth, PFP 312 access to memory 311 may be limited to a single block of 128 instructions at a time. This prevents PFP 312 from inadvertently fetching instructions from another user's program.

Fifth, lookahead capacity of PFP 312 may be limited to 16 instructions. This enhances efficiency of PFP 312 by allowing adequate lookahead while minimizing discard of fetched instructions when CPU 314 begins a new sequence of instructions.

Sixth, PFP 312 monitors memory 311 write operations. This avoids conflict between modified instructions in memory 311 and previously fetched unmodified instructions in memory 330.

Description of PFP 312 is thus concluded and microinstruction logic 342 will be described next.

Figure 28:
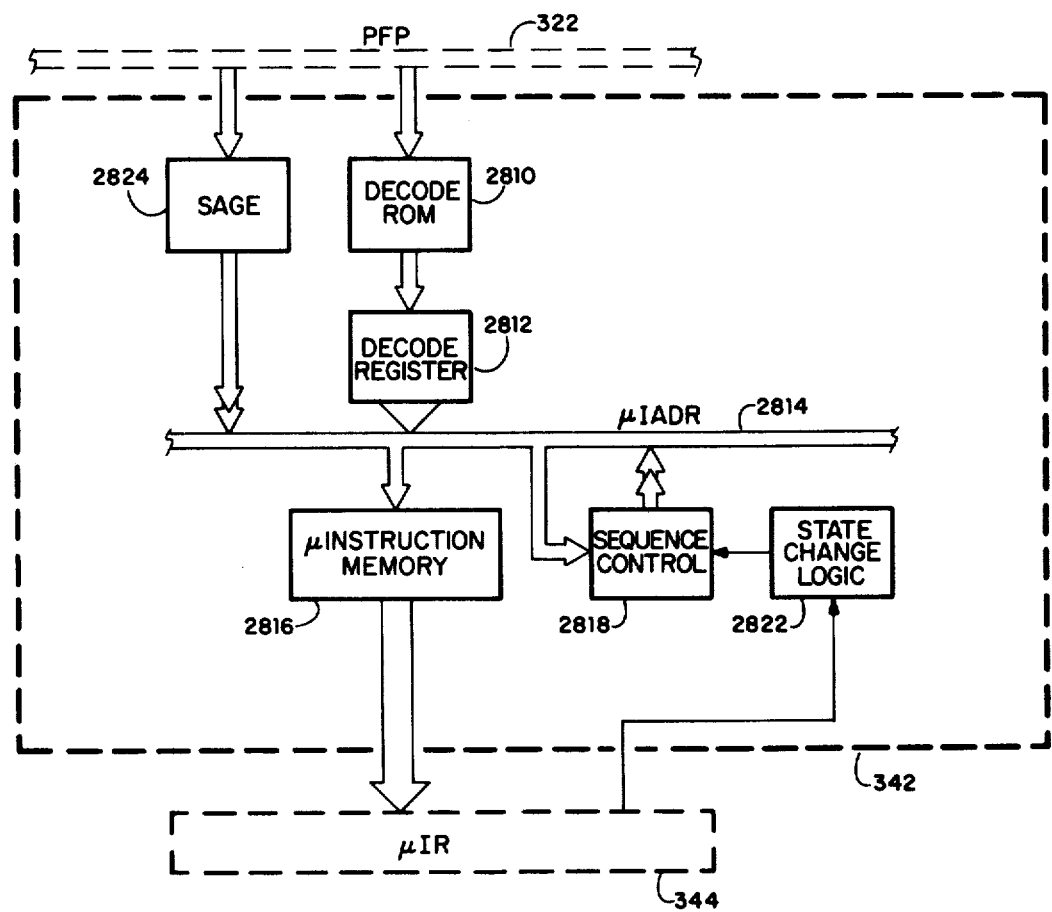
FIG. 28 is a block diagram of computer microinstruction logic.
Figure 30:
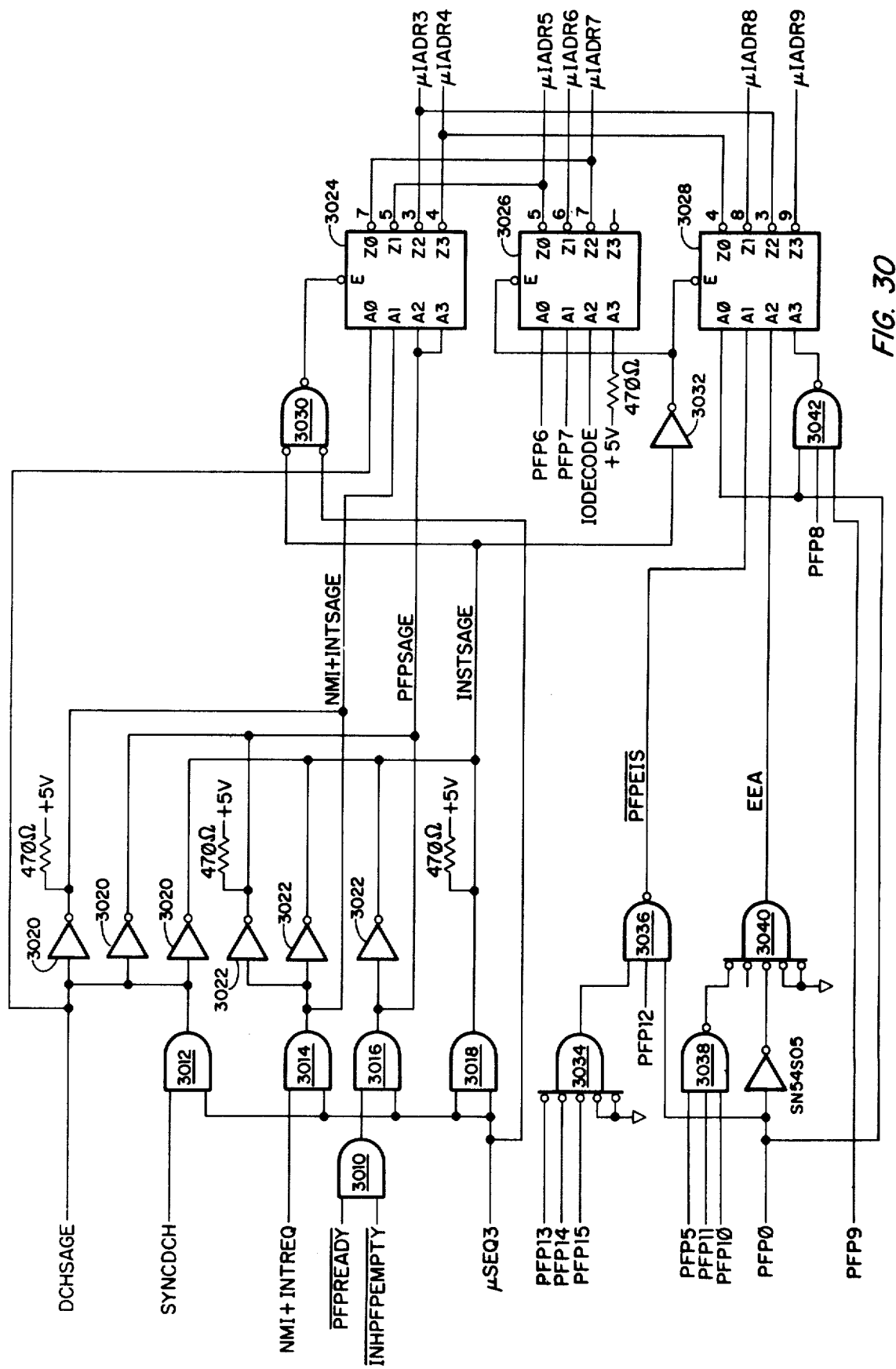
FIG. 30 is a schematic of part of computer system microinstruction logic (SAGE).

5. Microinstruction Logic 342 (FIGS. 28-30)

Referring to FIG. 3, microinstruction logic 342 is connected from PFP bus 322 and provides an output to microinstruction register 344. Microinstruction register 344 in turn has an output to ALUIN bus 324. As previously described, frequently used sequences of instructions, referred to as microinstructions, are stored in microinstruction logic 342.

When a sequence of microinstructions is to be executed an instruction appearing on PFP bus 322, referred to as a macroinstruction, in part comprises an instruction to microinstruction logic 342. Microinstruction logic 342 responds to a macroinstruction by providing a corresponding sequence of microinstructions to CPU 314.

Microinstruction logic 342's structure will first be described on a block diagram level, followed by a discussion of microinstruction logic 342 operation. These discussions will illustrate differences between microinstruction logic 342 of computer 310 and microinstruction logic 142 of prior art computer 110 previously referred to.

A. Microinstruction Logic 342 Structure and Operation (FIG. 28)

Referring to FIG. 28, a block diagram of microinstruction logic 342 is shown. Considering first those elements which could be present in prior art microinstruction logic 142, decode ROM 2810 input is connected to PFP bus 322 and its output is connected to decode register 2812 input. Decode register 2812 output is connected to microinstruction address ($\mu$IADR) bus 2814, which is connected to inputs of microinstruction memory 2816 and microinstruction sequence controller 2818. Memory 2816 output is connected to microinstruction register ($\mu$IR) 344 input. An output of $\mu$IR 344 is connected to state change logic 2822 input and state change logic 2822 output is connected to another input of sequence controller 2818. Sequence controller 2818 output is connected to $\mu$IRADR bus 2814. Turning to differences between prior art microinstruction logic 142 and present microinstruction logic 342, PFP bus 322 is connected to start address generator logic (SAGE) 2824 input and SAGE 2824 output is connected to $\mu$IADR bus 2814.

Microinstruction logic 342 operation will be described first without SAGE 2824, to illustrate operation in the prior art. Next, operation will then be described with inclusion of SAGE 2824, to illustrate operation of the present invention.

In operation without SAGE 2824, a macroinstruction appearing on PFP bus 322 during a first processor's cycle is decoded by decode ROM 2810. ROM 2810 generates a memory 2816 address of first microinstruction of the corresponding sequence. First address is transferred into decode register 2812 during second processor cycle and is provided to memory 2816 through UIADR bus 2814. Memory 2816 provides a corresponding first microinstruction to $\mu$IR register 344. First microinstruction appears at $\mu$IR register 344 output at start of third processor cycle. Selected bits of first and subsequent microinstructions of the sequence are provided from $\mu$IR register 344 to state change logic 2822. Logic 2822 provides control signals to sequence controller 2818. Sequence controller 2818, using addresses provided from decode register 2812 and its own output, generates addresses for subsequent microinstructions of the sequence. Addresses generated by sequence controller 2818 are provided to memory 2816 and its own input through μIADR bus 2814. New initial addresses are provided as required during a sequence, or to initiate a new sequence, by new macroinstructions provided from PFP 312 through PFP bus 322.

Turning to operation with SAGE 2824, SAGE 2824 reduces time required to initiate microinstruction sequences. As described above, in prior art a first processor cycle was required to decode a macroinstruction to generate an initial address for a sequence. Initial address was provided to memory 2816 during second processor cycle. First microinstruction was then available for use by CPU 314 as third processor cycle. SAGE 2824 perfroms partial decode of certain macroinstructions to provide an initial address to memory 2816 during first processor cycle. First microinstruction of a sequence thereby becomes available to CPU314 at second processor cycle. Decode ROM 2810 concurrently performs full decode of the macroinstruction to provide an address to memory 2816 in a subsequent processor cycle. Addresses provided by decode ROM 2810 is used, e.g., to select a particular sequence from a family of sequences (branches) having a common first microinstruction sequence. In such cases, SAGE 2824 calls out first microinstruction of the sequence and decode ROM 2810 calls out the first microinstruction of a particular subsequent branch sequence. During execution of a particular sequence, selection of a new sequence may be made by a new macroinstruction from PFP 312. Again, a branch selection macroinstruction may be decoded either by SAGE 2824 or by decode ROM 2810; SAGE 2824 decode may therefore be used to reduce time required to initiate a selected branch.

Having discussed structure and operation of microinstruction logic 342 on block diagram level, SAGE 2824 will now be discussed further.

B. SAGE 2824 (FIGS. 29 and 30)

SAGE 2824 decoding is preferably used to initiate frequently used microinstruction sequences. Examples of such sequences are ALC instructions and Long and Short effective address (EFA) calculations. A further example are I/O instructions, to rapidly transfer data into or out of computer 310. Yet another example is referred to as extended instruction set (EIS) sequences. Examples of EIS microinstruction sequences are some fixed and floating point arithmetic operations, logical operations, bit manipulations, data movements, stack manipulations, program flow alterations, and string and decimal number manipulations.

Referring to FIG. 29, a table relating selected significant bits of the above macroinstructions to memory 2816 addresses of initial microinstructions of corresponding microinstruction sequences is shown. In order to simplify SAGE 2824 circuitry, it is preferable that selected significant bits of these macroinstructions be logically related. As shown in line 1 of FIG. 29, in ALC instructions bit 0 is logic 1. Bits 1 and 2 specify a source accumulator (ACS) and bits 3 and 4 specify a destination accumulator (ACD). Bits 5 to 7 (FUN) contain operation code, e.g., add and subtract. Bits 8 and 9 (SH) define a shift operation, e.g., shift right or left or swap halves of result. Bits 10 and 11 (C) specify initial value of a carry bit input to an operation. Bit 12 (L) defines whether result of operation will be loaded into ACD and whether carry bit will be updated. Bits 13 to 15 define skip test, i.e., whether a skip is to be peformed. EIS sequences, shown in line 2 of FIG. 29, are defined by bits 0 and 12 being logic 1 and bits 13 to 15 being logic 0. In effect, EIS sequences are ALC sequences wherein no load or skip occurs, (a no op condition). EIS instructions may therefore be considered as no op ALC instructions used to execute non-ALC microinstruction sequences. Significant bits of long-effective address macroinstructions (LONG EFA) are shown in line 3. Long EFA's are similar to Short EFA instructions previously described, but require two successive macroinstructions to define relative address. Long EFA macroinstructions, are, like EIS's defined by logic 1 in bits 1 and 12 and logic 0 in bits 13 to 15. Long EFA's are distinguished from EIS's by bits 5, 8, 9, 10, and 11. Bits 5, 10, and 11 are logic 1 and bit is logic 0. Bits 6 and 7 are used by SAGE 2824 to perform further partial decoding of a Long EFA. This allows SAGE 2824 to select first microinstruction of a particular Long EFA sequence from a group of such sequences without waiting for decode ROM 2810 to perform an additional selection decode. Short EFA macroinstructions are shown in line 4 of FIG. 29. Short EFA's are distinguished by bit 0 being logic 0 and bits 1 and 2 being 00, 01, or 10. Bits 1 and 2, however, will never both be logic 1. Four possible combinations of bits 6 and 7 are used, similar to bits 6 and 7 of Long EFA's to allow SAGE 2824 to perform further partial decoding. I/O macroinstructions are shown in line 5 and are also distinguished by bit 0 being logic 0. In this case, bits 1 and 2 are both logic 1, thereby distinguishing I/O macroinstructions from Short EFA macroinstructions.

Memory 2816 addresses containing first macroinstructions of sequences corresponding to ALC, EIS, EFA, and I/O macroinstructions are shown in right-hand column of FIG. 29. Memory 2816 addresses shown in FIG. 29 are expressed in base eight (octal) code. As shown, memory 2816 addresses corresponding to a particular group of macroinstructions are again logically related. E.g., memory 2816 addresses of first microinstructions of Short EFA sequences are stored in memory 2816 locations 3701, 3721, 3741, and 3761. Selection of memory 2816 addresses so that all first microinstruction addresses corresponding to a given group of macroinstructions are logically related simplifies SAGE 2824 circuitry.

Referring to FIG. 30, circuitry used in a particular embodiment of SAGE 2824 is shown. As in sub-memory 313 and PFP 312, SAGE 2824 circuitry will be discussed only to the extent necessary to illustrate operation of SAGE 2824.

Gates 3010 to 3018 and inverters 3020 and 3022 comprise a priority decoding circuit to select among conflicting requests for execution of microinstruction sequences. One output of this circuitry is INSTSAGE (instruction sage) indicating a SAGE instruction sequence of the group discussed above is to be executed. Three other output represent requests for sequences not previously discussed. PFPSAGE (PFP SAGE) indicates a sequence of servicing PFP 312 is to be executed; NMI+INTSAGE (non-maskable interrupt or SAGE interrupt) indicates a sequence for interrupt routines is to be executed; and, DCHSAGE (Data channel SAGE) indicates a sequence servicing an I/O device initiated data transfer is to be executed. As shown, these outputs are wire ORed so that only one output is active at a time. Priority of SAGE microinstruction sequences selected by these outputs is in inverse order from that named.

Priority circuit inputs are SYNCDCH (Synch Data Channel) is a test result input from CPU 314 indicating a data channel is to be serviced. Input NMI+INTREQ (Non-maskable Interrupt or interrupt request) indicates a request for a microinstruction sequence servicing an interrupt. Input PFP-READY (PFP READY) indicates, PFP 312 is empty and requires a sequence allowing instructions to be fetched from memory 311. Input INH-PFPEMPTY (Inhibit PFP Empty) is an input from CPU 314 inhibiting servicing of PFP 312 and will be discussed further below. Input µSEQ3 is an input from state chance logic 2822 indicating a SAGE decode is to be executed.

Buffer gates 3024, 3026, and 3028 provide partially decoded memory 2618 address bits µIADR 3 to 9 to µIADR bus 2814 and thus to memory 2816. All memory 2618 address inputs are provided with pull-up resistors. Memory 2618 address inputs are thereby logic 1 unless driven to logic 0, e.g., by buffers 3024 to 3026. µIADR 3, 4, 5, and 7 outputs of buffer 3024 are provided as initial address bits of first microinstructions of sequences for servicing data channels, interrupts, and PFP 312. Buffer 3024 inputs include DCHSAGE, NMI+INTSAGE, and PFPSAGE from priority circuitry. Buffer 3024 is enabled by µSEQ3 and INSTSAGE through gate 3030. Gate 3030 output indicates that a data channel, interrupt, or PFP SAGE decode is to be performed.

Buffers 3026 and 3028 provide partially decoded memory 2816 address bits $\overline{\mu IADR}$ 3 to 9 when ALC, EIS, LONG and short EFA, or I/O microinstruction sequences are to be executed. Input INSTSAGE to buffers 3026 and 3028 through inverter 3032 indicates a SAGE decode is to be performed for one of this group of macroinstructions. Gates 3034 and 3036 decode macroinstruction bits PFP0 and 12 to 16 from PFP bus 322 to provide PFPEIS to buffer 3028. PFPEIS indicates an EIS type macroinstruction is to be decoded by SAGE 2024. Gates 3038 and 3040 decode macroinstruction bits PFP0, 5, 9, 10, and 11 to provide signal EEA to buffer 3028. EEA indicates a long effective address macroinstruction is to be decoded. Gate 3042 output is provided to buffer 3028. Macroinstruction bits PFP0, 6, and 7, are provided directly to inputs of buffers 3026 and 3028, e.g., for Short and Long EFA's. Input IODECODE to buffer 3026 indicates an I/O macroinstruction is to be decoded.

In summary, SAGE 2824 thereby selects first microinstructions of certain sequences stored in memory 2816 by decoding selected macroinstruction bits to provide corresponding selected microinstruction address bits. A single class of macroinstructions so decoded may contain more than one microinstruction sequence.

A group of sequences corresponding to a macroinstruction all, however, generally have a same first microinstruction sequence. SAGE 2824 performs partial decode where necessary to select between related microinstruction sequences but, in general, such selection is performed by decode ROM 2810. Considering, e.g., short EFA and I/O macroinstructions, SAGE 2824 provides sufficient address bits to select all addresses represented by 37X1. SAGE 2824 then provides sufficient further address bits to indicate whether X is even (0, 2, 4, 6) or odd (1, 3, 5, 7).

A discussion of microinstruction logic 342 and SAGE 2824 is thus concluded and Console ROM 358 will be discussed next.

6. Console ROM 358 (FIG. 3)

Referring to FIG. 3, Console ROM 358 is connected from ALUOUT bus 326 to ALUIN bus 324. Briefly, Console ROM 358 replaces a majority of hard console switches and lights normally used to control computer 310. Computer 310 thereby requires only a small hard console and any external device having an ASCII interface can control computer 310. Console ROM 358 contains console program macroinstructions for computer 310 console operation. These include examination and modification of current computer 310 contents, bootstrap loading of programs, and execution of test programs.

In operation, computer 310 switches into console mode when power is first turned on, a halt command is received from hard console (not shown for clarity of presentation) or a macroinstruction, or a hard console command is received. Upon entering console mode, CPU PC register 364 is loaded with Console ROM 358 address for the first instruction of the console instruction sequence contained in Console ROM 358. Also, CONSOLEMODE inhibits PFP 312 operation. Concurrently, a PCDEST is provided to PFP 312 to initialize PFP PCF and PFP PCR and to reset PFP 312 status. PFPREADY to CPU 314 thereby requests microinstruction logic 342 to execute a pre-fetch service routine. Microinstruction logic 342 tests, however, determine that computer 310 is in console mode. CPU PC (i.e. first address of console program sequence) is transferred from CPU PC register 364 to ALU 356 through ALUIN bus 324. ALU 356 transfers CPU PC onto ALUOUT bus 326 and thus to Console ROM 358 address input. First instruction of console program then appears at Console ROM 358 output and is transferred into ALU 356 through ALUIN bus 324. ALU 356 transfers console program first instruction onto ALUOUT bus 326 and from there to PFP bus 322 through register 352. Microinstruction logic 342 receives console program first instruction and performs a SAGE 2824 decode to initiate execution of the console program. PFPREADY has requested a PFP service routine, as described above, is inhibited by INHEMPTY at start of console program. Microinstruction logic 342 controls request of subsequent console program instructions by providing appropriate console ROM 358 addresses through µIR 344, ALU 356 and ALUOUT bus 326. Instructions so requested are transferred from Console ROM 358 to ALU 356 and from there to microinstruction logic 342 through ALUOUT bus 326, register 352, and PFP bus 322.

Once console program has been initiated, a specific console program sequence, e.g., to execute a test program, may be requested by an external ASCII device through I/O ASCII channel 374. Predetermined sequences of ASCII code characters representing, e.g., a test program, are transmitted serially from an external device to UART 376 through I/O space ASCII channel 347. UART 376 converts serial ASCII code bits to parallel ASCII characters and transmits the characters through ALUIN bus 324 to ALU 356. A control sequence of instructions in console program accumulates characters until a complete sequence corresponding to a request for a console program sequence has been received. Characters are accumulated in a scratch pad memory located in MAP 354. Control sequence then interprets and acts upon the sequence through additional instructions in console program. A corresponding console program instruction sequence appears at Console ROM 358 output and is transferred to microinstruction logic 342 through ALU 356 as described above to effect requested console program action. During execution of requested console program sequence, microinstruction logic 342 may request further instructions from console ROM 358 as described above.

In summary, Console ROM 358 allows any external ASCII interface devices to externally control computer 310 for execution of console related operations. In particular, Console ROM 358 converts predetermined sequences of externally provided code characters, e.g., ASCII, into machine language macroinstructions usable by computer 310 in executing console operations. Console ROM 358 does this by storing sequences of instructions required in executing such console related operations. Console ROM 358 is preferably implemented using easily replaceable read only memories (ROMs). This allows Console 358 to be easily changed to adapt to, e.g., ASCIV inputs or to change in computer 310 macro- or microinstructions.

Discussion of Console ROM 358 and computer 310 is thus concluded.

7. Parts List (FIGS. 14–27, 30)

Circuit components used in the presently known best mode of practicing the invention disclosed herein are described in the table below. Those components not assigned reference numbers and described in text are identified separately in FIGS. 14 to 27 and FIG. 30. All resistors are 5%, ¼ watt carbon resistors and all capacitors have 10% tolerance.

PARTS TABLE

| Component | Manufacturer | Part Number |
| --- | --- | --- |
| Gate: 2126, 2246, 2344, 2348, 2350, 2352, 2358, 2370, 2725, 2750, 2752. | Texas Instruments, Inc. | SN74S00 |
| Gate: 2122, 2242, 2250, 2332, 2334, 2346, 2354, 2520, 2526, 2713, 2732, 2738, 2758. | Texas Instruments, Inc. | SN74S02 |
| Inverter: 2112, 2319, 2338, 2416, 2522, 2726, 2736, 2748, 3032. | Texas Instruments, Inc. | SN74S04 |
| Inverter: 3020, 3022. | Texas Instruments, Inc. | SN74S05 |
| Gate: 2024, 2244, 2324, 2326, 2333, 3010, 3012, 3014. | Texas Instruments, Inc. | SN74S08 |
| Gate: 3016, 3018. | Texas Instruments, Inc. | SN74S09 |
| Gate: 2718, 2754, 2756, 3036, 3042. | Texas Instruments, Inc. | SN74S10 |
| Gate: 2762. | Texas Instruments, Inc. | SN74S11 |
| Gate: 2110. | Texas Instruments, Inc. | SN74S15 |
| Gate: 2128, 2746. | Texas Instruments, Inc. | SN74S22 |
| Gate: 2716, 2724, 3030. | Texas Instruments, Inc. | SN74S32 |
| Gate: 2410, 2412, 2416, 2742. | Texas Instruments, Inc. | SN74S37 |
| Gate: 2130, 2210, 2714, 2715. | Texas Instruments, Inc. | SN74S38 |
| Gate: 2318. | Texas Instruments, Inc. | SN74S64 |
| Flip-flop: 2212, 2214, 2216, 2218, 2223, 2224, 2226, 2228, 2230, 2234, 2236, 2238, 2314, 2356, 2712, 2730, 2744. | Texas Instruments, Inc. | SN74S74 |
| Flip-flop: 2012, 2014, 2016, 2018, 2020, 2022, 2728, 2734, 2748. | Texas Instruments, Inc. | SN74S112 |
| Multiplexor: 2116. | Texas Instruments, Inc. | SN74S138 |
| Multiplexor: 2220, 2232, 2340, 2342. | Texas Instruments, Inc. | SN74S158 |
| Counter: 2312. | Texas Instruments, Inc. | SN74LS161 |
| Shift Register: 2110. | Texas Instruments, Inc. | SN74LS164 |
| Shift Register: 2316, 2760. | Texas Instruments, Inc. | SN74LS194 |
| Buffer: 1614, 1710, 2124, 2614, 3024, 3026, 3028. | Texas Instruments, Inc. | SN74S240 |
| Buffer: 2518. | Texas Instruments, Inc. | SN74S241 |
| Multiplexor: 1610. | Fairchild | SN74S253 |
| Gate: 2222, 2322, 2722, 2740, 3034, 3038. | Texas Instruments, Inc. | SN74S260 |
| Latch: 526, 528, 1712 | Texas Instruments, Inc. | SN74S373 |
| Latch: 1612, 2510, 2512. | Texas Instruments, Inc. | SN74S374 |
| Counter: 2236, 2238. | Texas Instruments, Inc. | SN74LS393 |
| RAM: 2618, 2620, 2622, 2624. | Advanced Micro Devices, Inc. | AM29705 |
| ROM: 2710. | Intersil, Inc. | IM5603 |
| Counter: 2514, 2516, 2610, 2612, 2616. | Fairchild, Inc. | 93S16 |
| Comparator: 2524. | Fairchild, Inc. | 93S46 |
| RAM: 1410, 1412, 1430, 1432, 1440, 1442, 1450. | Mostek, Inc. | MK4T16-2 |
| Gate: 1912, 1914, 1924, 1926, 1928, 1930, 2330. | Motorola, Inc. | MC3459, selected for switching times less than 15 ns. |
| Transistor: 2360. | | 2N3646 |
| Diode: 2362. | | 7N5713 |
| Resistors: | | |
| 1932 | | 33 ohms, 5%, ¼W, carbon |
| 2364 | | 220 ohms, 5%, ¼W, carbon |
| 2366 | | 100 ohms, 5%, ¼W, carbon |
| 2368 | | 470 ohms, 5%, ¼W, carbon |
| Capacitors: | | |
| 2370 | | 47pf, 5%, ceramic |

The invention may be embodied in yet other specific forms without departing from the spirit or essential characteristics thereof. E.g., the capacity of sub-memory 313 may be varied in length or width, or sub-memory 313 may be provided with separate data and address input busses. Likewise, memory 311 may incorporate more than eight sub-memories 313. Further, sequence timing circuitry shown in FIGS. 20, 22, 22A, 23A, and 27A may be implemented with counters rather than shift registers. Memory output bus interface circuitry shown in PFP 312 may be similarly used in any other device interfacing memory 311. Also, SAGE 2824 may be used for initial decode of macroinstructions other than those shown, depending upon specific macroinstructions and microinstruction sequences used in computer 310. Likewise, Console ROM 358 may be used for conversion of data as well as instructions. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A digital data bus system useful in a digital computer system including memory means for storing said data and providing said data at a first predetermined time interval after responding to a first memory input signal, said data bus system comprising:

memory input bus means connected to said memory means for conducting said first memory input signal to said memory means;

memory output bus means connected from said memory means for conducting said data provided by said memory means; and memory bus interface means comprising generating means connected to said memory input bus means for generating said first memory input signal, timing means responsive to operation of said generating means for measuring said first predetermined time interval beginning when said generating means has generated said first memory input signal, and data receiving means connected from said memory output bus means and responsive to operation of said timing means for receiving said data when said timing means indicates passage of said first predetermined time interval.

2. In the data bus system of claim 1, and wherein:

said data further includes instructions;

said memory means further responds to a second memory input signal and to data provided on said memory input bus a second predetermined time interval after said second memory input signal by storing said provided data;

said data receiving means includes instruction storage means for receiving said instructions from said memory output bus means, storing said instructions, and outputting said instructions;

said digital computer system further includes processor means connected to said memory input bus means, to said memory output bus means, and to said instruction storage means for receiving said instructions output from said instruction storage means and in response to said instructions, additionally providing said first memory input signal, providing said second memory input signal, providing said data to said memory input bus, and receiving said data from said memory output bus;

said first memory input signal generated by said generating means requests one of said instructions.

3. In the data bus system of claim 2, and wherein:

said generating means is responsive to operation of said processor means and generates said first memory input signal only when said processor means is not using said memory means.

4. In the data bus system of claim 1, and wherein:

said memory means further provides a busy signal indicating that said memory means cannot presently respond to said first memory input signal;

said generating means continues generating said first memory input sigal while said memory means provides said busy signal; and said timing means is further responsive to said busy signal and does not begin measuring said first predetermined time interval until said memory means ceases providing said busy signal.

5. In the data bus system of claim 1, and wherein:

said digital computer system includes a plurality of devices connected to said memory means for providing said data to and receiving said data from said memory means; and said generating means is responsive to said plurality of devices and generates said first memory input signal only when no other device of said plurality of devices is using said memory means.

6. In the data bus system of claim 5, and wherein:

said memory means further provides a busy signal to said memory bus interface means when said memory means cannot presently respond to said first memory signal from said memory bus interface means and ceases providing said busy signal when said memory means can again respond to said first memory input signal from said memory bus interface means;

said generating means continues generating said first memory input signal while said memory means provides said busy signal; and said timing means is further responsive to said busy signal and does not begin measuring said first predetermined time interval until said memory means ceases providing said busy signal.

7. In the data bus system of claim 6, and wherein:

said data includes instructions;

said plurality of devices includes processor means for executing said instructions;

said data receiving means includes instruction storage means connected to said processor means for providing said instructions to said processor means; and said first memory input signal generated by said generating means requests one of said instructions.

* * * * *